US011632270B2

(12) United States Patent
Kons et al.

(10) Patent No.: US 11,632,270 B2
(45) Date of Patent: *Apr. 18, 2023

(54) ASPECTS OF CHANNEL ESTIMATION FOR ORTHOGONAL TIME FREQUENCY SPACE MODULATION FOR WIRELESS COMMUNICATIONS

(71) Applicant: Cohere Technologies, Inc., Santa Clara, CA (US)

(72) Inventors: Shachar Kons, Santa Clara, CA (US); James Delfeld, Santa Clara, CA (US); Robert Fanfelle, Santa Clara, CA (US); Andreas Molisch, Santa Clara, CA (US); Yoav Hebron, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/733,484

(22) PCT Filed: Feb. 7, 2019

(86) PCT No.: PCT/US2019/017127
§ 371 (c)(1),
(2) Date: Aug. 7, 2020

(87) PCT Pub. No.: WO2019/157230
PCT Pub. Date: Aug. 15, 2019

(65) Prior Publication Data
US 2021/0105155 A1    Apr. 8, 2021

Related U.S. Application Data

(60) Provisional application No. 62/639,831, filed on Mar. 7, 2018, provisional application No. 62/631,425, filed
(Continued)

(51) Int. Cl.
*H04L 27/02* (2006.01)
*H04L 25/02* (2006.01)
(Continued)

(52) U.S. Cl.
CPC ......... *H04L 25/0204* (2013.01); *H04B 7/024* (2013.01); *H04B 7/0417* (2013.01); *H04B 7/0452* (2013.01); *H04W 88/02* (2013.01)

(58) Field of Classification Search
CPC ... H04L 25/0204; H04B 7/024; H04B 7/0417; H04B 7/0452; H04W 88/02
(Continued)

(56) References Cited

U.S. PATENT DOCUMENTS 4,754,493 A    6/1988  Coates
5,083,135 A    1/1992  Nagy et al.
(Continued)

FOREIGN PATENT DOCUMENTS

CN    1235720 A     11/1999
CN    101682316 A   3/2010
(Continued)

OTHER PUBLICATIONS

Office Action for U.S. Appl. No. 13/117,119, dated Aug. 5, 2013, 5 pages.
(Continued)

*Primary Examiner* — Kevin M Burd
(74) *Attorney, Agent, or Firm* — Perkins Coie LLP

(57) ABSTRACT

Device, methods and systems for aspects of channel estimation for orthogonal time frequency space (OTFS) modulation in wireless systems are described. In an aspect, a method for wireless communication may include receiving, using multiple receive antennas, from a number of user devices, non-orthogonal pilots wherein at least some transmissions of the non-orthogonal pilots from different user
(Continued)

devices overlap in at least some time and frequency resources, estimating individual pilots from the number of user devices by computing a pilot separation filter for each antenna, and estimating the wireless channel at time and frequency resources used by the non-orthogonal pilots by filtering the receiving signal at the multiple receiver antennas.

20 Claims, 58 Drawing Sheets

Related U.S. Application Data on Feb. 15, 2018, provisional application No. 62/631,391, filed on Feb. 15, 2018, provisional application No. 62/628,235, filed on Feb. 8, 2018.

(51) Int. Cl.
  *H04B 7/024*     (2017.01)
  *H04B 7/0417*    (2017.01)
  *H04B 7/0452*    (2017.01)
  *H04W 88/02*     (2009.01)

(58) Field of Classification Search
  USPC ............................................. 375/267
  See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,907,270 B1* | 6/2005 | Blanz ................. H04L 25/0248 455/562.1 | |
| 6,956,814 B1 | 10/2005 | Campanella | |
| 7,010,048 B1 | 3/2006 | Shattil | |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2 | 8/2010 | Tirkkonen et al. | |
| 7,864,877 B2 | 1/2011 | Hottinen | |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 10,541,734 B2* | 1/2020 | Delfeld ................. H04B 7/0456 | |
| 11,018,731 B2* | 5/2021 | Delfeld ................. H04L 5/0048 | |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0157778 A1 | 7/2005 | Trachewsky et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Martone et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1 | 5/2007 | Han et al. | |
| 2007/0110131 A1 | 5/2007 | Guess et al. | |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0075686 A1* | 3/2009 | Gomadam ............ H04B 7/0617 455/500 | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0164405 A1* | 6/2009 | Yang ................... G06K 9/6214 706/46 | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 | 1/2011 | Garmany | |
| 2011/0110532 A1 | 5/2011 | Svendsen | |
| 2011/0116489 A1 | 5/2011 | Grandhi | |
| 2011/0116516 A1 | 5/2011 | Hwang et al. | |
| 2011/0126071 A1 | 5/2011 | Han et al. | |
| 2011/0131463 A1 | 6/2011 | Gunnam | |
| 2011/0216808 A1 | 9/2011 | Tong et al. | |
| 2011/0286502 A1 | 11/2011 | Adachi et al. | |
| 2011/0287778 A1 | 11/2011 | Levin et al. | |
| 2011/0292971 A1 | 12/2011 | Hadani et al. | |
| 2011/0293030 A1 | 12/2011 | Rakib et al. | |
| 2011/0299379 A1 | 12/2011 | Sesia et al. | |
| 2011/0305267 A1 | 12/2011 | Riu et al. | |

(56) References Cited

U.S. PATENT DOCUMENTS

| | | |
|---|---|---|
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2018/0351708 A1* | 12/2018 | Wang .............. H04B 7/0452 |

FOREIGN PATENT DOCUMENTS

| | | |
|---|---|---|
| CN | 101939935 A | 1/2011 |
| CN | 106788938 A | 5/2017 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2015070502 A1 | 5/2015 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

International Preliminary Report on Patentability for International Application No. PCT/US2013/047723, dated Dec. 31, 2014, 15 pages.

Notice of Allowance for U.S. Appl. No. 13/927,088, dated Feb. 18, 2015, 7 pages.

Office Action for U.S. Appl. No. 13/927,088, dated Nov. 28, 2014, 13 pages.

Notice of Allowance for U.S. Appl. No. 13/927,086, dated Dec. 26, 2014, 8 pages.

Supplemental Notice of Allowability for U.S. Appl. No. 13/927,086, dated Mar. 19, 2015, 4 pages.

Office Action for U.S. Appl. No. 13/927,086, dated Oct. 14, 2014, 10 pages.

Office Action for U.S. Appl. No. 13/927,089, dated Dec. 24, 2014, 13 pages.

Office Action for U.S. Appl. No. 13/927,089, dated Aug. 14, 2015, 7 pages.

Supplemental Notice of Allowability for U.S. Appl. No. 13/927,091, dated Jun. 11, 2015, 4 pages.

Notice of Allowance for U.S. Appl. No. 13/927,091, dated Apr. 24, 2015, 8 pages.

Office Action for U.S. Appl. No. 13/927,091, dated Jan. 27, 2015, 15 pages.

(56) References Cited

OTHER PUBLICATIONS

Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
European Patent Office, Partial Supplementary European Search Report dated Apr. 13, 2021, 18 pages.
Huawei et al., Discussion on UL CSI acquisition, vol. RAN WGI Feb. 12, 2017, URL:http//www.3gpp.org/ftp/Meetings_3GPP_SYNC/RAN1/DOCS/.
Tomasi Beatrice et al., Pilot length optimization for spatially correlated multi-user MIMO channel estimation, 2015 49th Asilomar Conference on Signals, Systems and Computers, IEEE, Nov. 8, 2015 pp. 1237-1241.

* cited by examiner

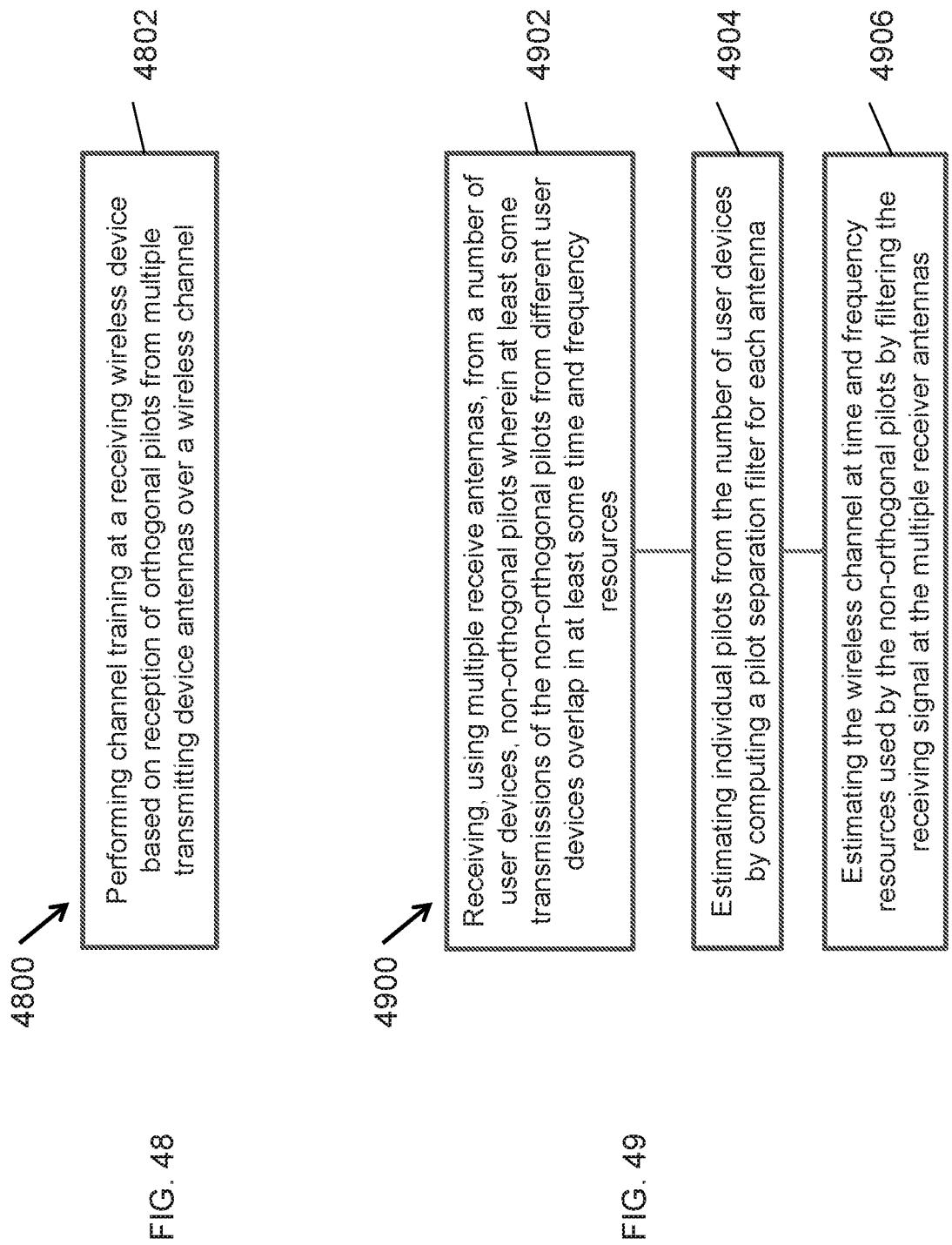

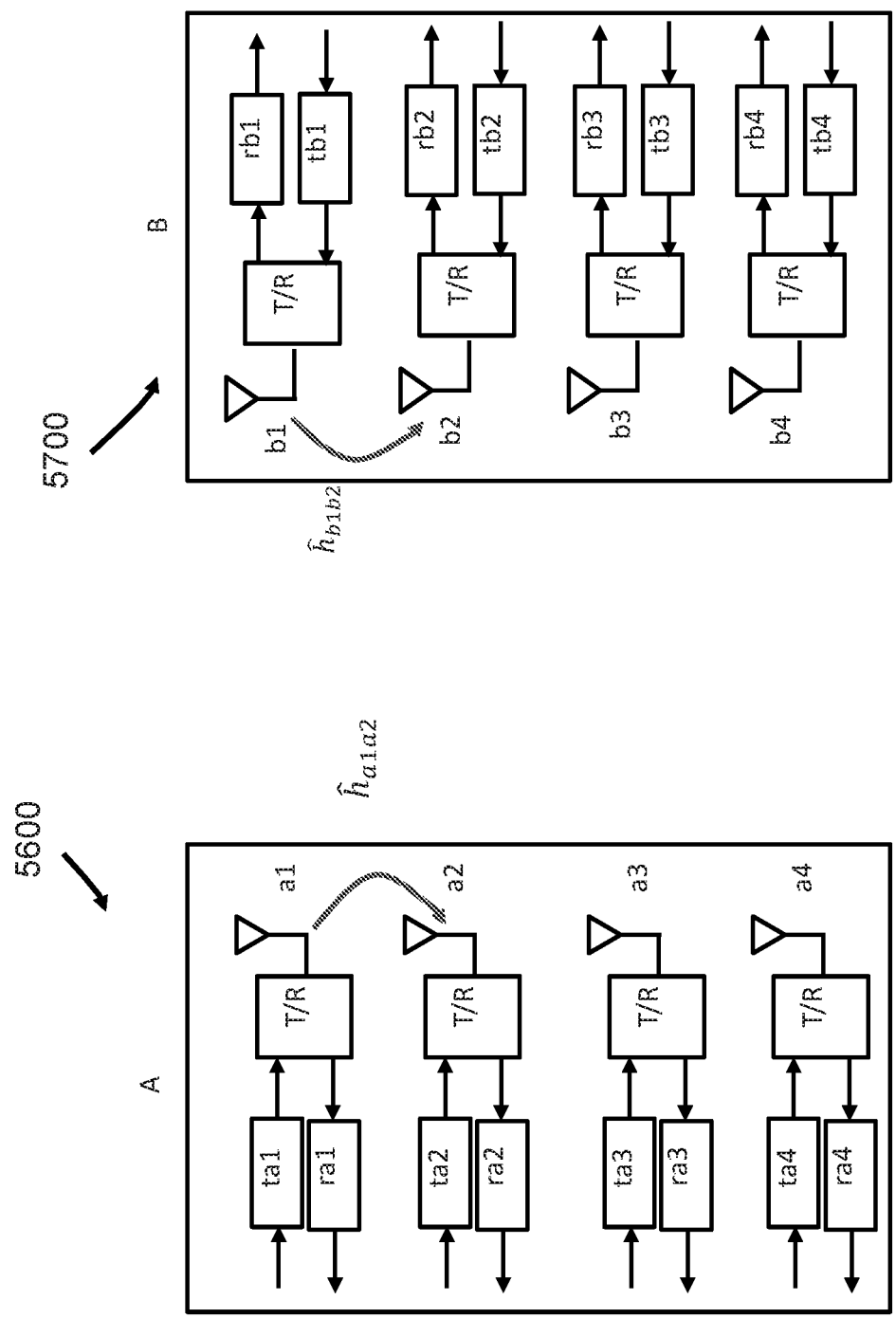

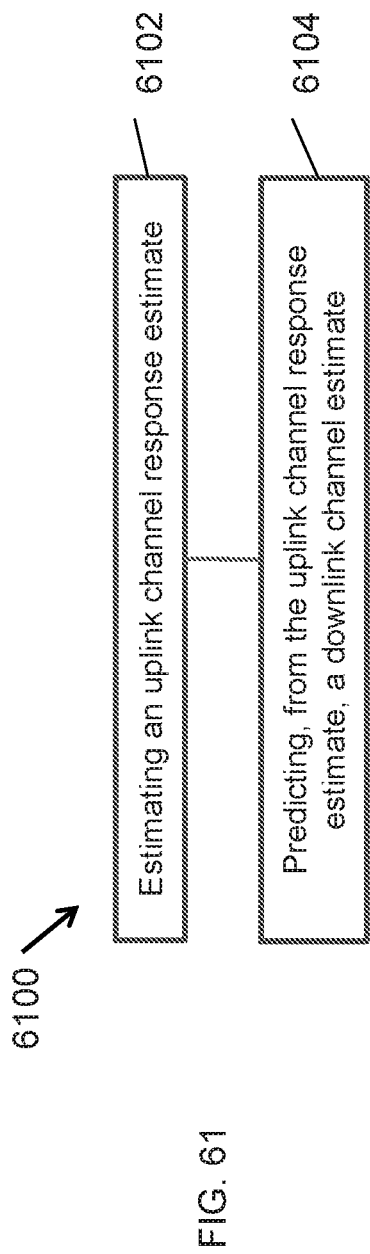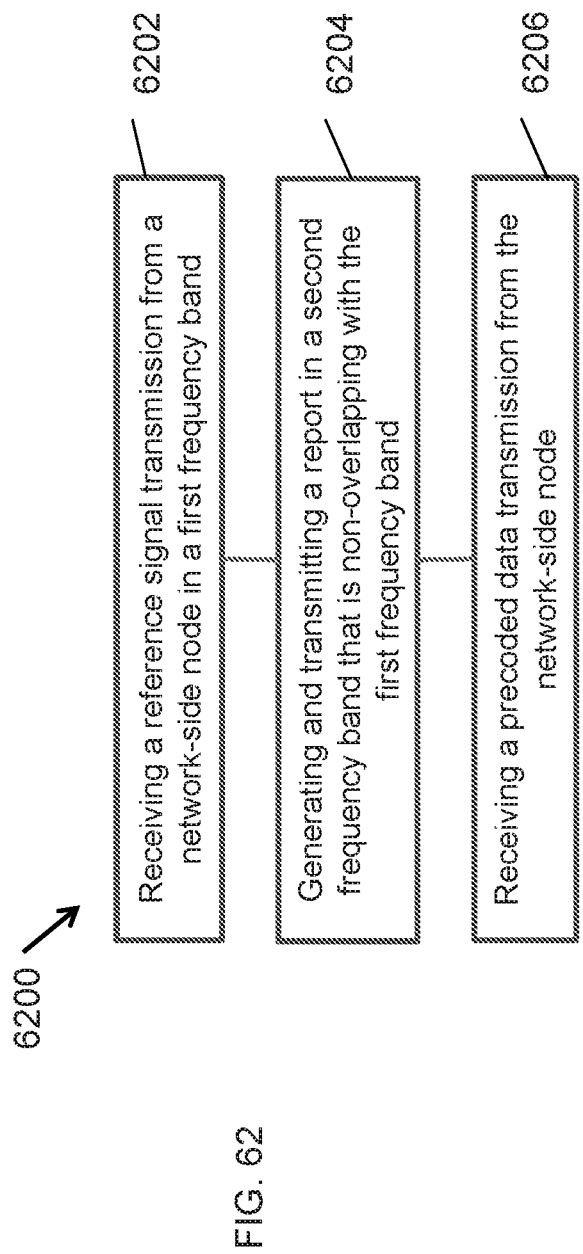

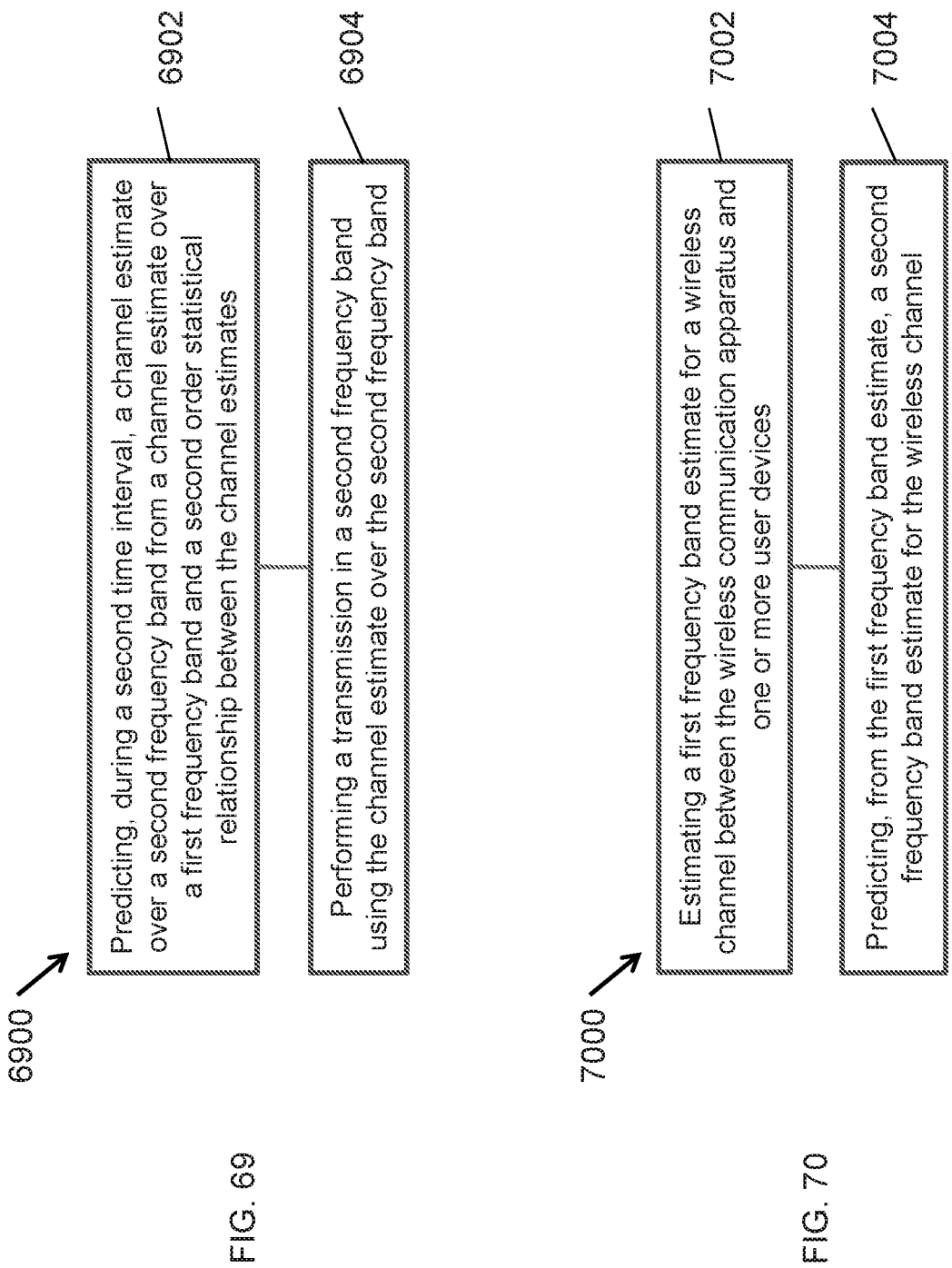

ASPECTS OF CHANNEL ESTIMATION FOR ORTHOGONAL TIME FREQUENCY SPACE MODULATION FOR WIRELESS COMMUNICATIONS

CROSS-REFERENCES TO RELATED APPLICATIONS

This patent document is a 371 of International Application No. PCT/US2019/017127, filed 7 Feb. 2019, which claims priority to and benefits of U.S. Provisional Application No. 62/628,235 entitled WIRELESS PRECODED COMMUNICATION FOR MASSIVE NUMBER OF USER DEVICES filed on 8 Feb. 2018, U.S. Provisional Application No. 62/631,391 entitled WIRELESS PRECODED COMMUNICATION FOR FREQUENCY DIVISION DUPLEXING SYSTEMS filed on 15 Feb. 2018, U.S. Provisional Application No. 62/631,425 entitled EFFICIENT CHANNEL ESTIMATION USING SECOND ORDER STATISTICS filed on 15 Feb. 2018, and U.S. Provisional Application No. 62/639,831 entitled PILOT SCHEDULING FOR MULTI-BEAM FIXED WIRELESS ACCESS CHANNELS filed on 7 Mar. 2018. The entire contents of the aforementioned patent applications are incorporated by reference as part of the disclosure of this patent document.

TECHNICAL FIELD

The present document relates to wireless communication, and more particularly, to aspects of channel estimation for orthogonal time frequency space (OTFS) modulation for wireless communications.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to perform channel estimation for orthogonal time frequency space (OTFS) modulation for wireless communications.

In one example aspect, a method for wireless communication is disclosed. The method may include performing channel training at a receiving wireless device based on reception of orthogonal pilots from multiple transmitting device antennas over a wireless channel; wherein the channel training includes determining second order statistics of time variations in the wireless channel.

In another example aspect, a method for wireless communication is disclosed. The method may include receiving, using multiple receive antennas, from a number of user devices, non-orthogonal pilots wherein at least some transmissions of the non-orthogonal pilots from different user devices overlap in at least some time and frequency resources, estimating individual pilots from the number of user devices by computing a pilot separation filter for each antenna, and estimating the wireless channel at time and frequency resources used by the non-orthogonal pilots by filtering the receiving signal at the multiple receiver antennas.

In yet another example aspect, a method for wireless communication is disclosed. The method may include scheduling a plurality of wireless devices to transmit orthogonal pilot signals and non-orthogonal pilot signals over a wireless channel in transmission subframes classified as past, current and future subframes with respect to a time at which the method is implemented, receiving the non-orthogonal pilots and separating contribution from each wireless device by applying a pilot separation filter, calculating and storing in memory a past covariance matrix, a future covariance matrix, and a cross-covariance matrix, determining a prediction filter using the past covariance matrix and the cross-covariance matrix, and using the prediction filter to estimate the wireless channel at a future time.

In yet another example aspect, a method for wireless communication is disclosed. The method may include receiving non-orthogonal pilot transmissions from a plurality of wireless devices based on a schedule, separating the non-orthogonal pilot transmissions by applying a pilot separation filter, computing corresponding channel responses for user antennas and storing a compressed version of the channel responses, estimating channel responses for an upcoming transmission subframe using channel reciprocity, and performing a signal transmission during the upcoming transmission subframe by precoding the signal transmission.

In yet another example aspect, a method for wireless communication is disclosed. The method may include receiving a schedule of transmissions from a network node, and performing transmission of non-orthogonal and orthogonal pilot signals by adhering to the schedule.

In yet another example aspect, a wireless communication apparatus that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIGS. 48-52 are flowchart representations of examples of wireless communication methods for channel estimation in OTFS systems.

FIG. 56 shows an example antenna configuration in which four transmit and four receive antennas are used at a network-side apparatus.

FIG. 57 shows an example antenna configuration in a user-side communications apparatus.

FIGS. 61-62 are flowchart representations of examples of wireless communication methods for using second-order statistics for FDD reciprocity.

FIGS. 69-70 are flowchart representations of examples of wireless communication methods for using second-order statistics for channel estimation.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. The terms "hub" and user equipment/device are used to refer to the transmitting side apparatus and the receiving side apparatus of a transmission, and each may take the form of a base station, a relay node, an access point, a small-cell access point, user equipment, and so on.

In the description, the example of a fixed wireless access (FWA) system is used only for illustrative purpose and the disclosed techniques can apply to other wireless networks.

While some descriptions here refer to FWA systems with orthogonal time frequency space (OTFS) as modulation/multiple access format, the techniques developed are suitable for other modulation/multiple access formats as well, in particular orthogonal frequency division multiplexing (OFDM) or OFDM-Access (OFDMA).

The present document describes various aspects of channel estimation for OTFS modulation for wireless communications, and is organized as follows: Section 1 provides an overview of OTFS modulation, and Section 2 covers the multiple access and precoding aspects of OTFS. Sections 3 provides an overview of channel estimation for OTFS systems, and Sections 4-7 describe the various aspects of the channel estimation process. Specifically, Section 4 covers pilot scheduling and transmission techniques that can be used to reduce overhead of pilot signal transmissions, Section 5 covers reciprocal calibration of a communication channel, and Sections 6 and 7 cover using second-order statistics for achieving reciprocity in frequency division duplexing (FDD) systems and efficient channel estimation, respectively.

Section 1: Overview of OTFS 1.1 OTFS Waveform Description

Figure 1:
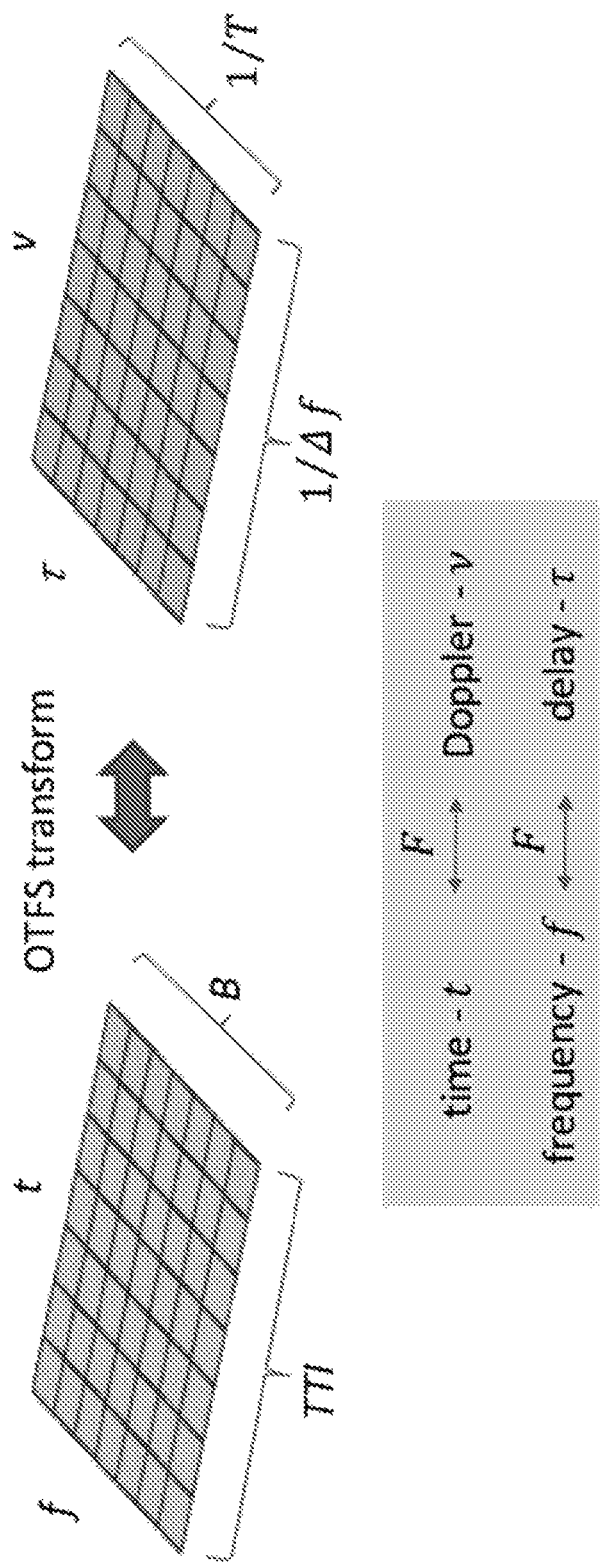
FIG. 1 shows an example of an OTFS transform.

Traditional OFDM modulation operates in the frequency-time domains. An OFDM resource elements (RE) occupies one subcarrier on one particular OFDM symbol. In contrast, OTFS modulation operates in the Delay spread-Doppler plane domains, which are related to frequency and time by the symplectic Fourier transform, a two-dimensional discrete Fourier transform. Similarly to single-carrier frequency domain multiple access (SC-FDMA), OTFS can be implemented as a preprocessing step on top of an underlying OFDM signal. FIG. 1 illustrates the relationships between different domains.

In OTFS, resource elements are defined in the delay-Doppler domains, which provide a two-dimensional grid similar to OFDM. The size of the delay-Doppler resource grid is related to the size of the frequency-time plane by the signal properties, e.g., bandwidth, frame duration, subcarrier spacing, and symbol length. These relationships are expressed by the following equalities:

$N_\tau = B/\Delta f$ $N_v = TTI/T$ where $N_\tau$ denotes the number of bins in the Delay Spread domain and $N_v$ the number of bins in the Doppler domain in the OTFS grid. B stands for the allocated bandwidth, $\Delta f$ is the subcarrier spacing, TTI is the frame duration (transmit time interval), and T is the symbol duration. In this example there is an exact matching between the delay spread and frequency domains, and, similarly, between the Doppler and time domains. Therefore, the number of delay dimensions equals the number of active subcarriers in the OFDM signal, while the number of Doppler dimensions equals the number of OFDM symbols in the frame.

An OTFS Physical Resource Block (PRB) can be defined as the number of symbols, also known as resource elements (RE) corresponding to a minimum resource allocation unit, defined in the Delay Spread-Doppler domain. For example, an OTFS PRB may be defined as a region occupying $N_{RB,\tau} \times N_{RB,v}$ RE, where, the total number of RE is $N_{RB} = N_{RB,\tau} N_{RB,v}$. Different OTFS PRB configurations might be considered. e.g. in one particular case a PRB may be defined to span $N_{RB,\tau} \times 1$ RE, e.g., this specific OTFS PRB occupies a single Doppler dimension.

Conversion to Time-Domain Samples

Denote the discrete OTFS signal in the delay-Doppler plane by x(k,l), which corresponds to the $k^{th}$ delay bin and $l^{th}$ Doppler bin. After the symplectic transform, the following signal is obtained in the frequency-time plane:

$$X[m, n] = \frac{1}{N_\tau N_v} \sum_{k=0}^{N_\tau-1} \sum_{l=0}^{N_v-1} x[k, l] e^{-j2\pi\left(\frac{mk}{N_\tau} - \frac{nl}{N_v}\right)}$$

Conversion to time domain samples can be executed in a number of ways.

In one embodiment, a conventional OFDM modulator is used to convert each symbol $X[m, 0], \ldots, X[m, N_v-1]$ to time domain samples. As part of the OFDM modulation process, a cyclic prefix may be added before the samples of each OFDM symbol.

In another embodiment, the OTFS signal is converted directly (e.g, without intermediate conversion to time-frequency plane) to time domain samples, by a single inverse Fourier Transform in the Doppler domain. Time domain samples are obtained by direct conversion as $$s[k + nN_\tau] = \frac{1}{N_v} \sum_{l=0}^{N_v-1} x[k, l] e^{j2\pi\left(\frac{nl}{N_v}\right)},$$

$k = 0 \ldots N_\tau - 1, n = 0 \ldots N_v - 1$

In this case, it is also possible to insert a cyclic prefix between blocks of $N_\tau$ samples, consisting of the last samples of the block. Alternatively, it is also possible to not insert a cyclic prefix and use a Guard Grid instead.

OTFS Uplink Resource Allocation Scheme

Figure 2:
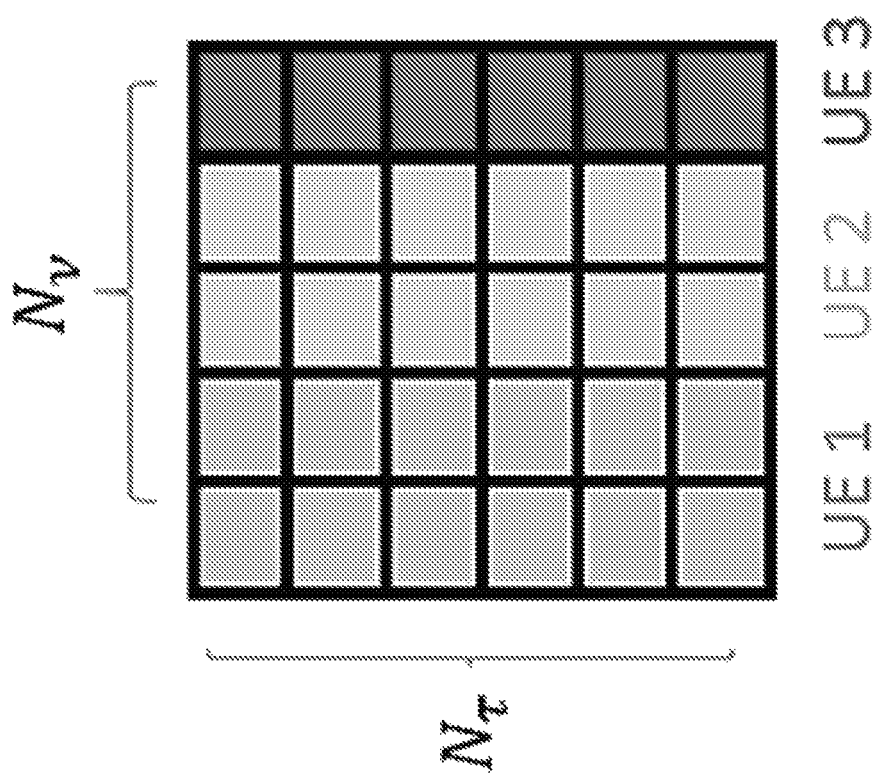
FIG. 2 shows an example of an OTFS allocation in the delay-spread and Doppler domain.
Figure 3:
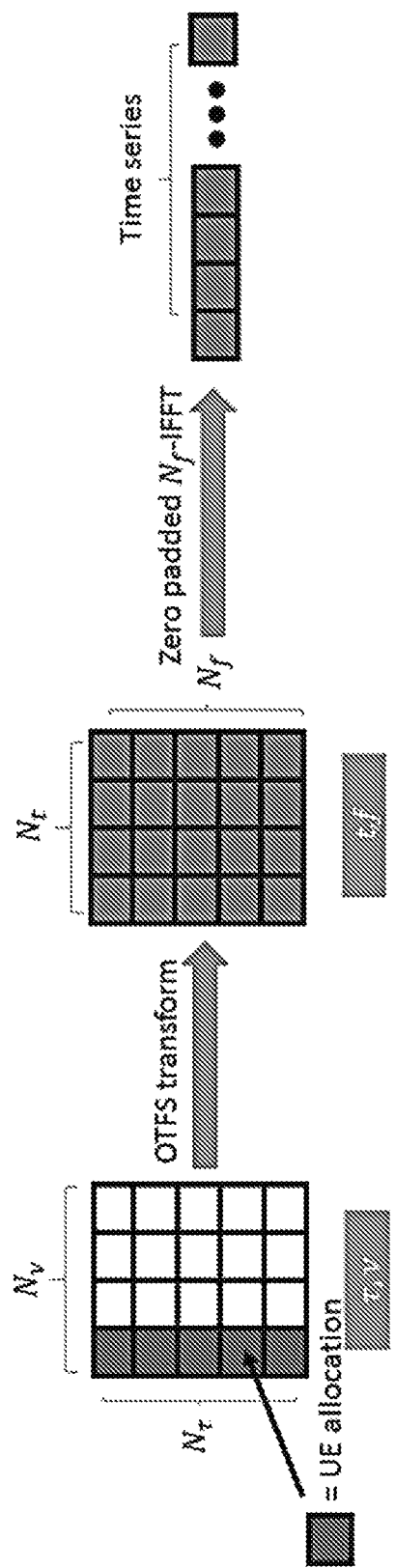
FIG. 3 shows another example of an OTFS allocation in the delay-spread and Doppler domain, and mapping to the time-frequency domain via the OTFS transform.

UEs may be allocated to disjoint Doppler slices of the delay-Doppler plane. An example is provided in FIG. 2. To modulate data, UEs first place a sequence of QAM symbols on their assigned resource elements, in the region of the delay-Doppler plane corresponding to their PRB allocation. Next, the UEs perform an OTFS transform to convert their data from delay-Doppler domains to time-frequency domains. Finally, the standard OFDM zero-padded IFFT generates a time series. This process which takes place in the transmitter can be seen in FIG. 3.

The proposed uplink scheme has, amongst other, at least two key benefits:

For small packets the PAPR of the time series is low (equivalent to SC-FDMA).

Packets can be spread across all of time and frequency thus achieving the full diversity of the channel yielding in higher reliability and enhanced link margins.

Low PAPR OTFS Waveform

In a multiuser system, RE are generally assigned to different users. When a user transmits, it fills the allocated RE with QAM symbols and the rest of RE with zeros. It is easily shown that OTFS may achieve very low PAPR if certain conditions are satisfied with the allocation of RE. In particular, when a user is allocated RE along a single Doppler dimension and on all delay dimensions, the PAPR can be reduced by several dB in some embodiment. DFT-spread OFDM signals are characterized by much lower PAPR when compared to OFDM signals. More details and derivations can be found in Appendix A1 of this document. Furthermore, when in a DFT-spread OFDM signal, the size of the DFT precoding transform equals the size of the subsequent inverse DFT in the OFDM modulator, the PAPR of a pure single carrier modulation is achieved.

In some embodiments, OTFS has low PAPR for small packets sizes. Assuming that a UE is allocated the first Doppler bin, then the transmitted OTFS satisfies $$x[k,l]=0, \forall k\neq 0$$

As a result, the signal after the symplectic transform simplifies to $$X[n,m] = \frac{1}{N_{S,\tau}N_{S,v}} \sum_{l=0}^{N_{S,\tau}-1} x[0,l]e^{-j2\pi\left(\frac{ml}{N_{S,\tau}}\right)}$$

Therefore, for any OFDM symbol n within the TTI, the signal in the frequency domain is the result of applying a DFT to the delay domain symbols, which is equivalent to the operation done by SC-FDMA. As a result, for symbol ii, the OTFS waveform is equivalent to a DFT-spread waveform (e.g., SC-FDMA), multiplied by a constant phase, which for this example is 0. Therefore, in terms of PAPR, OTFS also enjoys the benefits observed in SC-FDMA.

Overhead in OTFS

A significant source of overhead in OTFS stems from the insertion of a cyclic prefix between the underlying OFDM symbols, or blocks of $N_T$ samples. As an example, in LTE the overhead may be as high as 7%, or more if an extended cyclic prefix is used. This document discloses an overhead reduction technique, which reduces the overhead compared to a system using a cyclic prefix.

Frequency Diversity

Figure 4:
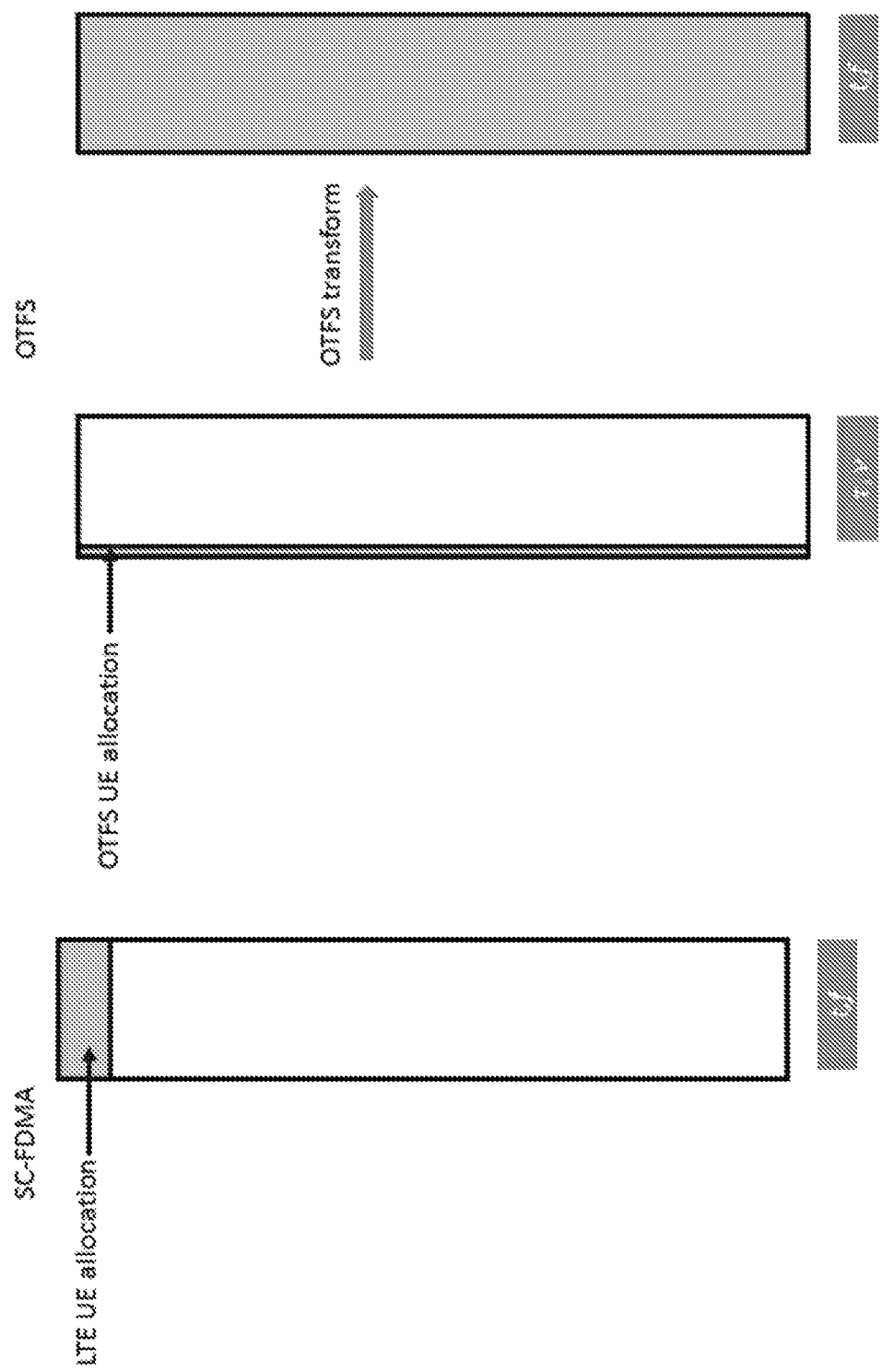
FIG. 4 shows an example of an OTFS allocation scheme in an uplink.

The OTFS modulation can spread each QAM symbol into different bandwidths (even over the full bandwidth) and TTI durations. Typically this spreading in frequency and time is larger than the one of OFDM and so often achieves the full diversity of the channel. In contrast, for small packets, SC-FDMA only transmits over a narrow bandwidth. The concept is illustrated in FIG. 4.

SC-FDMA cannot spread their allocation across frequency without always paying a penalty in pilot overhead (for the case of evenly spreading data across frequency) or increasing PAPR (for the case of unevenly spreading across frequency), whilst these effects can eventually be avoided by OTFS.

While both OTFS and SC-FDMA keep the PAPR at low levels, OTFS inherent frequency and time diversity extraction and the lack of such in SC-FDMA translates to performance superiority expressed as enhanced link budget and higher reliability of payload delivery.

Section 2: Multiple Access and Precoding in OTFS

Figure 5:
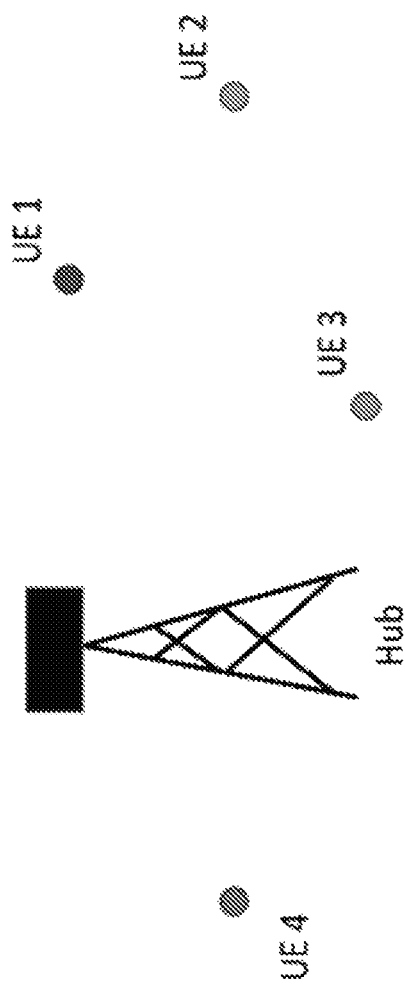
FIG. 5 depicts an example network configuration in which a hub services for user equipment (UE).

This section covers multiple access and precoding protocols that are used in typical OTFS systems. FIG. 5 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Figure 6:
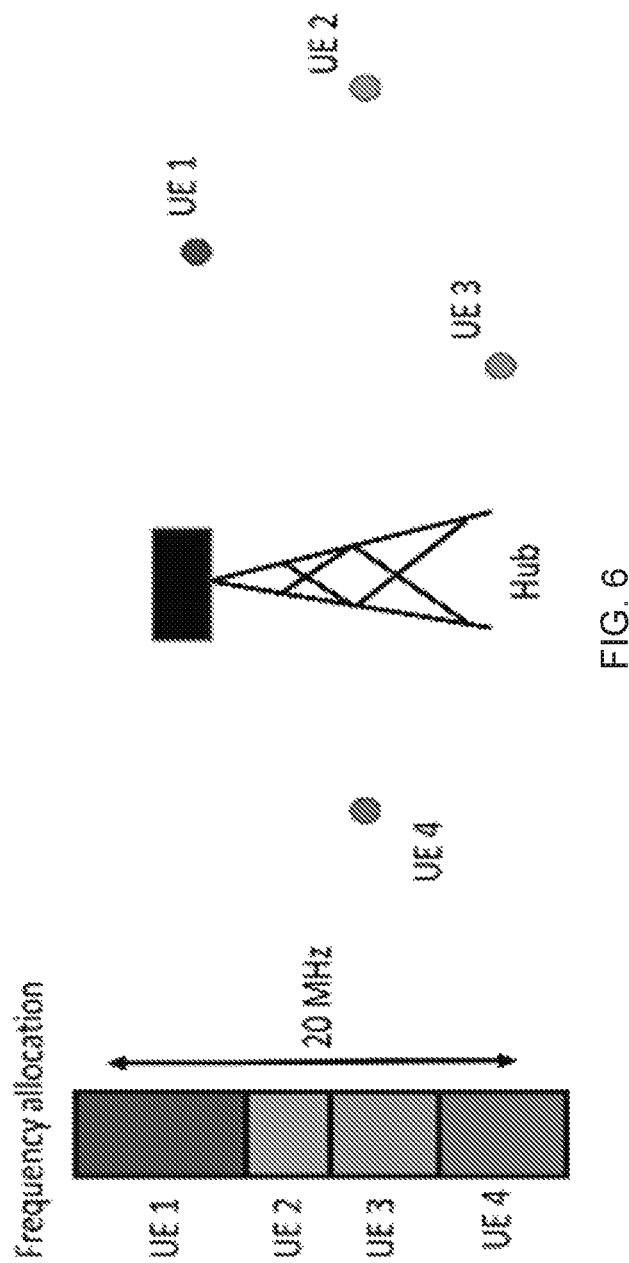
FIG. 6 depicts an example embodiment in which an orthogonal frequency division multiplexing access (OFDMA) scheme is used for communication.

Currently the common technique used for multiple access is orthogonal multiple access. This means that the hub breaks it's time and frequency resources into disjoint pieces and assigns them to the UEs. An example is shown in FIG. 6, where four UEs (UE1, UE2, UE3 and UE4) get four different frequency allocations and therefore signals are orthogonal to each other.

The advantage of orthogonal multiple access is that each UE experience its own private channel with no interference. The disadvantage is that each UE is only assigned a fraction of the available resource and so typically has a low data rate compared to non-orthogonal cases.

Precoding Multiple Access

Figure 7:
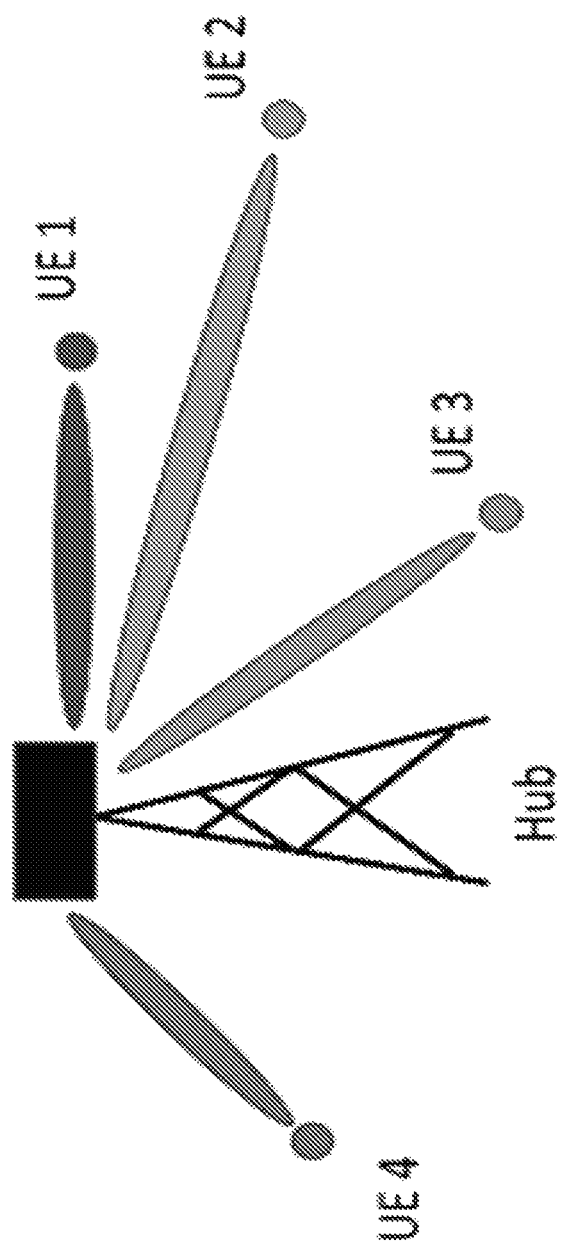
FIG. 7 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 7, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots, t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f,t) \in \mathbb{C}^{L_h}$ for $f=1, \ldots, N_f$ and $t=1, \ldots, N_t$.

Receive signal: for each time and frequency bin the UEs receive a signal which we denote by $y(f,t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance $N_0$. This document denotes the noise by $w(f,t) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f,t) \in \mathbb{C}^{L_u \times L_h}$ for $f=1, \ldots, N_f$ and $t=1, \ldots, N_t$.

Figure 8:
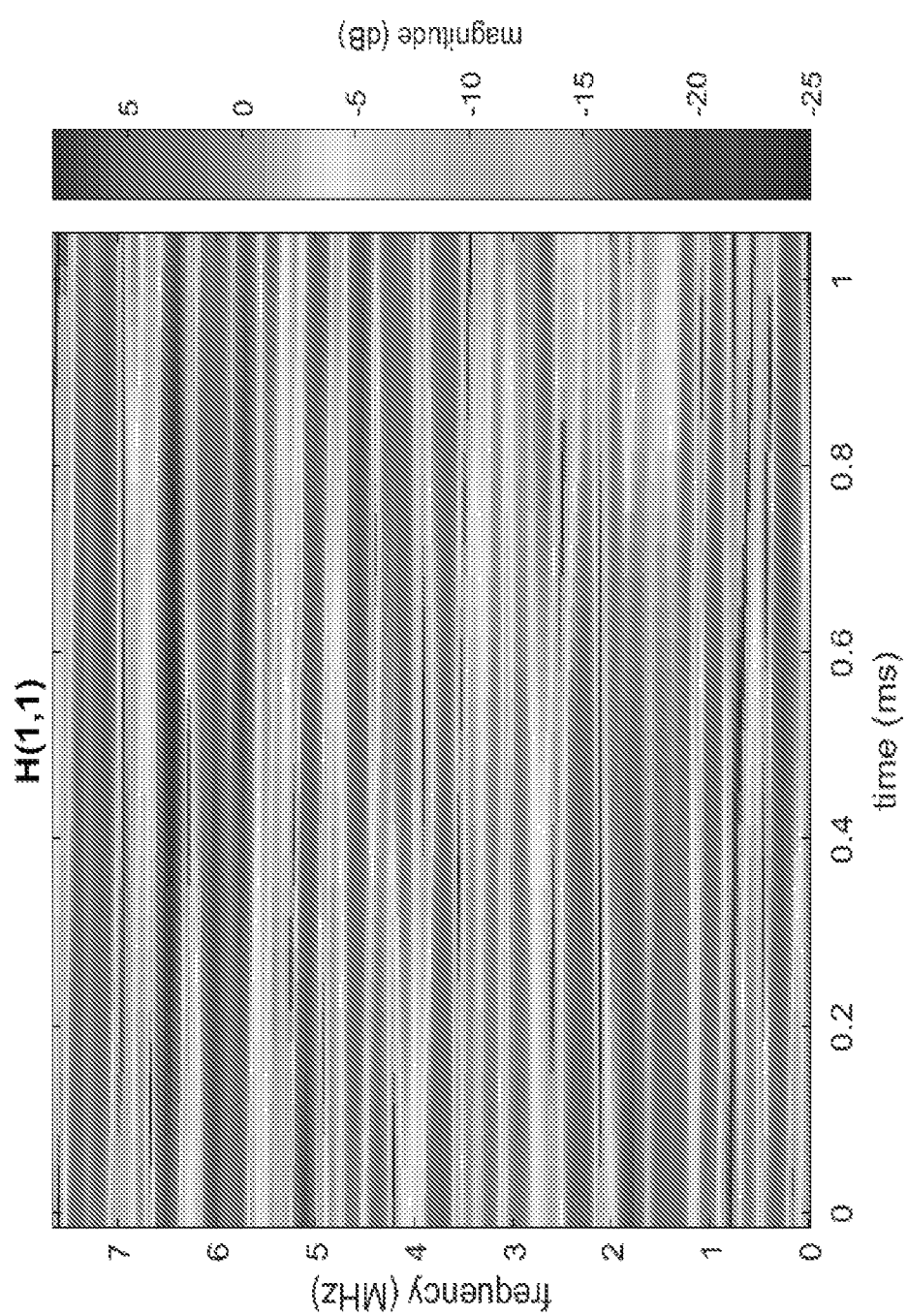
FIG. 8 is a spectral chart of an example of a wireless communication channel.

The wireless channel can be represented as a matrix which relates the transmit and receive signals through a simple linear equation:

$$y(f,t) = H(f,t)\varphi(f,t) + w(f,t) \quad (1)$$

for $f=1, \ldots, N_f$ and $t=1, \ldots, N_t$. FIG. 8 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 8.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f,t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f,t)p(f,t) + (w,t), \quad (2)$$

for $f=1, \ldots, N_f$ and $t=1, \ldots, N_t$. Because the pilot signal is known by the UEs, they can use signal processing to compute an estimate of the channel, denoted by $\hat{H}(f,t)$.

Feedback: the UEs quantize the channel estimates $\hat{H}(f,t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 9:
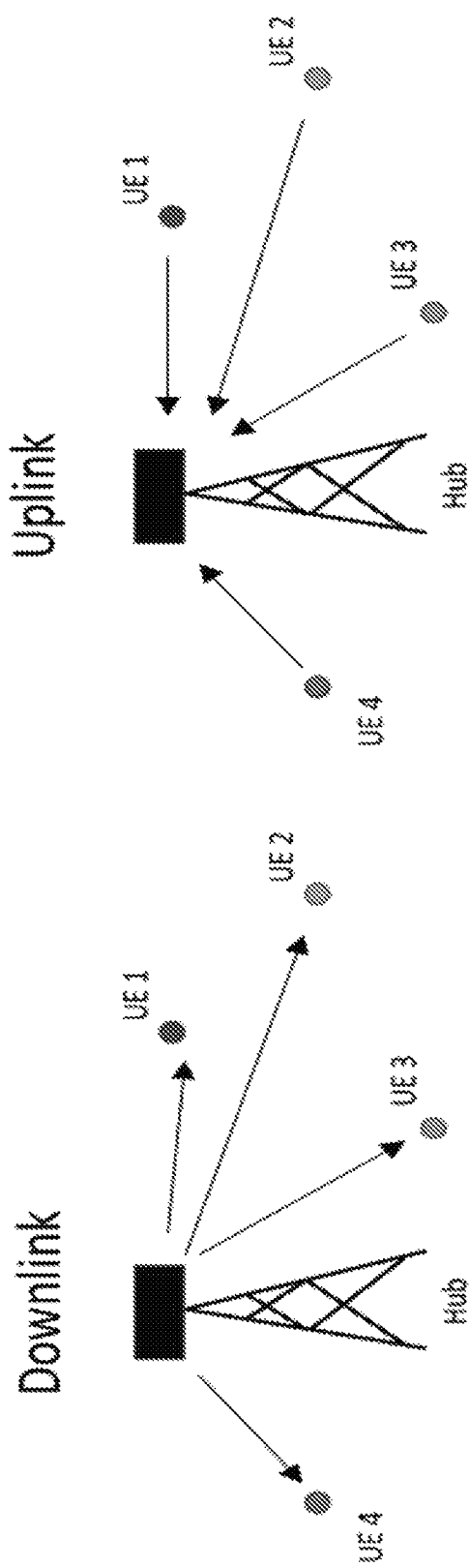
FIG. 9 illustrates examples of downlink and uplink transmission directions.

Implicit feedback is based on the principle of reciprocity which relates the uplink channel (UEs transmitting to the hub) to the downlink channel (hub transmitting to the UEs). FIG. 9 shows an example configuration of uplink and downlink channels between a hub and multiple UEs.

Specifically, denote the uplink and downlink channels by $H_{up}$ and $H$ respectively, then:

$$H(f,t) = A H_{up}^T(f,t) B, \quad (3)$$

for $f=1, \ldots, N_f$ and $t=1, \ldots, N_t$. Where $H_{up}^T(f,t)$ denotes the matrix transpose of the uplink channel. The matrices $A \in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f,t) = H_{up}^T(f,t) \quad (4)$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f,t) \in \mathbb{C}^{L_u}$ for $f=1, \ldots, N_f$ and $t=N_t$. Unlike data, the pilot signal is known at both the hub and the UEs.

Channel acquisition: for each time and frequency bin the hub receives the pilot signal distorted by the uplink channel and white noise:

$$H_{up}(f,t)p(f,t) + w(f,t) \quad (5)$$

for $f=1, \ldots, N_f$ and $t=1, \ldots, N_t$. Because the pilot signal is known by the hub, it can use signal processing to compute an estimate of the uplink channel, denoted by $\hat{H}_{up}(f,t)$. Because reciprocity calibration has been performed the hub can take the transpose to get an estimate of the downlink channel, denoted by $\hat{H}(f,t)$.

The advantage of implicit feedback is that it allows the hub to acquire channel knowledge with very little overhead; the disadvantage is that reciprocity calibration is difficult to implement.

Channel Prediction

Figure 10:
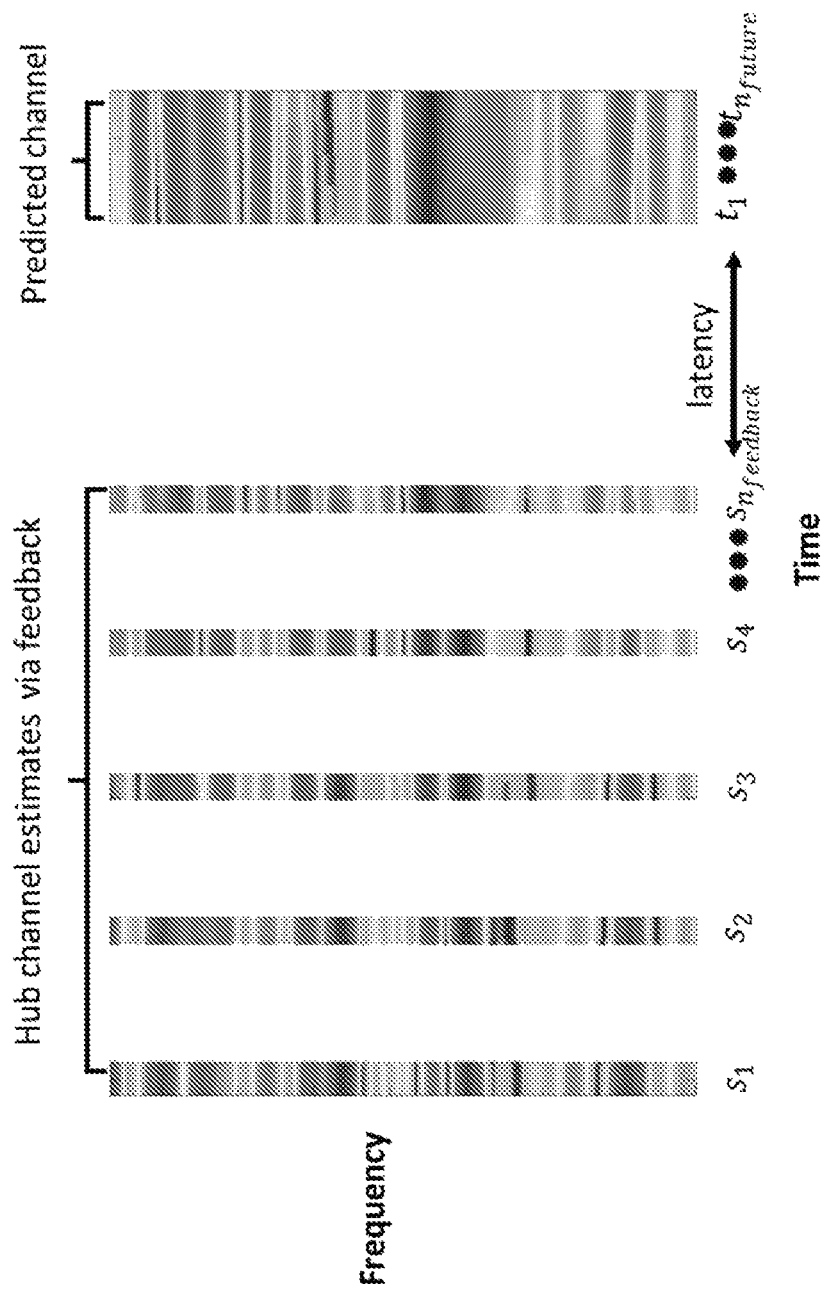
FIG. 10 illustrates spectral effects of an example of a channel prediction operation.

Using either explicit or implicit feedback, the hub acquires estimates of the downlink wireless channel at certain times denoted by $s_1, s_2, \ldots, s_n$ using these estimates it must then predict what the channel will be at future times when the precoding will be performed, denoted by $t_1, t_2, \ldots, t_m$. FIG. 10 shows this setup in which "snapshots" of channel are estimated, and based on the estimated snapshots, a prediction is made regarding the channel at a time in the future. As depicted in FIG. 10, channel estimates may be available across the frequency band at a fixed time slots, and based on these estimates, a predicated channel is calculated.

There are tradeoffs when choosing the feedback times $s_1, s_2, \ldots, s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future≈0.5 ms.

Bandlimited extrapolation: assumes the channel is a bandlimited function. If true, can extrapolated a short time into the future≈1 ms.

MUSIC extrapolation: assumes the channel is a finite sum of waves. If true, can extrapolate a long time into the future 10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f,t) \in \mathbb{C}^{L_u \times L_h}$ for $f=1, \ldots, N_f$ and $t=1, \ldots, N_t$.

Precoding filter: for each time and frequency bin the hub uses the channel estimate to construct a precoding filter which we denote by $W(f,t) \in \mathbb{C}^{L_h \times L_u}$ for $f=1, \ldots, N_f$ and $t=1, \ldots, N_t$.

Data: for each time and frequency bin the UE wants to transmit a vector of data to the UEs which we denote by $x(f,t) \in \mathbb{C}^{L_u}$ for $f=1, \ldots, N_f$ and $t=1, \ldots, N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f,t)x(f,t), \quad (6)$$

for $f=1, \ldots, N_f$ and $t=1, \ldots, N_t$. To ensure that the pre-coded data meets the hub energy constraints the hub applies normalization, transmitting:

$$\lambda W(f,t)x(f,t), \quad (7)$$

for $f=1, \ldots, N_f$ and $t=1, \ldots, N_t$. Where the normalization constant $\lambda$ is given by:

$$\lambda = \sqrt{\frac{N_f N_t L_h}{\sum_{f,t} \|W(f,t)x(f,t)\|^2}} \quad (8)$$

Receiver SNR

The pre-coded data then passes through the downlink channel, the UEs receive the following signal:

$$\lambda H(f,t)W(f,t)x(f,t)+w(f,t), \quad (9)$$

for $f=1, \ldots, N_f$ and $t=1, \ldots, N_t$. The UE then removes the normalization constant, giving a soft estimate of the data:

$$x_{soft}(f,t) = H(f,t)W(f,t)x(f,t) + \frac{1}{\lambda}w(f,t), \quad (10)$$

for $f=1, \ldots, N_f$ and $t=1, \ldots, N_t$. The error of the estimate is given by:

$$x_{soft}(f,t) - x(f,t) = H(f,t)W(f,t)x(f,t) - x(f,t) + \frac{1}{\lambda}w(f,t), \quad (11)$$

The error of the estimate can be split into two terms. The term $H(f,t)W(f,t)-x(f,t)$ is the interference experienced by the UEs while the term $$\frac{1}{\lambda}w(f,t)$$

gives the noise experienced by the UEs.

When choosing a pre-coding filter there is a tradeoff between interference and noise. We now review the two most popular pre-coder filters: zero-forcing and regularized zero-forcing.

Zero Forcing Precoder

Figure 11:
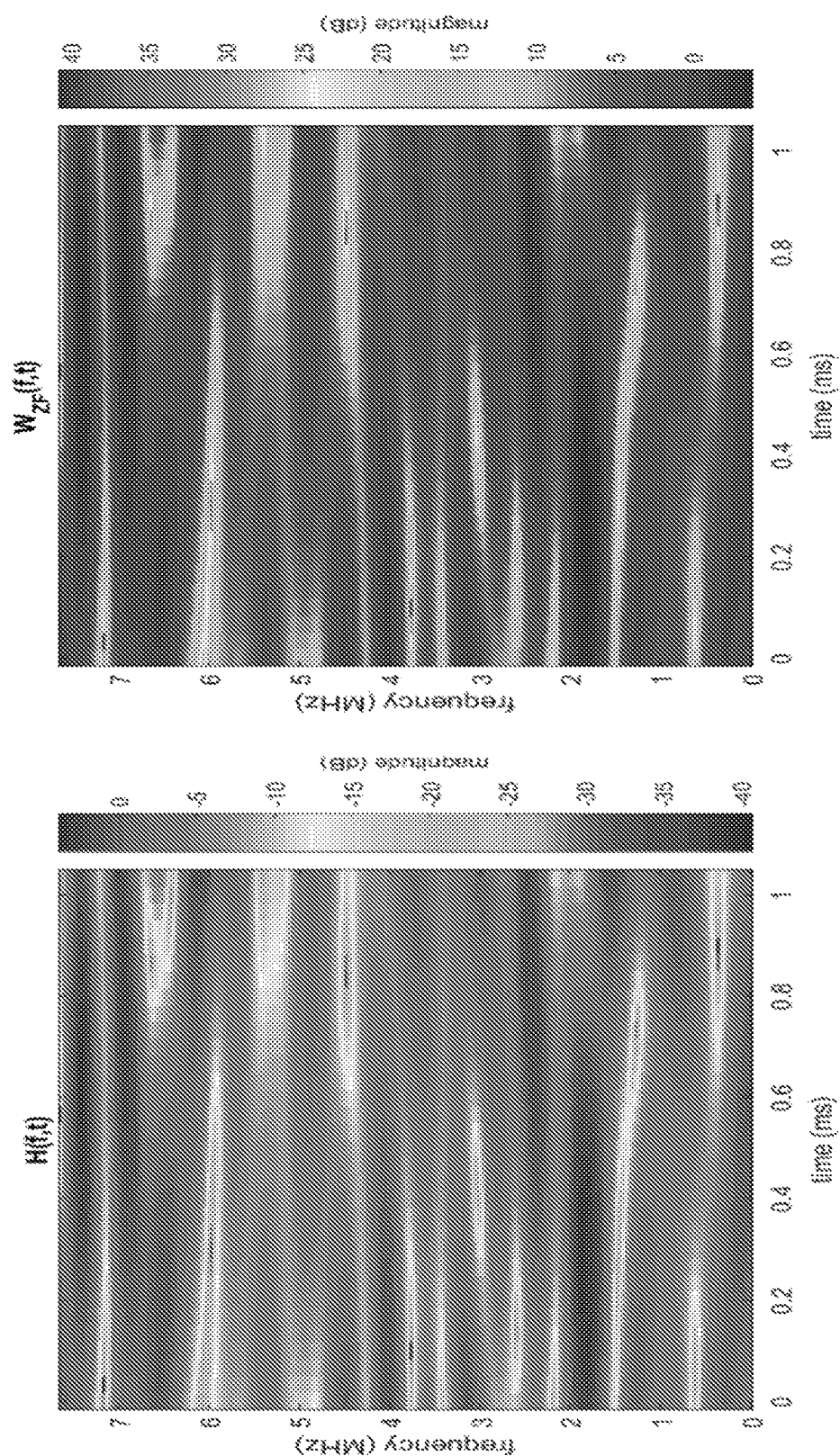
FIG. 11 graphically illustrates operation of an example implementation of a zero-forcing precoder (ZFP).

The hub constructs the zero forcing pre-coder (ZFP) by inverting its channel estimate:

$$W_{ZF}(f,t)=(\hat{H}^*(f,t)\hat{H}(f,t))^{-1}\hat{H}^*(f,t), \quad (12)$$

for $f=1, \ldots, N_1$ and $t=1, \ldots, N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate $\hat{H}(f,t)$ is very small the filter $W_{ZF}(f,t)$ will be very large, thus causing the normalization constant $\lambda$ to be very small giving large noise energy. FIG. 11 demonstrates this phenomenon for a SISO channel.

Regularized Zero-Forcing Pre-Coder (rZFP)

Figure 12:
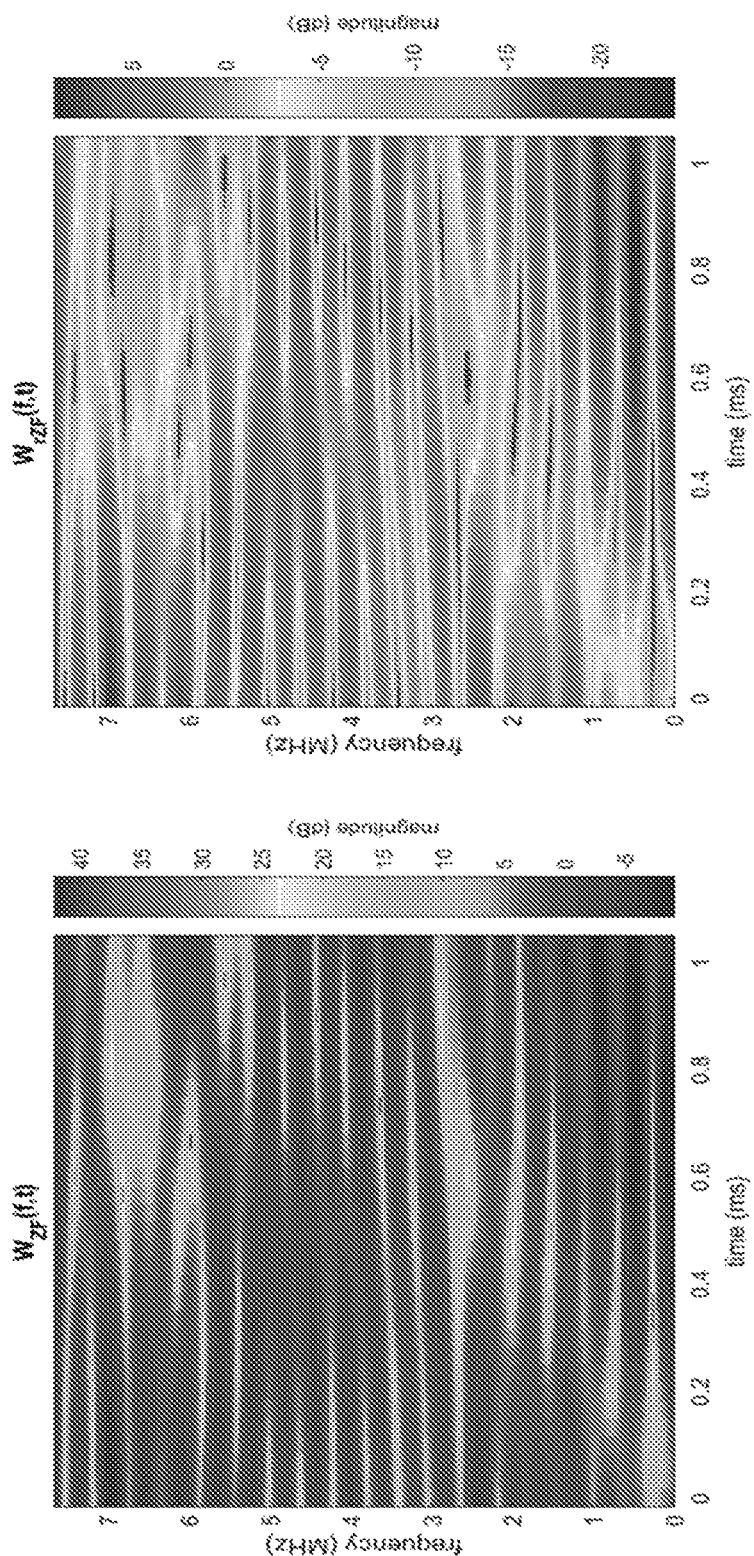
FIG. 12 graphically compares two implementations—a ZFP implementation and regularized ZFP implementation (rZFP).

To mitigates the effect of channel nulls (locations where the channel has very small energy) the regularized zero forcing precoder (rZFP) is constructed be taking a regularized inverse of its channel estimate:

$$W_{rZF}(f,t)=(\hat{H}^*(f,t)\hat{H}(f,t)+\alpha I)^{-1}\hat{H}^*(f,t), \quad (13)$$

for $f=1, \ldots, N_f$ and $t=1, \ldots, N_t$. Where $\alpha>0$ is the normalization constant. The advantage of rZFP is that the noise energy is smaller compared to ZPF. This is because rZFP deploys less energy in channel nulls, thus the normalization constant $\lambda$ is larger giving smaller noise energy. The disadvantage of rZFP is larger interference compared to ZFP. This is because the channel is not perfectly inverted (due to the normalization constant), so the UEs will experience residual interference. FIG. 12 demonstrates this phenomenon for a SISO channel.

Figure 13:
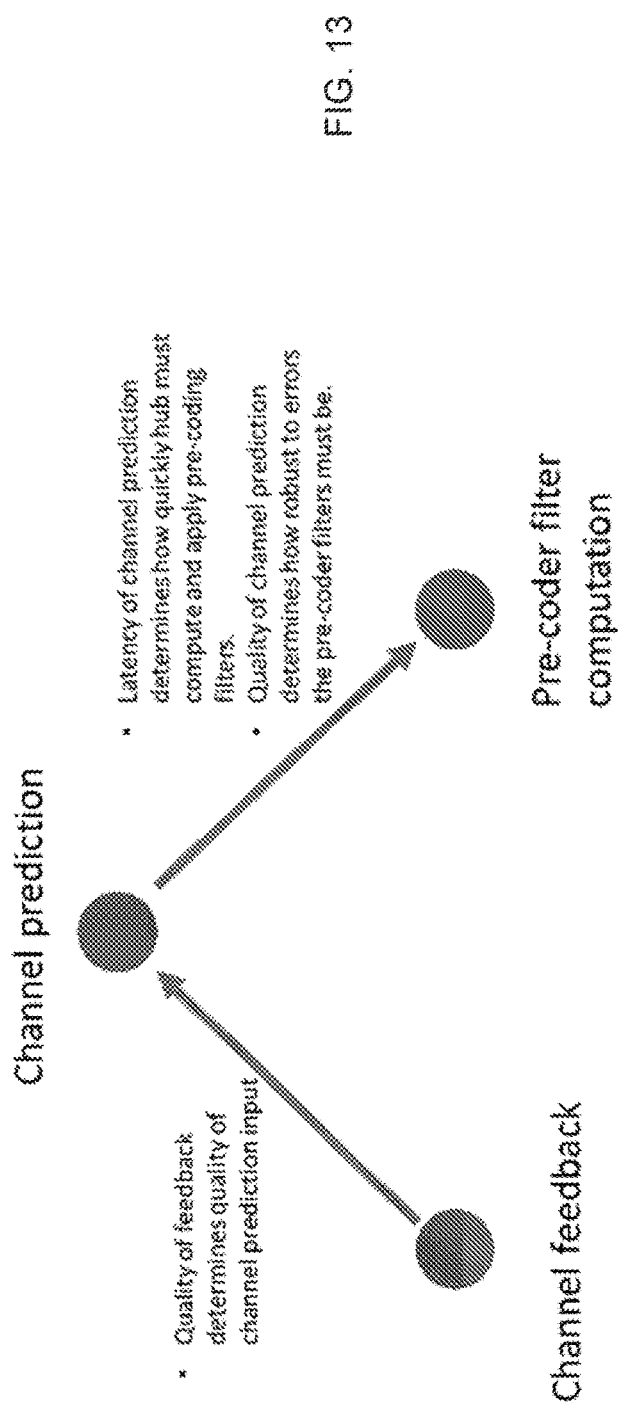
FIG. 13 shows components of an example embodiment of a precoding system.

As described above, there are three components to a precoding system: a channel feedback component, a channel prediction component, and a pre-coding filter component. The relationship between the three components is displayed in FIG. 13.

OTFS Precoding System

Various techniques for implementing OTFS precoding system are discussed. Some disclosed techniques can be used to provide the ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 14:
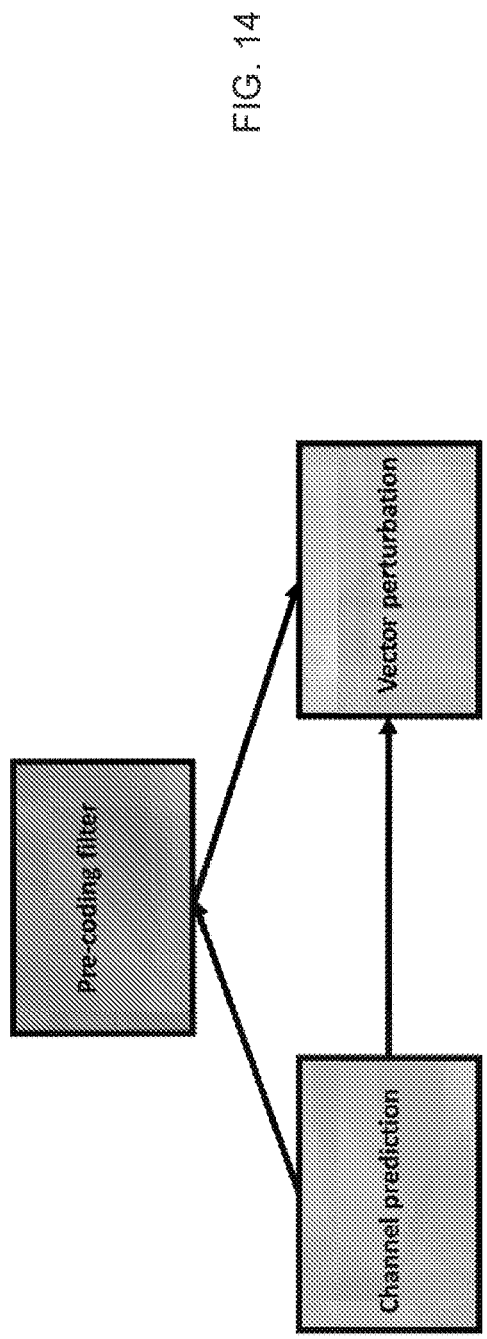
FIG. 14 is a block diagram depiction of an example of a precoding system.

Some embodiments may be described with reference to three main blocks, as depicted in FIG. 14.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

Review of OTFS Modulation

A modulation is a method to transmit a collection of finite symbols (which encode data) over a fixed allocation of time and frequency. A popular method used today is Orthogonal Frequency Division Multiplexing (OFDM) which transmits each finite symbol over a narrow region of time and frequency (e.g., using subcarriers and timeslots). In contrast, Orthogonal Time Frequency Space (OTFS) transmits each finite symbol over the entire allocation of time and frequency. Before going into details, we introduce terminology and notation.

We call the allocation of time and frequency a frame. We denote the number of subcarriers in the frame by $N_f$. We denote the subcarrier spacing by df. We denote the number of OFDM symbols in the frame by $N_t$. We denote the OFDM symbol duration by dt. We call a collection of possible finite symbols an alphabet, denoted by A.

A signal transmitted over the frame, denoted by φ, can be specified by the values it takes for each time and frequency bin:

$$\varphi(f,t) \in \mathbb{C}, \quad (14)$$

for f=1, ..., $N_f$ and t=1, ..., $N_t$.

Figure 15:
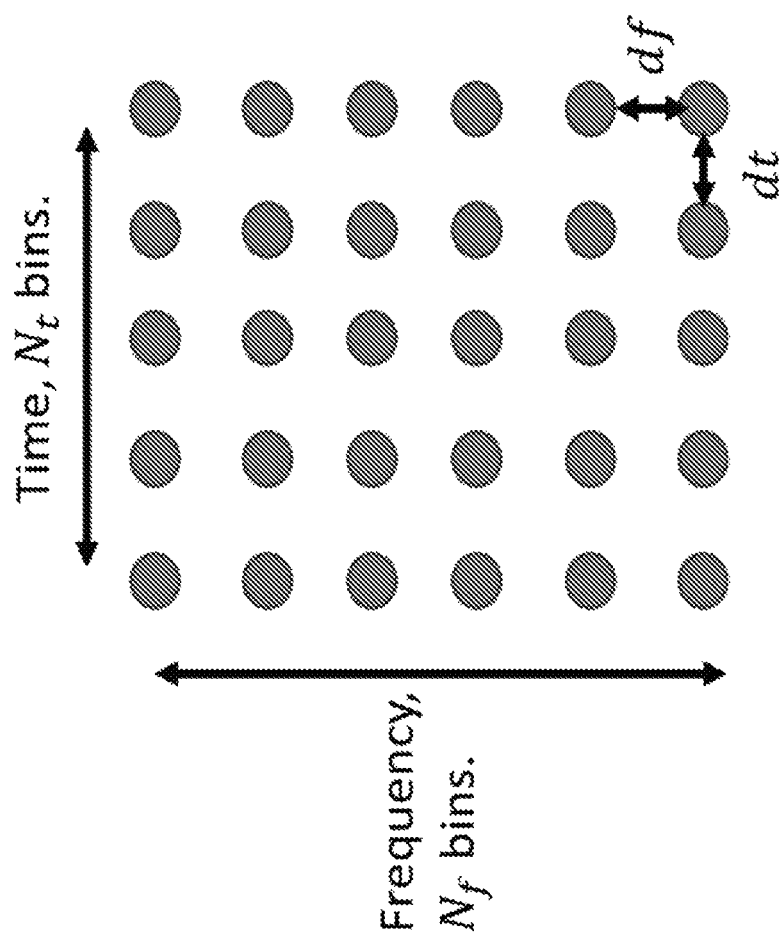
FIG. 15 shows an example of a quadrature amplitude modulation (QAM) constellation.
Figure 16:
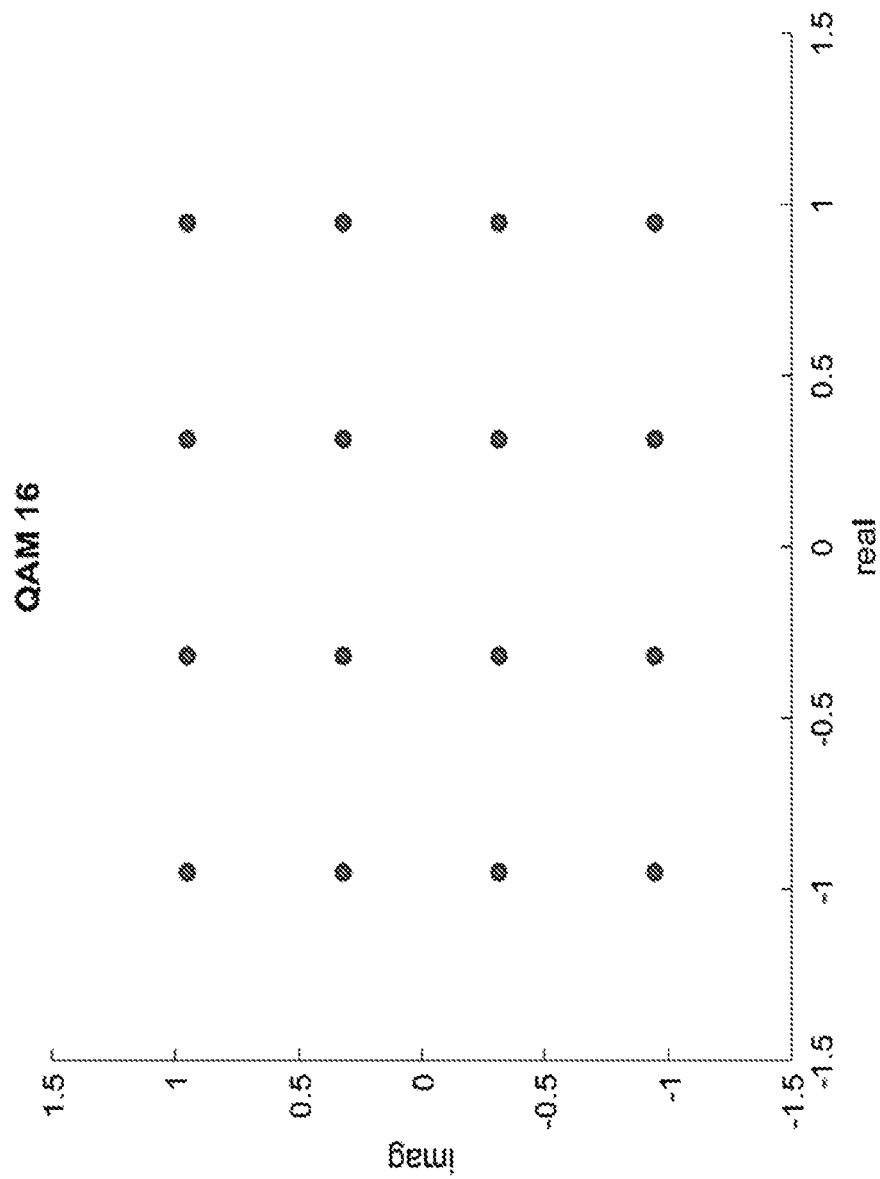
FIG. 16 shows another example of QAM constellation.

FIG. 15 shows an example of a frame along time (horizontal) axis and frequency (vertical) axis. FIG. 16 shows an example of the most commonly used alphabet: Quadrature Amplitude Modulation (QAM).

OTFS Modulation

Suppose a transmitter has a collection of $N_f N_t$ QAM symbols that the transmitter wants to transmit over a frame, denoted by:

$$x(f,t) \in A, \quad (15)$$

for f=1, ..., $N_f$ and t=1, ..., $N_t$. OFDM works by transmitting each QAM symbol over a single time frequency bin:

$$\varphi(f,t) = x(f,t), \quad (16)$$

for f=1, ..., $N_f$ and t=1, ..., $N_t$. The advantage of OFDM is its inherent parallelism, this makes many computational aspects of communication very easy to implement. The disadvantage of OFDM is fading, that is, the wireless channel can be very poor for certain time frequency bins. Performing pre-coding for these bins is very difficult.

The OTFS modulation is defined using the delay Doppler domain, which is relating to the standard time frequency domain by the two-dimensional Fourier transform.

The delay dimension is dual to the frequency dimension. There are $N_\tau$ delay bins with $N_\tau = N_f$. The Doppler dimension is dual to the time dimension. There are $N_v$ Doppler bins with $N_v = N_t$.

A signal in the delay Doppler domain, denoted by φ, is defined by the values it takes for each delay and Doppler bin:

$$\phi(\tau, v) \in \mathbb{C}, \quad (16)$$

for τ=1, ..., $N_\tau$ and v=1, ..., $N_v$.

Given a signal φ in the delay Doppler domain, some transmitter embodiments may apply the two-dimensional Fourier transform to define a signal φ in the time frequency domain:

$$\varphi(f,t) = (F\phi)(f,t), \quad (17)$$

for f=1, ..., $N_f$ and t=1, ..., $N_t$. Where F denotes the two-dimensional Fourier transform.

Conversely, given a signal φ in the time frequency domain, transmitter embodiments could apply the inverse two-dimensional Fourier transform to define a signal φ in the delay Doppler domain:

$$\phi(\tau, v) = (F^{-1}\varphi)(\tau, v), \quad (18)$$

for τ=1, ..., $N_\tau$ and v=1, ..., $N_v$.

Figure 17:
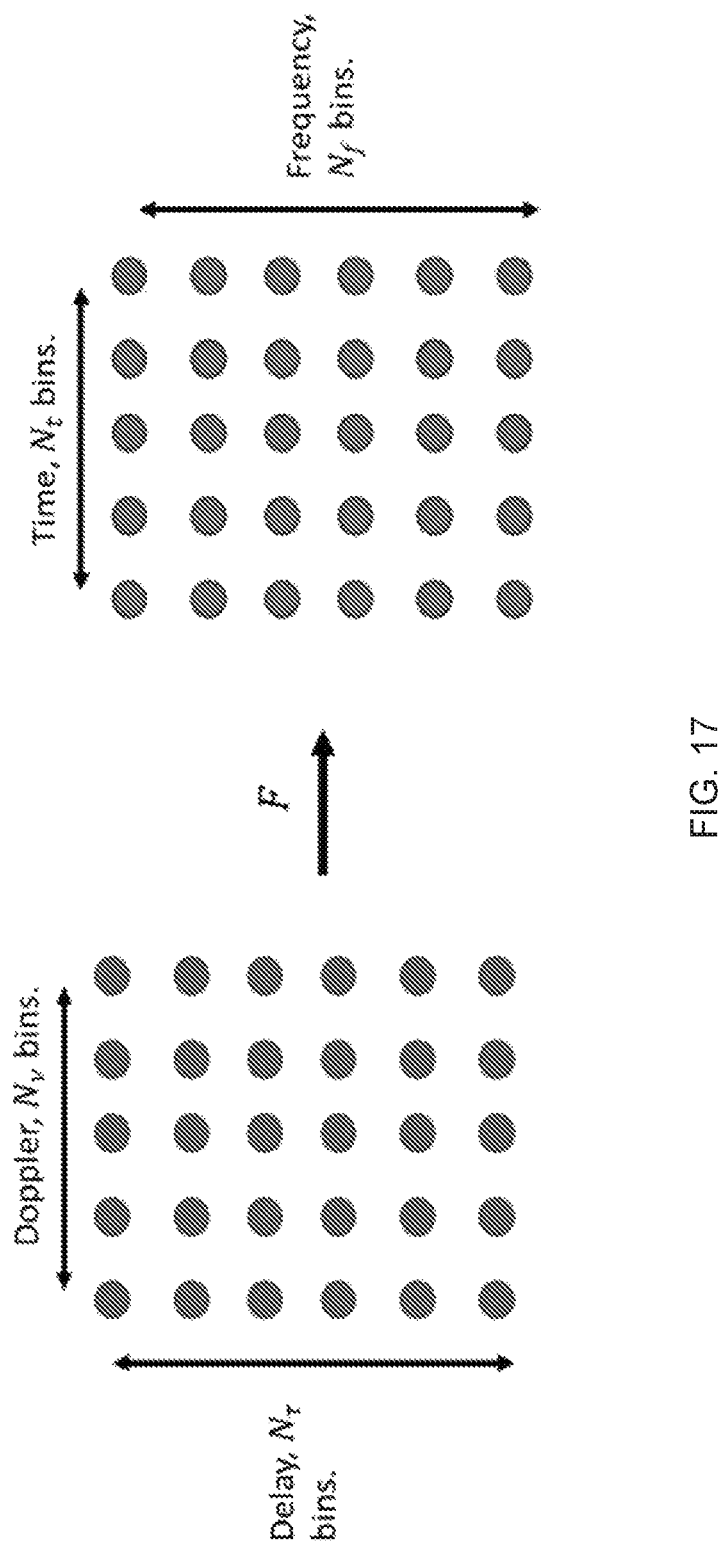
FIG. 17 pictorially depicts an example of relationship between delay-Doppler domain and time-frequency domain.

FIG. 17 depicts an example of the relationship between the delay Doppler and time frequency domains.

The advantage of OTFS is that each QAM symbol is spread evenly over the entire time frequency domain (by the two-two-dimensional Fourier transform), therefore each QAM symbol experience all the good and bad regions of the channel thus eliminating fading. The disadvantage of OTFS is that the QAM spreading adds computational complexity.

MMSE Channel Prediction

Figure 18:
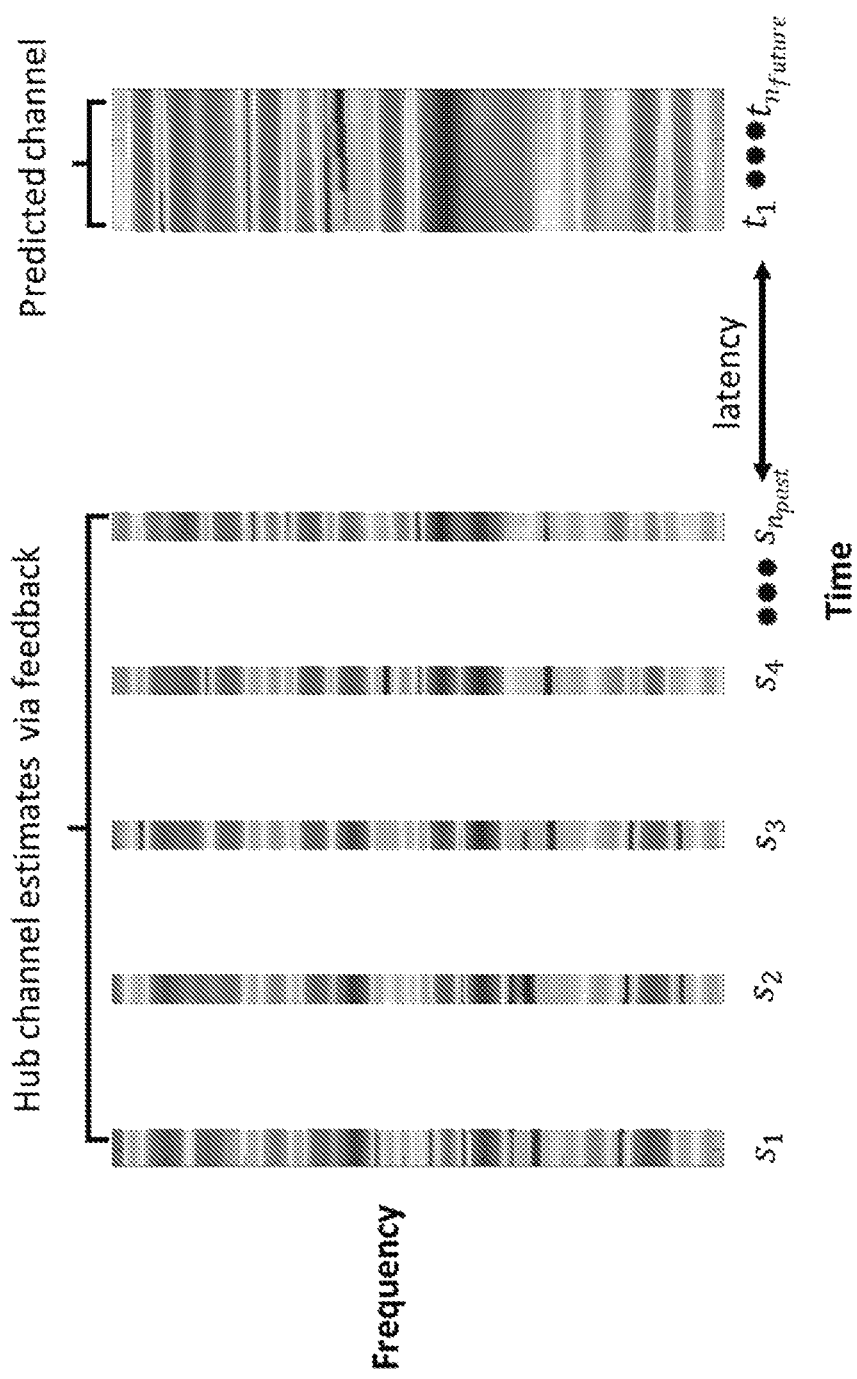
FIG. 18 is a spectral graph of an example of an extrapolation process.

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by u=1, ..., $L_u$. We denote the number frequency bins by $N_f$. We denote the number of feedback times by $n_{past}$. We denote the number of prediction times by $n_{future}$. FIG. 18 shows an example of an extrapolation process setup.

For each UE antenna, the channel estimates for all the frequencies, hub antennas, and feedback times can be combined to form a single $N_f L_h n_{past}$ dimensional vector. We denote this by:

$$\hat{H}_{past}(u) \in \mathbb{C}^{N_f L_h n_{past}}, \quad (19)$$

Likewise, the channel values for all the frequencies, hub antennas, and prediction times can be combined to form a single $N_f L_h n_{future}$ dimensional vector. We denote this by:

$$H_{future}(u) \in \mathbb{C}^{N_f L_h n_{future}}, \quad (20)$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates of $H_{future}(u)$. We denote them by: $\hat{H}_{past}(u)_i$ and $\hat{H}_{future}(u)_i$ for i=1, ..., N.

The hub computes an estimate of the covariance of $\hat{H}_{past}(u)$, which we denote by $\hat{R}_{past}(u)$:

$$\hat{R}_{past}(u) = \frac{1}{N} \sum_{i=1}^{N} \hat{H}_{past}(u)_i \hat{H}_{past}(u)_i^* \quad (21)$$

The hub computes an estimate of the covariance of $H_{future}(u)$, which we denote by $\hat{R}_{future}(u)$:

$$\hat{R}_{future}(u) = \frac{1}{N} \sum_{i=1}^{N} \hat{H}_{future}(u)_i \hat{H}_{future}(u)_i^* \quad (22)$$

The hub computes an estimate of the correlation between $H_{future}(u)$ and $\hat{H}_{past}(u)$, which we denote by $\hat{R}_{past,future}(u)$:

$$\hat{R}_{future,past}(u) = \frac{1}{N} \sum_{i=1}^{N} \hat{H}_{future}(u)_i \hat{H}_{past}(u)_i^* \quad (23)$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u)=\hat{R}_{future,past}(u)\hat{R}_{past}^{-1}(u), \tag{24}$$

Where C(u) denotes the MMSE prediction filter. The hub can now predict the channel by applying feedback channel estimates into the MMSE filter:

$$\hat{H}_{future}(u)=C(u)\hat{H}_{past}(u). \tag{25}$$

Prediction Error Variance

We denote the MMSE prediction error by $\Delta H_{future}(u)$, then:

$$H_{future}(u)=\hat{H}_{future}(u)+\Delta H_{future}(u). \tag{26}$$

We denote the covariance of the MMSE prediction error by $R_{error}(u)$, with:

$$R_{error}(u)=\mathbb{E}[\Delta H_{future}(u)\Delta H_{future}(u)^*]. \tag{27}$$

Using standard estimation theory, the empirical second order statistics can be used to compute an estimate of $R_{error}(u)$:

$$\hat{R}_{error}(u)=C(u)\hat{R}_{past}(u)C(u)^*-C(u)\hat{R}_{future,past}(u)^*-\hat{R}_{future,past}(u)C(u)^*+\hat{R}_{future}(u) \tag{28}$$

Simulation Results

Figure 19:
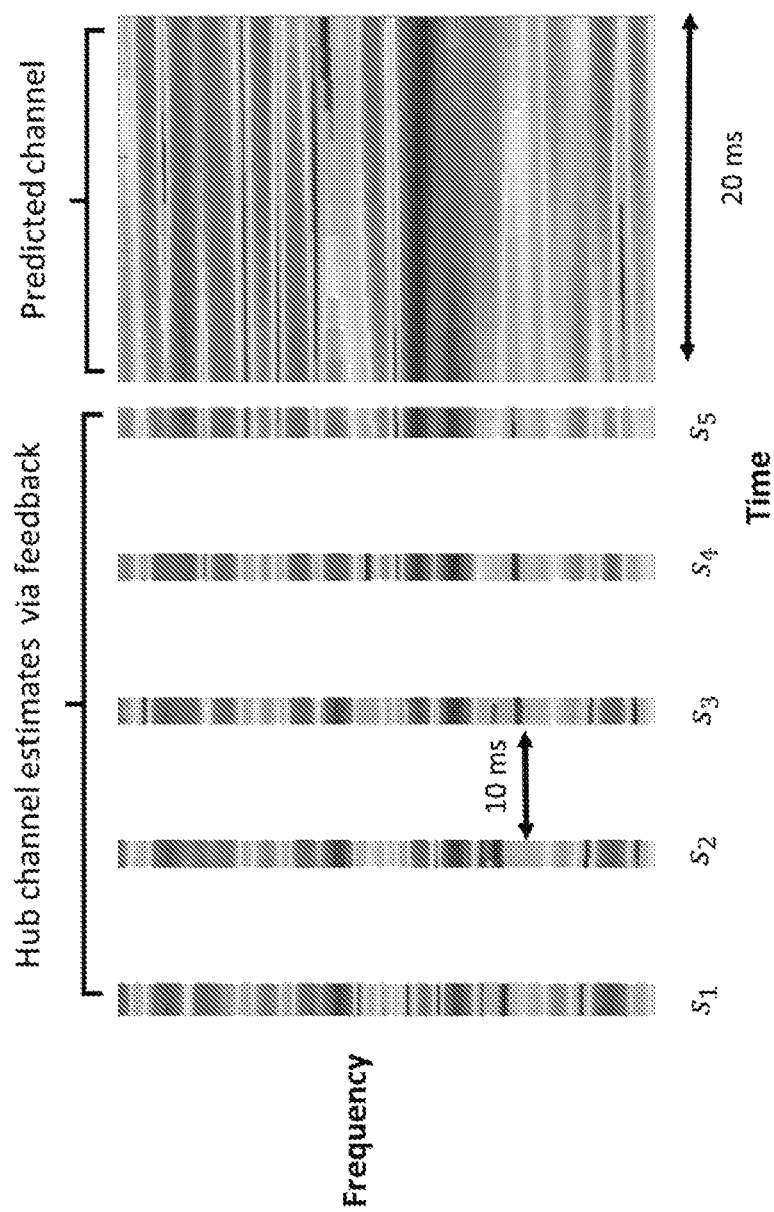
FIG. 19 is a spectral graph of another example of an extrapolation process.

We now present simulation results illustrating the use of the MMSE filter for channel prediction. Table 1 gives the simulation parameters and FIG. 19 shows the extrapolation setup for this example.

TABLE 1

| Subcarrier spacing | 15 kHz |
|---|---|
| Number of subcarriers | 512 |
| Delay spread | 3 μs |
| Doppler spread | 600 Hz |
| Number of channel feedback estimates | 5 |
| Spacing of channel feedback estimates | 10 ms |
| Prediction range | 0-20 ms into the future |

Figure 20:
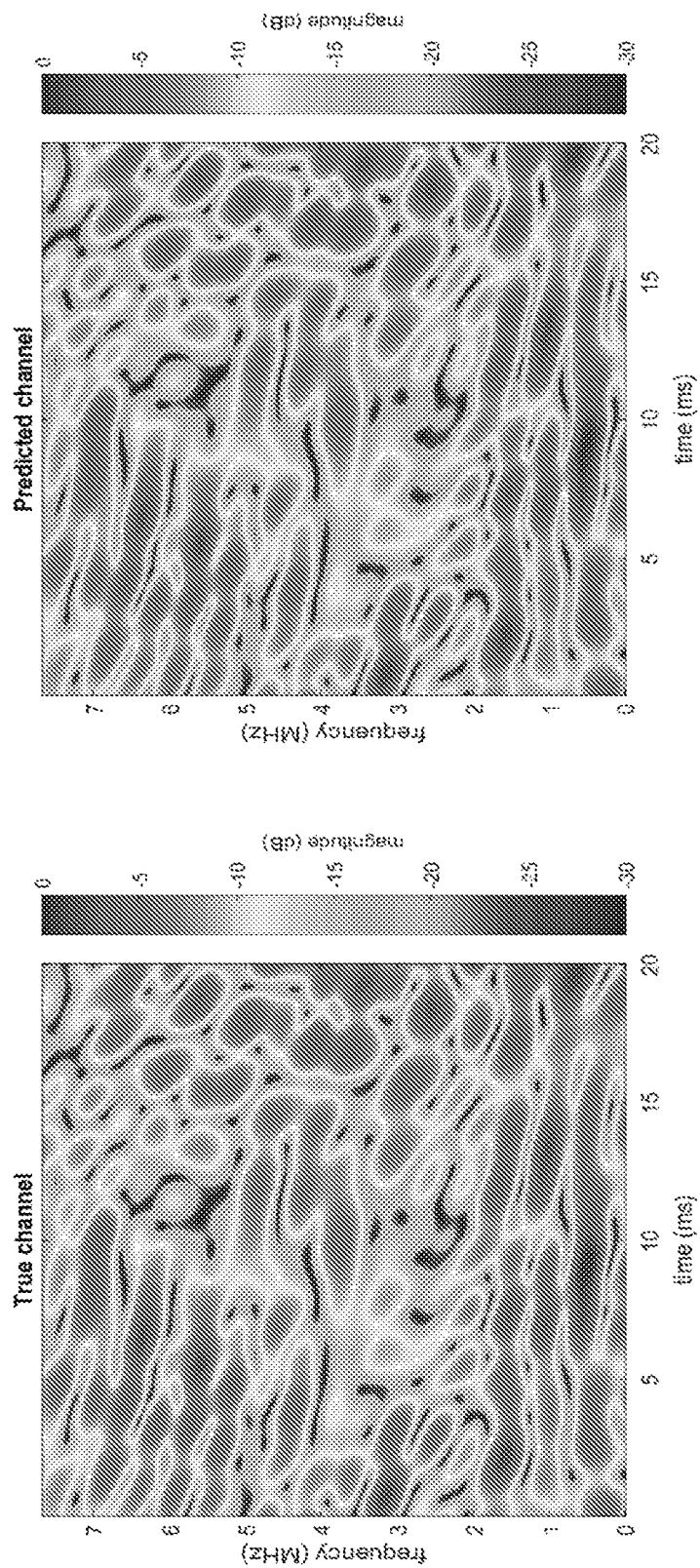
FIG. 20 compares spectra of a true and a predicted channel in some precoding implementation embodiments.

Fifty samples of $\hat{H}_{past}$ and $\hat{H}_{future}$ were used to compute empirical estimates of the second order statistics. The second order statistics were used to compute the MMSE prediction filter. FIG. 20 shows the results of applying the filter. The results have shown that the prediction is excellent at predicting the channel, even 20 ms into the future.

Block Diagrams

Figure 21:
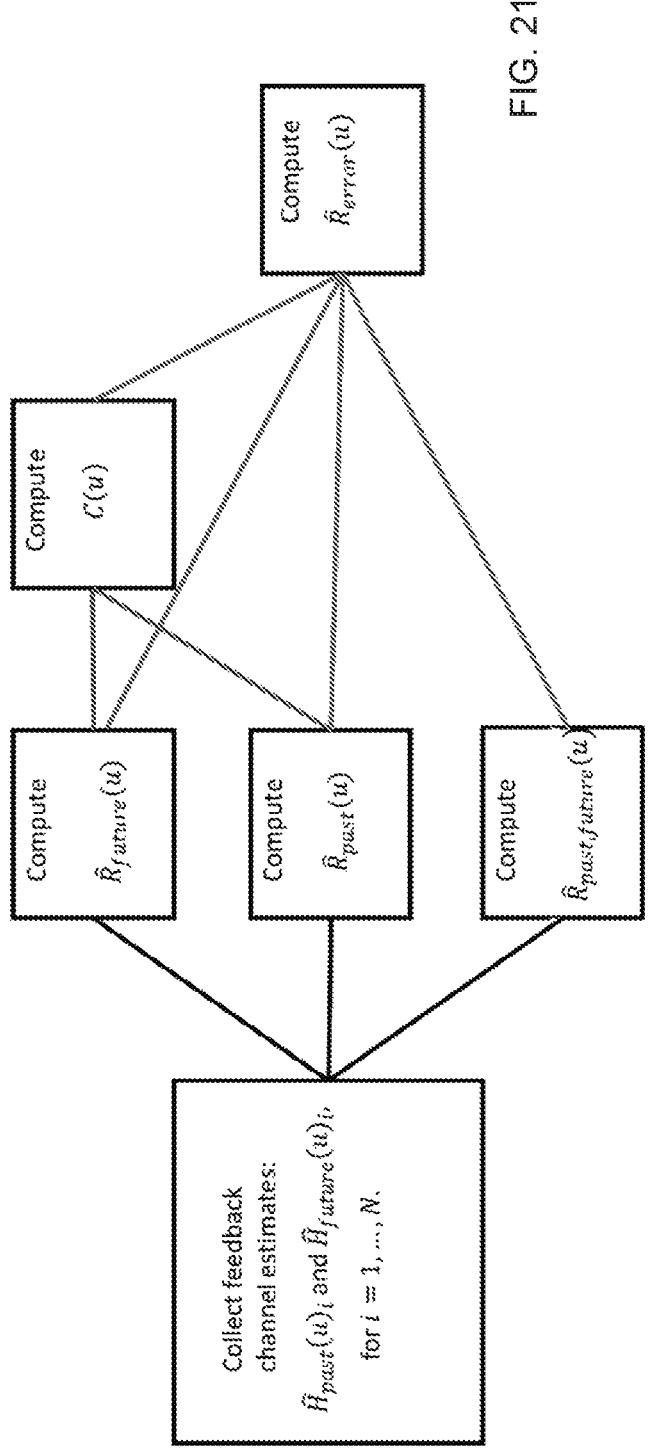
FIG. 21 is a block diagram depiction of a process for computing prediction filter and error covariance.

In some embodiments, the prediction is performed independently for each UE antenna. The prediction can be separated into two steps:

1) Computation of the MMSE prediction filter and prediction error covariance: the computation can be performed infrequently (on the order of seconds). The computation is summarized in FIG. 21. Starting from left in FIG. 21, first, feedback channel estimates are collected. Next, the past, future and future/past correlation matrices are computed. Next the filter estimate C(u) and the error estimate are computed.

Figure 22:
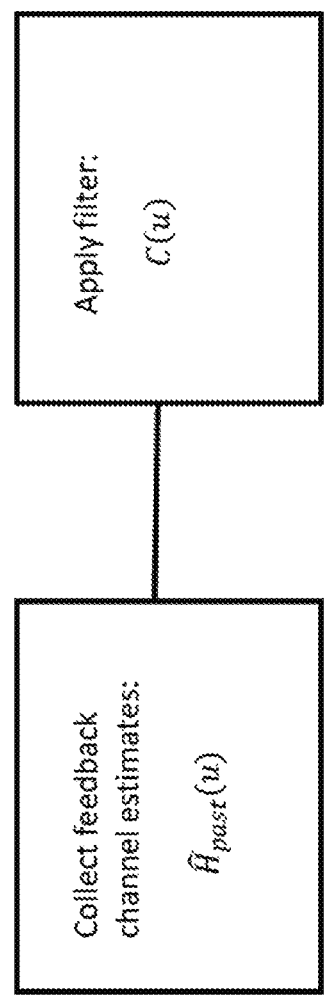
FIG. 22 is a block diagram illustrating an example of a channel prediction process.

2) Channel prediction: is performed every time precoding is performed. The procedure is summarized in FIG. 22.

Optimal Precoding Filter

Using MMSE prediction, the hub computes an estimate of the downlink channel matrix for the allocation of time and frequency the pre-coded data will be transmitted. The estimates are then used to construct precoding filters. Precoding is performed by applying the filters on the data the hub wants the UEs to receive. Embodiments may derive the "optimal" precoding filters as follows. Before going over details we introduce notation.

Frame (as defined previously): precoding is performed on a fixed allocation of time and frequency, with $N_f$ frequency bins and $N_t$ time bins. We index the frequency bins by: f=1, ..., $N_f$. We index the time bins by t=1, ..., $N_t$.

Channel estimate: for each time and frequency bin the hub has an estimate of the downlink channel which we denote by $\hat{H}(f,t) \in \mathbb{C}^{L_u \times L_h}$.

Error correlation: we denote the error of the channel estimates by $\Delta H(f,t)$, then:

$$H(f,t)=\hat{H}(f,t)+\Delta H(f,t), \tag{29}$$

We denote the expected matrix correlation of the estimation error by $R_{\Delta H}(f,t) \in \mathbb{C}^{L_u \times L_h}$, with:

$$R_{\Delta H}(f,t)=\mathbb{E}[\Delta H(f,t)^*\Delta H(f,t)]. \tag{30}$$

The hub can be easily compute these using the prediction error covariance matrices computed previously: $\hat{R}_{error}(u)$ for u=1, ..., $L_u$.

Signal: for each time and frequency bin the UE wants to transmit a signal to the UEs which we denote by $s(f,t) \in \mathbb{C}^{L_u}$.

Precoding filter: for each time and frequency bin the hub uses the channel estimate to construct a precoding filter which we denote by $W(f,t) \in \mathbb{C}^{L_h \times L_u}$.

White noise: for each time and frequency bin the UEs experience white noise which we denote by $n(f,t) \in \mathbb{C}^{L_u}$. We assume the white noise is iid Gaussian with mean zero and variance $N_0$.

Hub Energy Constraint

When the precoder filter is applied to data, the hub power constraint may be considered. We assume that the total hub transmit energy cannot exceed $N_f N_t L_h$. Consider the precoded data:

$$W(f,t)s(f,t), \tag{31}$$

To ensure that the pre-coded data meets the hub energy constraints the hub applies normalization, transmitting:

$$\lambda W(f,t)s(f,t), \tag{32}$$

Where the normalization constant A is given by:

$$\lambda = \sqrt{\frac{N_f N_t L_h}{\Sigma_{f,t}\|W(f,t)s(f,t)\|^2}} \tag{33}$$

Receiver SINR

The pre-coded data then passes through the downlink channel, the UEs receive the following signal:

$$\lambda H(f,t)W(f,t)s(f,t)+n(f,t), \tag{34}$$

The UEs then removes the normalization constant, giving a soft estimate of the signal:

$$s_{soft}(f, t) = H(f, t)W(f, t)s(f, t) + \frac{1}{\lambda}n(f, t). \quad (35)$$

The error of the estimate is given by:

$$s_{soft}(f, t) - s(f, t) = H(f, t)W(f, t)s(f, t) - s(f, t) + \frac{1}{\lambda}n(f, t). \quad (36)$$

The error can be decomposed into two independent terms: interference and noise. Embodiments can compute the total expected error energy:

$$\begin{aligned}
\text{expected error energy} &= \sum_{f=1}^{N_f}\sum_{t=1}^{N_t}\mathbb{E}\|s_{soft}(f, t) - s(f, t)\|^2 \quad (37) \\
&= \sum_{f=1}^{N_f}\sum_{t=1}^{N_t}\mathbb{E}\|H(f, t)W(f, t)s(f, t) - \\
&\quad s(f, t)\|^2 + \frac{1}{\lambda^2}\mathbb{E}\|n(f, t)\|^2 \\
&= \sum_{f=1}^{N_f}\sum_{t=1}^{N_t}(\hat{H}(f, t)W(f, t)s(f, t) - \\
&\quad s(f, t))^*(\hat{H}(f, t)W(f, t)s(f, t) - \\
&\quad s(f, t)) + (W(f, t)s(f, t))^*\Big(R_{\Delta H}(f, t) + \\
&\quad \frac{N_0 L_u}{L_h}I\Big)(W(f, t)s(f, t))
\end{aligned}$$

Optimal Precoding Filter

We note that the expected error energy is convex and quadratic with respect to the coefficients of the precoding filter. Therefore, calculus can be used to derive the optimal precoding filter:

$$W_{opt}(f, t) = \left(\hat{H}(f, t)^*\hat{H}(f, t) + R_{\Delta H}(f, t) + \frac{N_0 L_u}{L_h}I\right)^{-1}\hat{H}(f, t)^* \quad (38)$$

Accordingly, some embodiments of an OTFS precoding system use this filter (or an estimate thereof) for precoding.

Simulation Results

Figure 23:
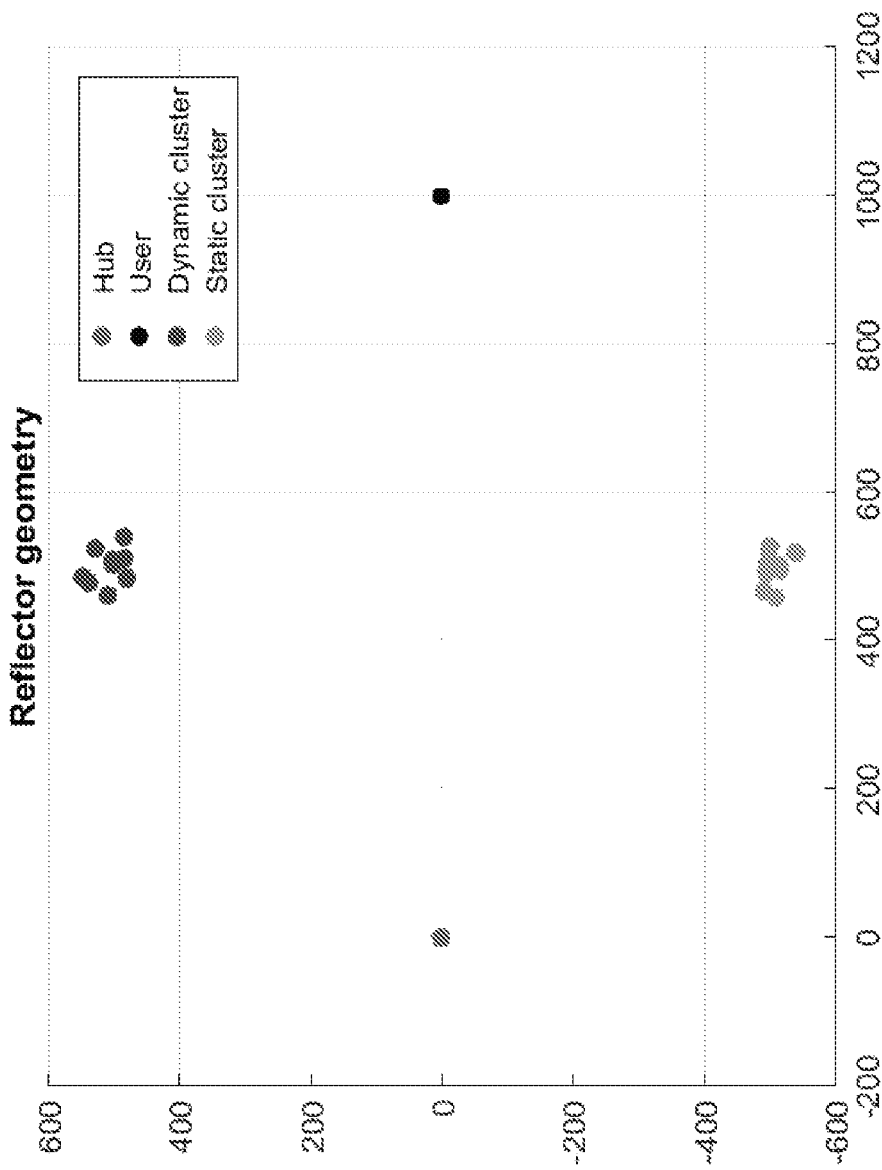
FIG. 23 is a graphical depiction of channel geometry of an example wireless channel.
Figure 24A:
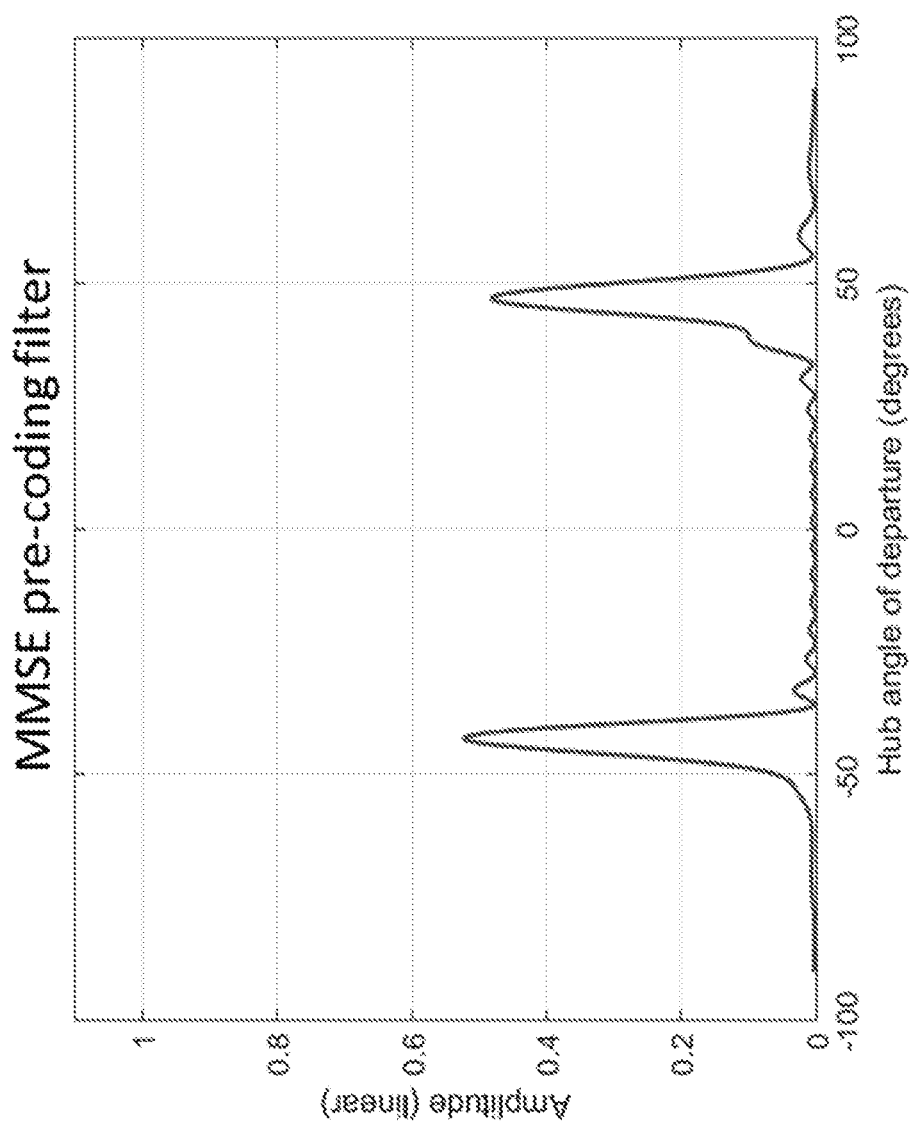
FIG. 24A is a graph showing an example of a precoding filter antenna pattern.

We now present a simulation result illustrating the use of the optimal precoding filter. The simulation scenario was a hub transmitting data to a single UE. The channel was non line of sight, with two reflector clusters: one cluster consisted of static reflectors, the other cluster consisted of moving reflectors. FIG. 23 illustrates the channel geometry, with horizontal and vertical axis in units of distance. It is assumed that the hub has good Channel Side Information (CSI) regarding the static cluster and poor CSI regarding the dynamic cluster. The optimal precoding filter was compared to the MMSE precoding filter. FIG. 24A displays the antenna pattern given by the MMSE precoding filter. It can be seen that the energy is concentrated at ±45°, that is, towards the two clusters. The UE SINR is 15.9 dB, the SINR is relatively low due to the hub's poor CSI for the dynamic cluster.

Figure 24B:
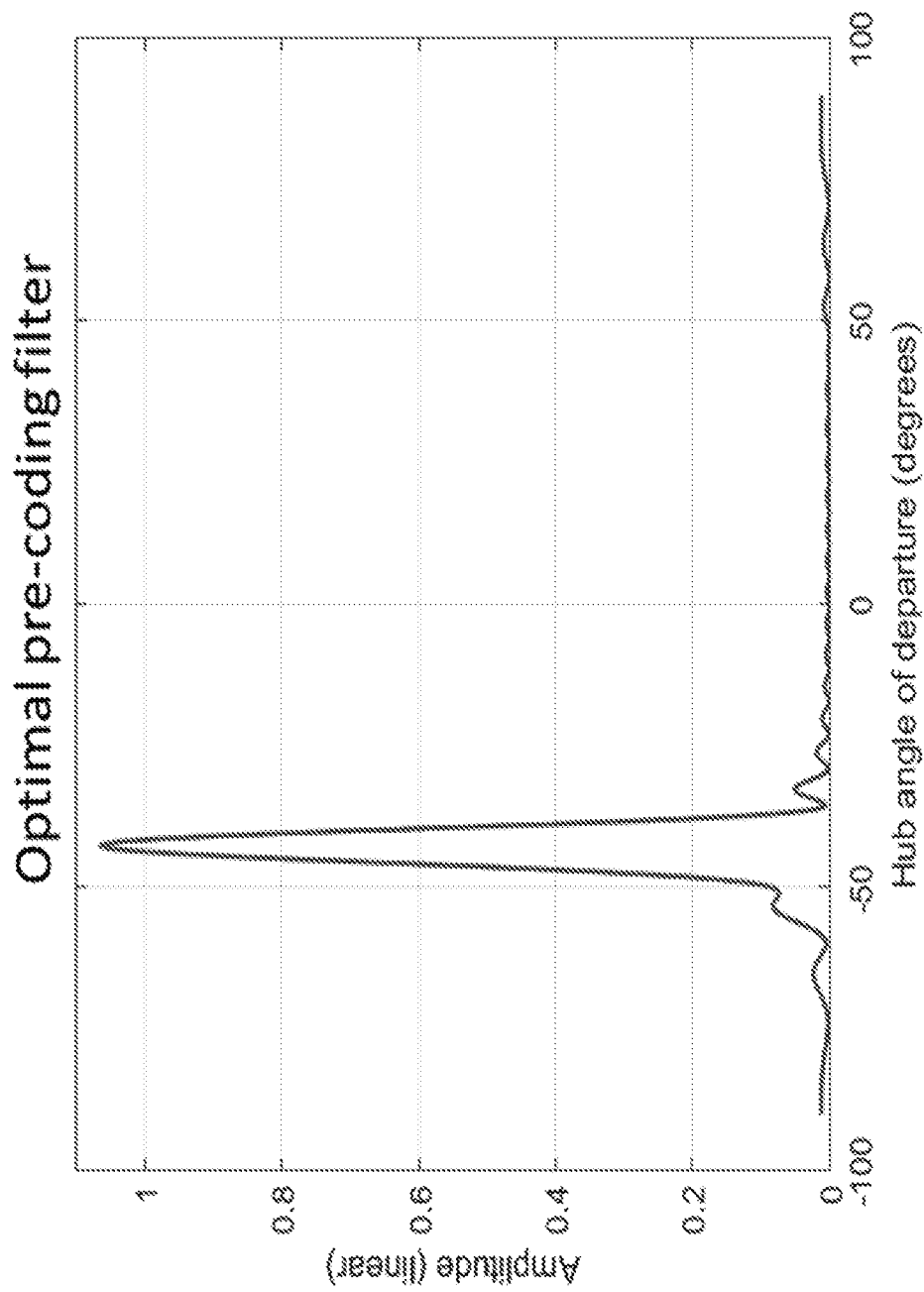
FIG. 24B is a graph showing an example of an optical pre-coding filter.

FIG. 24B displays the antenna pattern given by the optimal precoding filter as described above, e.g., using equation (38). In this example, the energy is concentrated at −45°, that is, toward the static cluster. The UE SINR is 45.3 dB, the SINR is high (compared to the MMSE case) due to the hub having good CSI for the static reflector.

The simulation results depicted in FIGS. 24A and 24B illustrate the advantage of the optimal pre-coding filter. The filter it is able to avoid sending energy towards spatial regions of poor channel CSI, e.g., moving regions.

Example Block Diagrams

Figure 25:
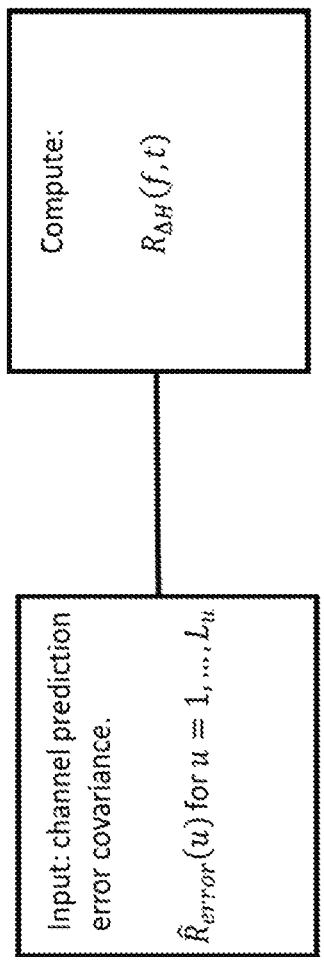
FIG. 25 is a block diagram showing an example process of error correlation computation.

Precoding is performed independently for each time frequency bin. The precoding can be separated into three steps:

[1] Computation of error correlation: the computation be performed infrequently (on the order of seconds). The computation is summarized in FIG. 25.

Figure 26:
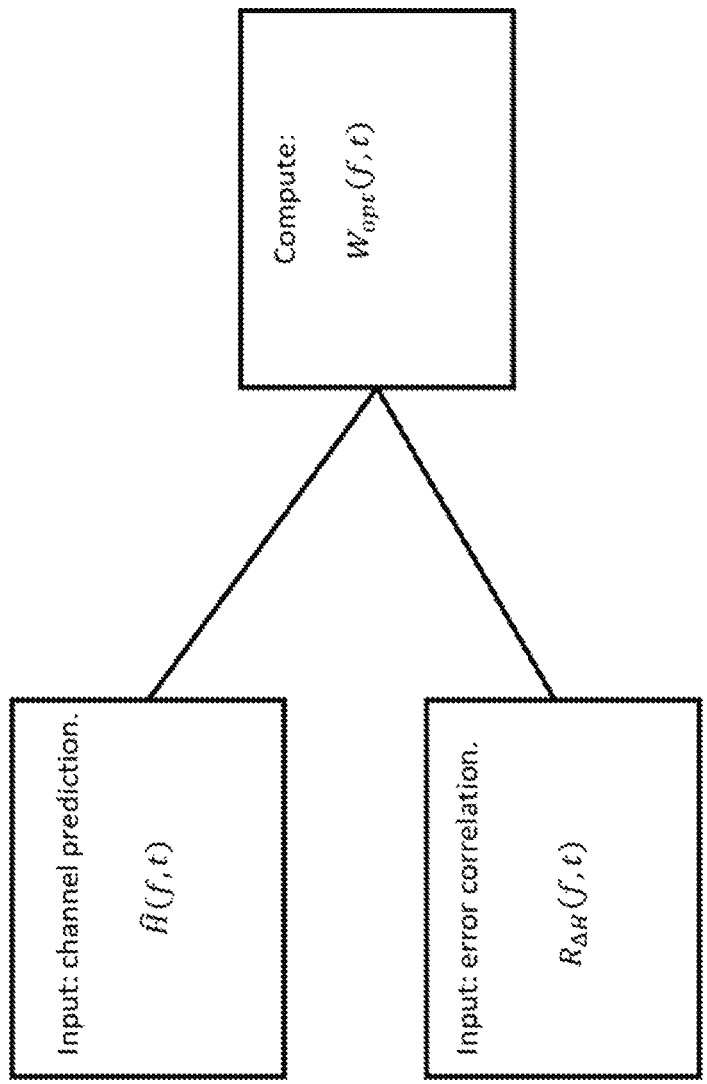
FIG. 26 is a block diagram showing an example process of precoding filter estimation.

[2] Computation of optimal precoding filter: may be performed every time pre-coding is performed. The computation is summarized in FIG. 26.

Figure 27:
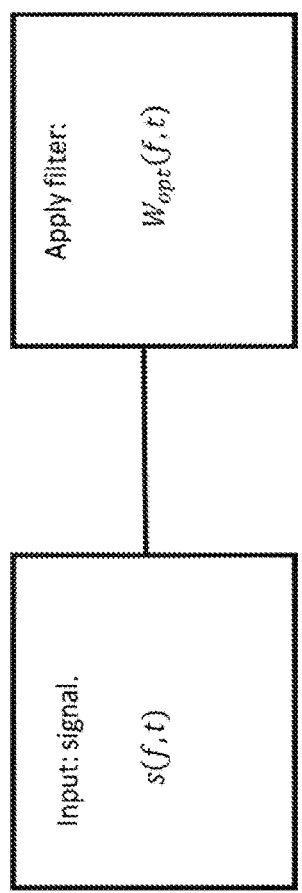
FIG. 27 is a block diagram showing an example process of applying an optimal precoding filter.

[3] Application of the optimal precoding filter: may be performed every time pre-coding is performed. The procedure is summarized in FIG. 27.

OTFS Vector Perturbation

Before introducing the concept of vector perturbation, we outline the application of the optimal pre-coding filter to OTFS.

OTFS Optimal Precoding

In OTFS, the data to be transmitted to the UEs are encoded using QAMs in the delay-Doppler domain. We denote this QAM signal by x, then:

$$x(\tau,\nu) \in A^{L_u}, \quad (39)$$

for $\tau=1, \ldots, N_\tau$ and $\nu=1, \ldots, N_\nu$. A denotes the QAM constellation. Using the two-dimensional Fourier transform the signal can be represented in the time frequency domain. We denote this representation by X:

$$X(f,t) = (Fx)(f,t), \quad (40)$$

for $f=1, \ldots, N_f$ and $t=1, \ldots, N_t$. F denotes the two-dimensional Fourier transform. The hub applies the optimal pre-coding filter to X and transmit the filter output over the air:

$$\lambda W_{opt}(f,t)X(f,t), \quad (41)$$

for $f=1, \ldots, N_f$ and $t=1, \ldots, N_t$. $\lambda$ denotes the normalization constant. The UEs remove the normalization constant giving a soft estimate of X:

$$X_{soft}(f, t) = H(f, t)W_{opt}(f, t)X(f, t) + \frac{1}{\lambda}w(f, t), \quad (42)$$

for $f=1, \ldots, N_f$ and $t=1, \ldots, N_t$. The term $w(f,t)$ denotes white noise. We denote the error of the soft estimate by E:

$$E(f,t) = X_{soft}(f,t) - X(f,t), \quad (43)$$

for $f=1, \ldots, N_f$ and $t=1, \ldots, N_t$. The expected error energy was derived earlier in this document:

$$\begin{aligned}
\text{expected error energy} &= \sum_{f=1}^{N_f}\sum_{t=1}^{N_t}\mathbb{E}\|X_{soft}(f, t) - X(f, t)\|^2 \quad (44) \\
&= \sum_{f=1}^{N_f}\sum_{t=1}^{N_t}X(f, t)^*M_{error}(f, t)X(f, t)
\end{aligned}$$

Where:

$$M_{error}(f,t) = (\hat{H}(f,t)W_{opt}(f,t)-I)^*(\hat{H}(f,t)W_{opt}(f,t)-I) + \ldots W_{opt}(f,t)^*\left(R_{\Delta H}(f,t)+\frac{N_0L_u}{L_h}\right)W_{opt}(f,t) \quad (45)$$

We call the positive definite matrix $M_{error}(f,t)$ the error metric.

Vector Perturbation

In vector perturbation, the hub transmits a perturbed version of the QAM signal:

$$x(\tau,\nu)+p(\tau,\nu), \quad (46)$$

for $\tau=1,\ldots,N_\tau$ and $\nu=1,\ldots,N_\nu$. Here, $p(\tau,\nu)$ denotes the perturbation signal. The perturbed QAMs can be represented in the time frequency domain:

$$X(f,t)+P(f,t)=(Fx)(f,t)+(Fp)(f,t), \quad (47)$$

for $f=1,\ldots,N_f$ and $t=1,\ldots,N_t$. The hub applies the optimal pre-coding filter to the perturbed signal and transmits the result over the air. The UEs remove the normalization constant giving a soft estimate of the perturbed signal:

$$X(f,t)+P(f,t)+E(f,t), \quad (48)$$

for $f=1,\ldots,N_f$ and $t=1,\ldots,N_t$. Where E denotes the error of the soft estimate. The expected energy of the error is given by:

$$\text{expected error energy} = \Sigma_{f=1}^{N_f}\Sigma_{t=1}^{N_t}(X(f,t)+P(f,t))^*M_{error}(f,t)(X(f,t)+P(f,t)) \quad (49)$$

The UEs then apply an inverse two dimensional Fourier transform to convert the soft estimate to the delay Doppler domain:

$$x(\tau,\nu)+p(\tau,\nu)+e(\tau,\nu), \quad (50)$$

for $\tau=1,\ldots,N_\tau$ and $\nu=1,\ldots,N_\nu$. The UEs then remove the perturbation $p(\tau,\nu)$ for each delay Doppler bin to recover the QAM signal x.

Collection of Vector Perturbation Signals

One question is: what collection of perturbation signals should be allowed? When making this decision, there are two conflicting criteria:

1) The collection of perturbation signals should be large so that the expected error energy can be greatly reduced.

2) The collection of perturbation signals should be small so the UE can easily remove them (reduced computational complexity):

$$x(\tau,\nu)+p(\tau,\nu)\to x(\tau,\nu) \quad (51)$$

Coarse Lattice Perturbation

An effective family of perturbation signals in the delay-Doppler domain, which take values in a coarse lattice:

$$p(\tau,\nu)\in B^{L_u}, \quad (52)$$

for $\tau=1,\ldots,N_\tau$ and $\nu=1,\ldots,N_\nu$. Here, B denotes the coarse lattice. Specifically, if the QAM symbols lie in the box: $[-r,r]\times j[-r,r]$ we take as our perturbation lattice $B=2r\mathbb{Z}+2rj\mathbb{Z}$. We now illustrate coarse lattice perturbation with an example.

Examples

Figure 28:
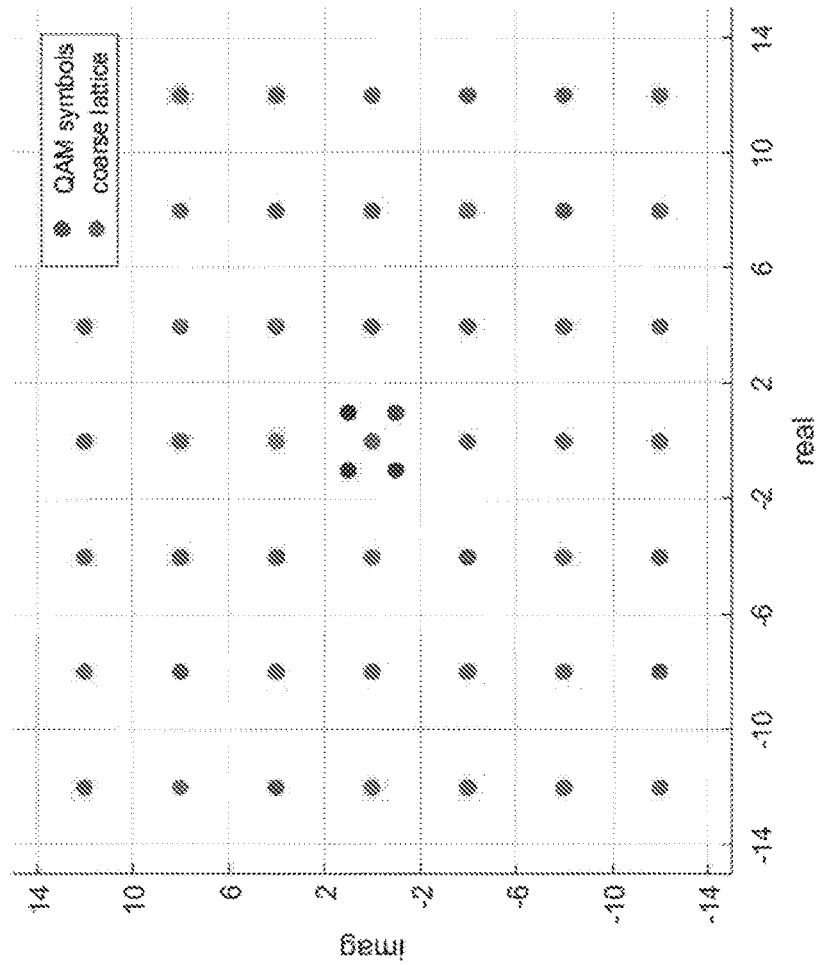
FIG. 28 is a graph showing an example of a lattice and QAM symbols.
Figure 29:
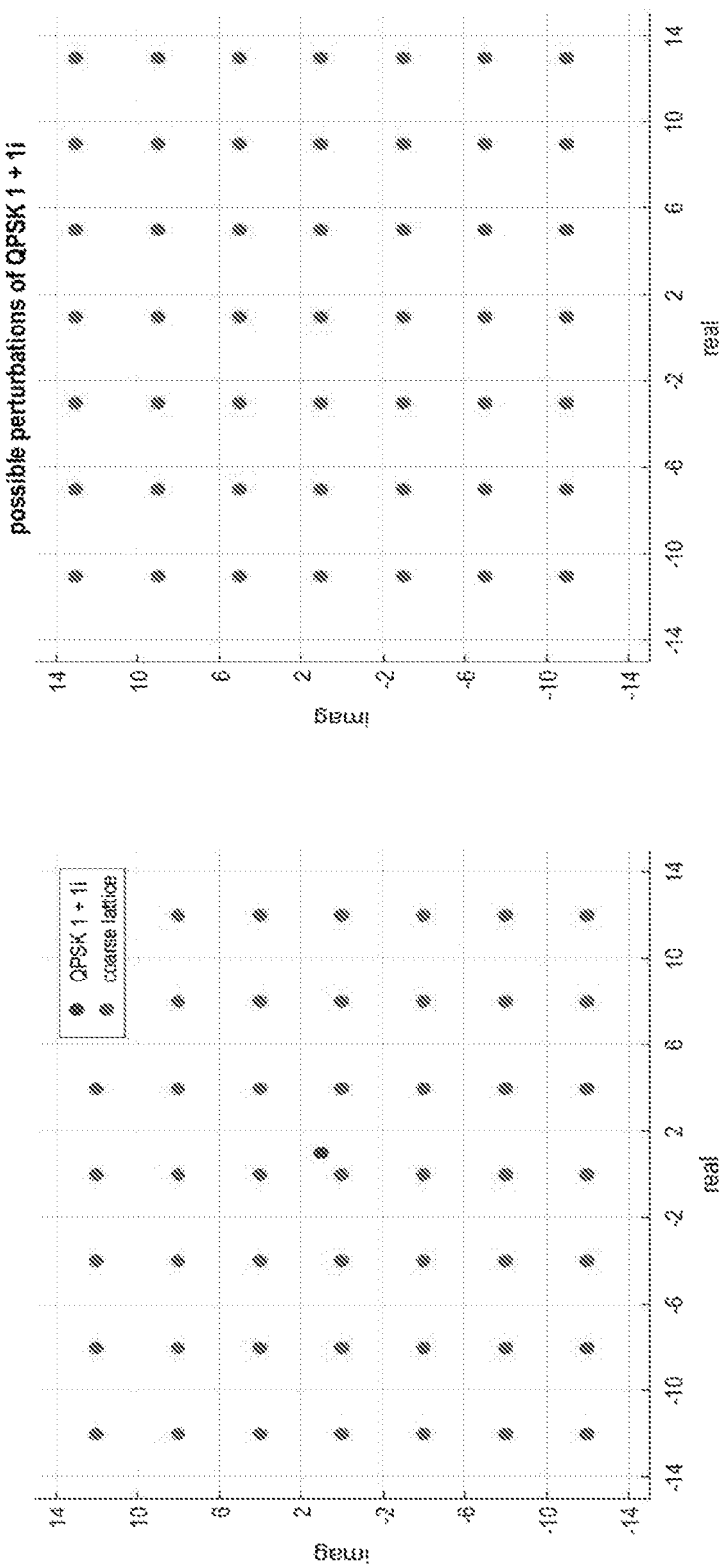
FIG. 29 graphically illustrates effects of perturbation examples.
Figure 30:
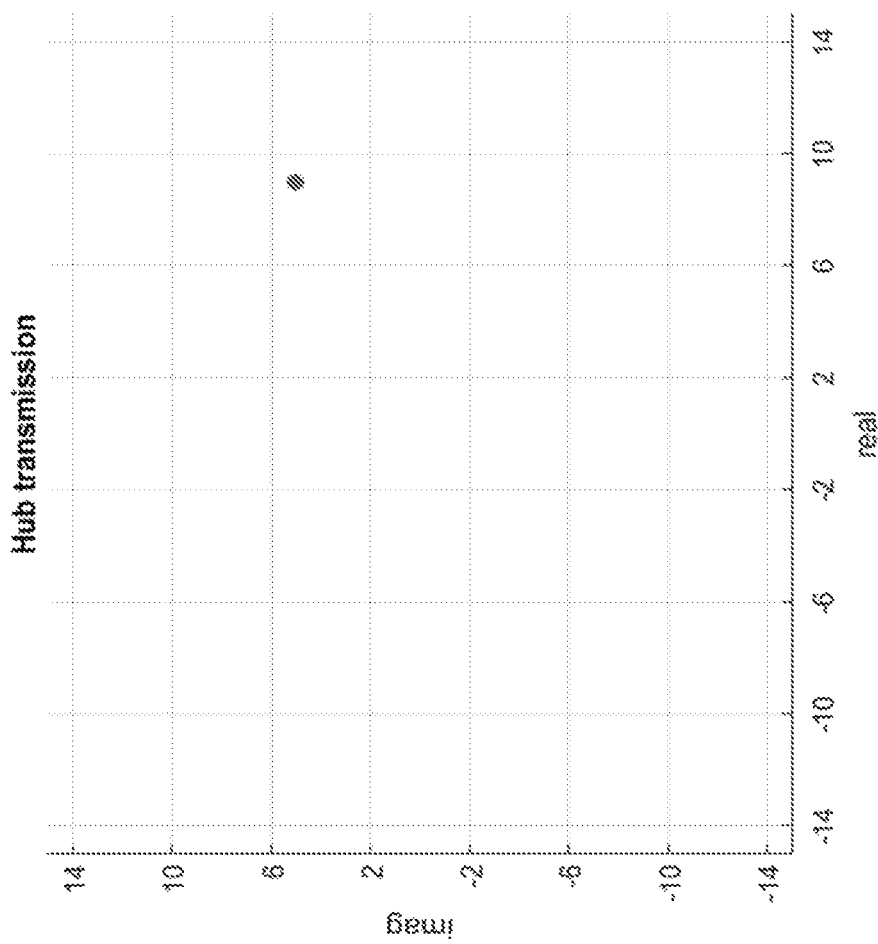
FIG. 30 is a graph illustrating an example of hub transmission.

Consider QPSK (or 4-QAM) symbols in the box $[-2,2]\times j[-2,2]$. The perturbation lattice is then $B=4\mathbb{Z}+4j\mathbb{Z}$. FIG. 28 illustrates the symbols and the lattice. Suppose the hub wants to transmit the QPSK symbol 1+1j to a UE. Then there is an infinite number of coarse perturbations of 1+1j that the hub can transmit. FIG. 29 illustrates an example. The hub selects one of the possible perturbations and transmits it over the air. FIG. 30 illustrates the chosen perturbed symbol, depicted with a single solid circle.

Figure 31:
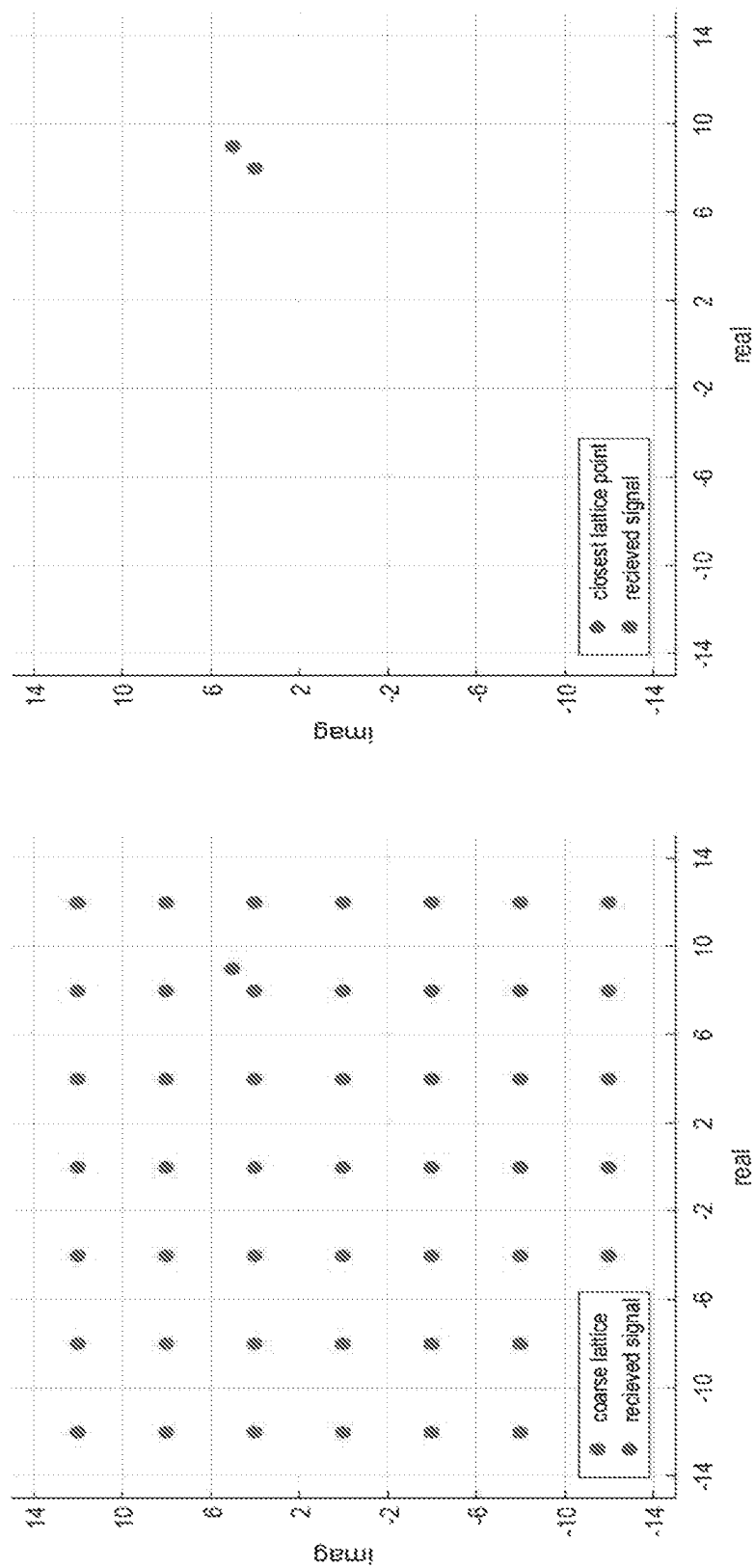
FIG. 31 is a graph showing an example of the process of a UE finding a closest coarse lattice point.

The UE receives the perturbed QPSK symbol. The UE then removes the perturbation to recover the QPSK symbol. To do this, the UE first searches for the coarse lattice point closest to the received signal. FIG. 31 illustrates this.

Figure 32:
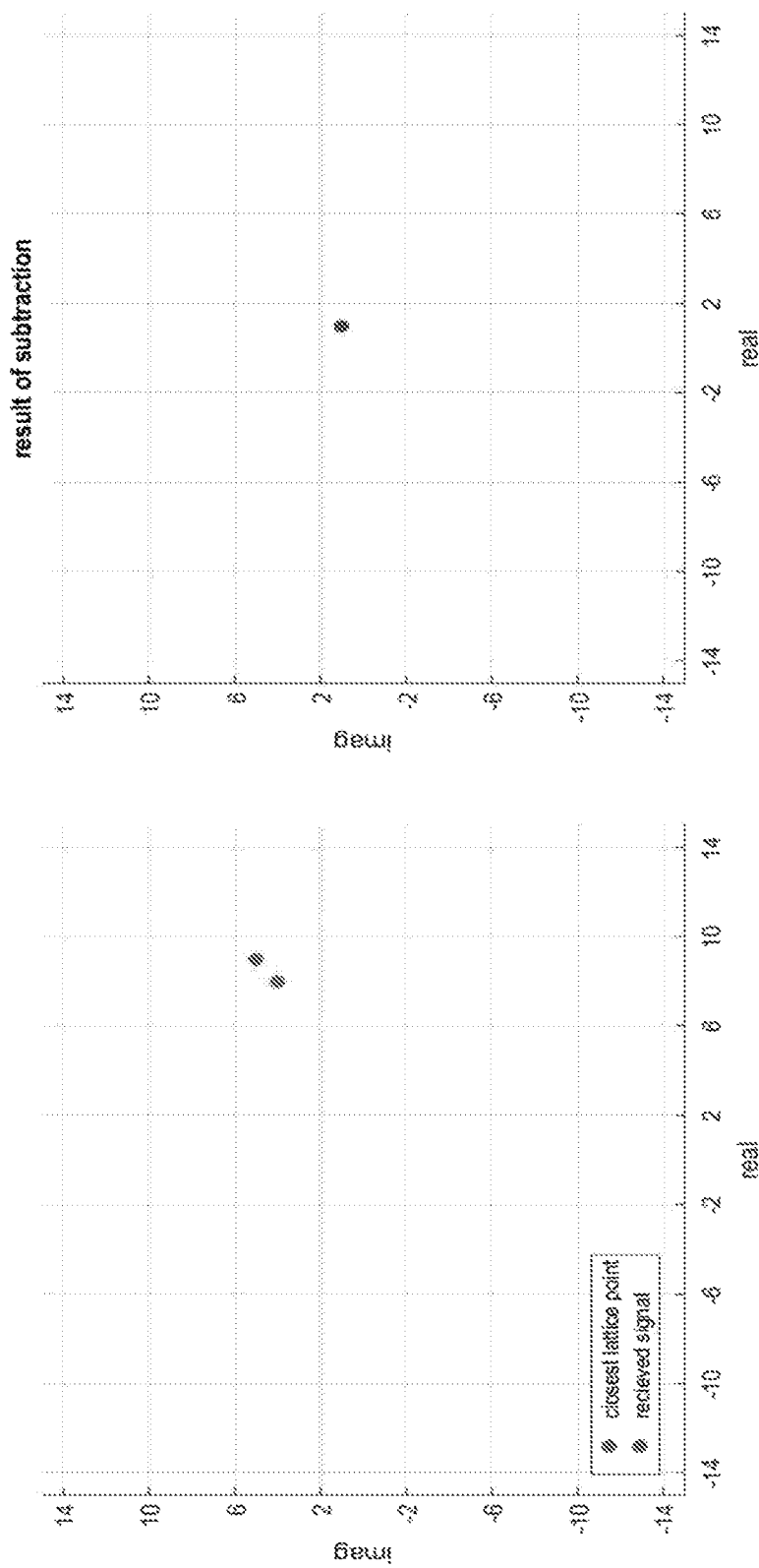
FIG. 32 is a graph showing an example process of UE recovering a QPSK symbol by subtraction.

The UE subtracts the closest lattice point from the received signal, thus recovering the QPSK symbol 1+1j. FIG. 32 illustrates this process.

Finding Optimal Coarse Lattice Perturbation Signal

The optimal coarse lattice perturbation signal, $p_{opt}$, is the one which minimizes the expected error energy:

$$p_{opt}=\text{argmin}_p \Sigma_{f=1}^{N_f}\Sigma_{t=1}^{N_t}(X(f,t)+P(f,t))^*M_{error}(f,t)(X(f,t)+P(f,t)) \quad (53)$$

The optimal coarse lattice perturbation signal can be computed using different methods. A computationally efficient method is a form of Thomlinson-Harashima precoding which involves applying a DFE filter at the hub.

Coarse Lattice Perturbation Example

We now present a simulation result illustrating the use of coarse lattice perturbation. The simulation scenario was a hub antenna transmitting to a single UE antenna. Table 2 displays the modulation parameters. Table 3 display the channel parameters for this example.

TABLE 2

| | |
|---|---|
| Subcarrier spacing | 30 kHz |
| Number of subcarriers | 256 |
| OFDM symbols per frame | 32 |
| QAM order | Infinity (uniform in the unit box) |

TABLE 3

| | |
|---|---|
| Number of reflectors | 20 |
| Delay spread | 2 μs |
| Doppler spread | 1 KHz |
| Noise variance | −35 dB |

Figure 33:
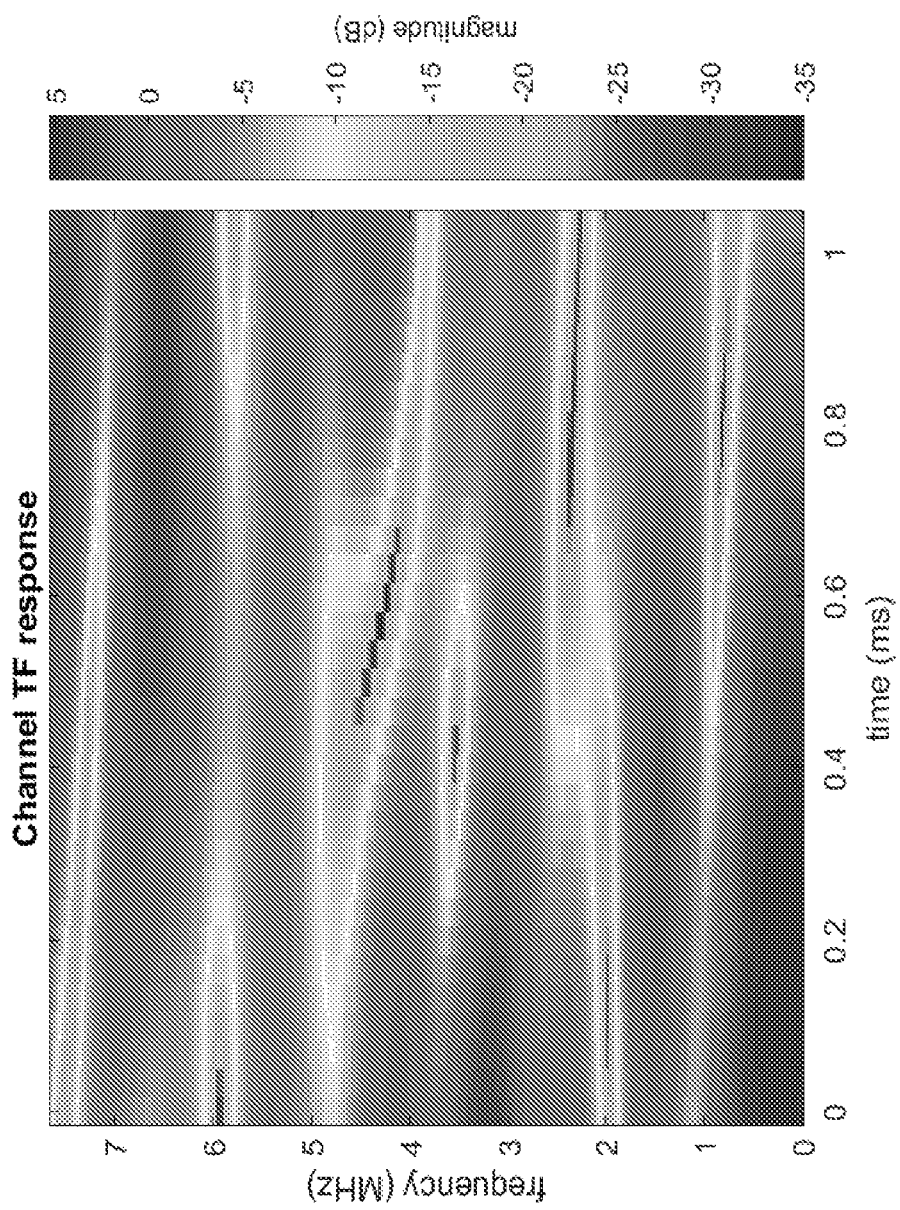
FIG. 33 depicts an example of a channel response.

FIG. 33 displays the channel energy in the time (horizontal axis) and frequency (vertical axis) domain.

Because this is a SISO (single input single output) channel, the error metric $M_{error}$ (f,t) is a positive scaler for each time frequency bin. The expected error energy is given by integrating the product of the error metric with the perturbed signal energy:

$$\text{expected error energy}=\Sigma_{f=1}^{N_f}\Sigma_{t=1}^{N_t}M_{error}(f,t)|X(f,t)+P(f,t)|^2 \quad (54)$$

Figure 34:
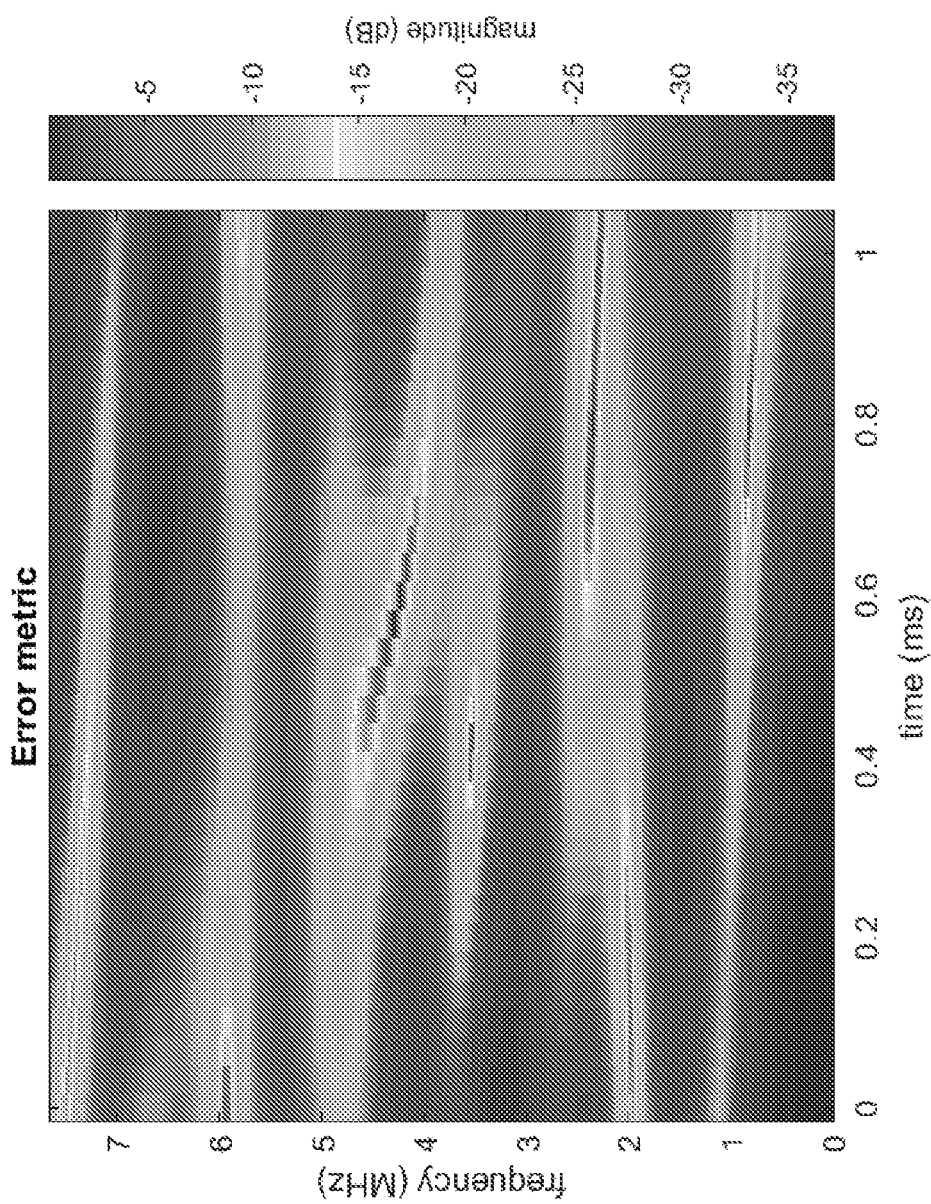
FIG. 34 depicts an example of an error of channel estimation.
Figure 35:
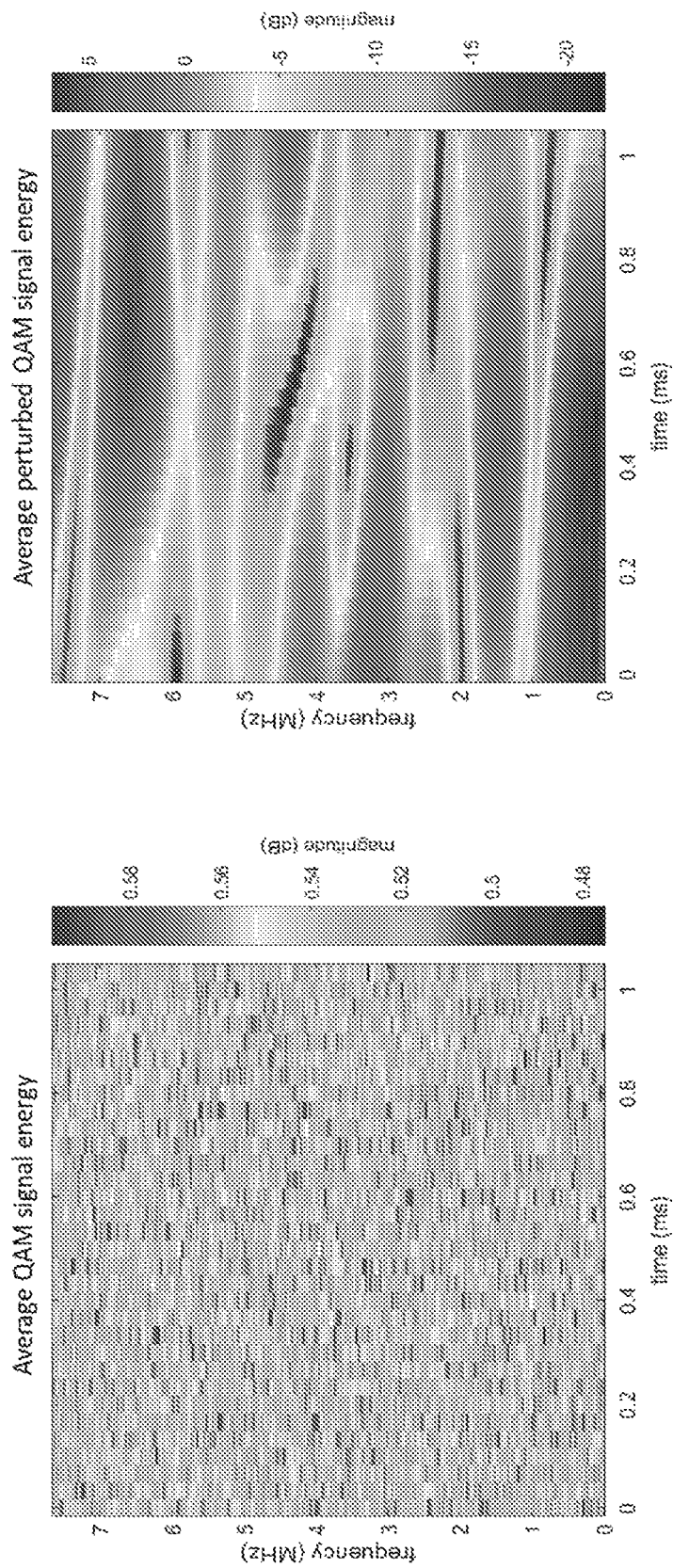
FIG. 35 shows a comparison of energy distribution of an example of QAM signals and an example of perturbed QAM signals.

FIG. 34 displays an example of the error metric. One hundred thousand random QAM signals were generated. For each QAM signal, the corresponding optimal perturbation signal was computed using Thomlinson-Harashima precoding. FIG. 35 compares the average energy of the QAM signals with the average energy of the perturbed QAM signals. The energy of QAM signals is white (evenly distributed) while the energy of the perturbed QAM signals is colored (strong in some time frequency regions and weak in others). The average error energy of the unperturbed QAM signal was −24.8 dB. The average error energy of the perturbed QAM signal was −30.3 dB. The improvement in error energy can be explained by comparing the energy distribution of the perturbed QAM signal with the error metric.

Figure 36:
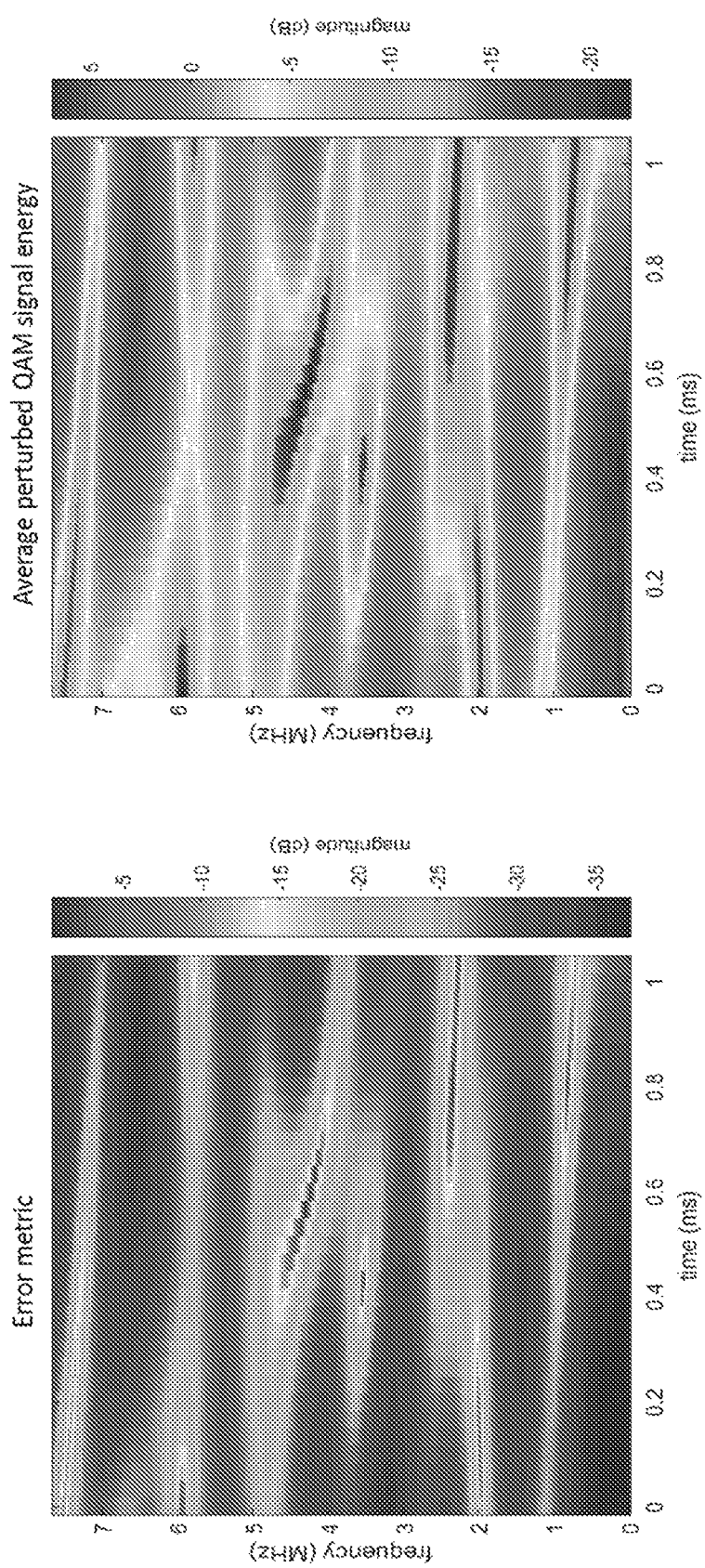
FIG. 36 is a graphical depiction of a comparison of an example error metric with an average perturbed QAM energy.

FIG. 36 shows a comparison of an example error metric with an average perturbed QAM energy. The perturbed QAM signal has high energy where the error metric is low, conversely it has low energy where the error metric is high.

The simulation illustrates the gain from using vector perturbation: shaping the energy of the signal to avoid time frequency regions where the error metric is high.

Block Diagrams

Vector perturbations may be performed in three steps. First, the hub perturbs the QAM signal. Next, the perturbed signal is transmitted over the air using the pre-coding filters. Finally, the UEs remove the perturbation to recover the data.

Figure 37:
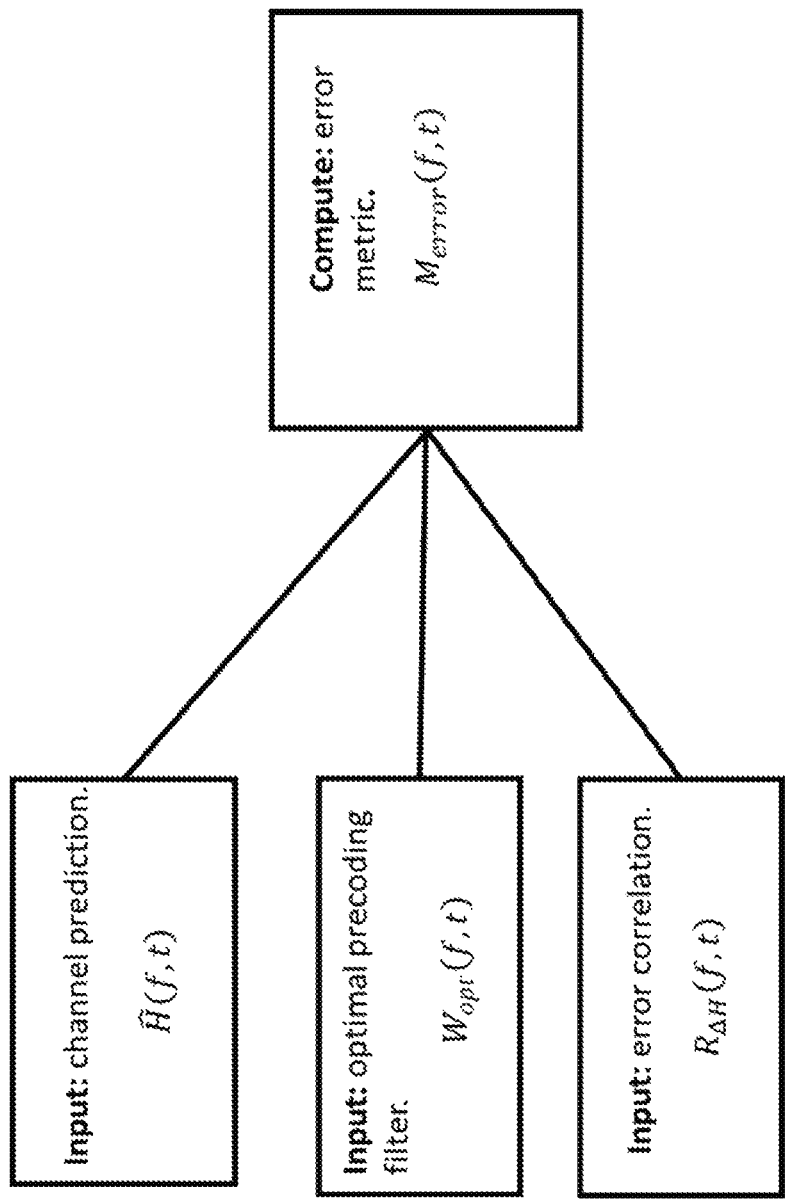
FIG. 37 is a block diagram illustrating an example process of computing an error metric.

Computation of error metric: the computation can be performed independently for each time frequency bin. The computation is summarized in FIG. 37. See also Eq. (45). As shown, the error metric is calculated using channel prediction estimate, the optimal coding filter and error correlation estimate.

Figure 38:
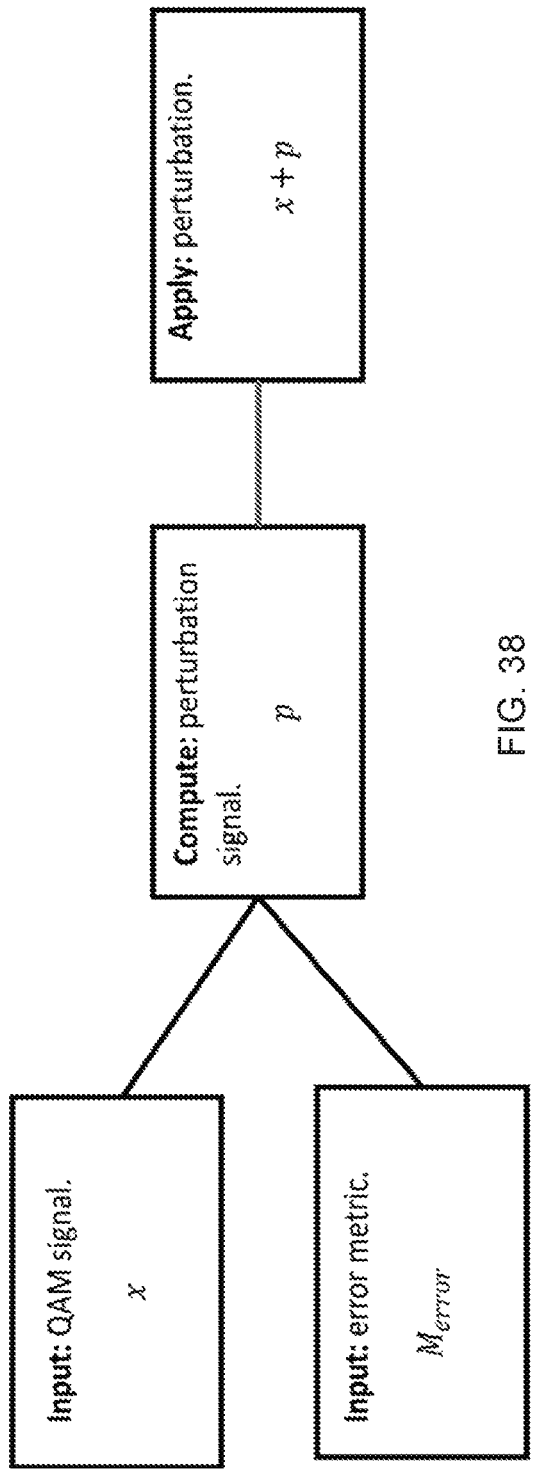
FIG. 38 is a block diagram illustrating an example process of computing perturbation.

Computation of perturbation: the perturbation is performed on the entire delay Doppler signal. The computation is summarized in FIG. 38. As shown, the QAM signal and the error metric are used to compute the perturbation signal. The calculated perturbation signal is additively applied to the QAM input signal.

Figure 39:
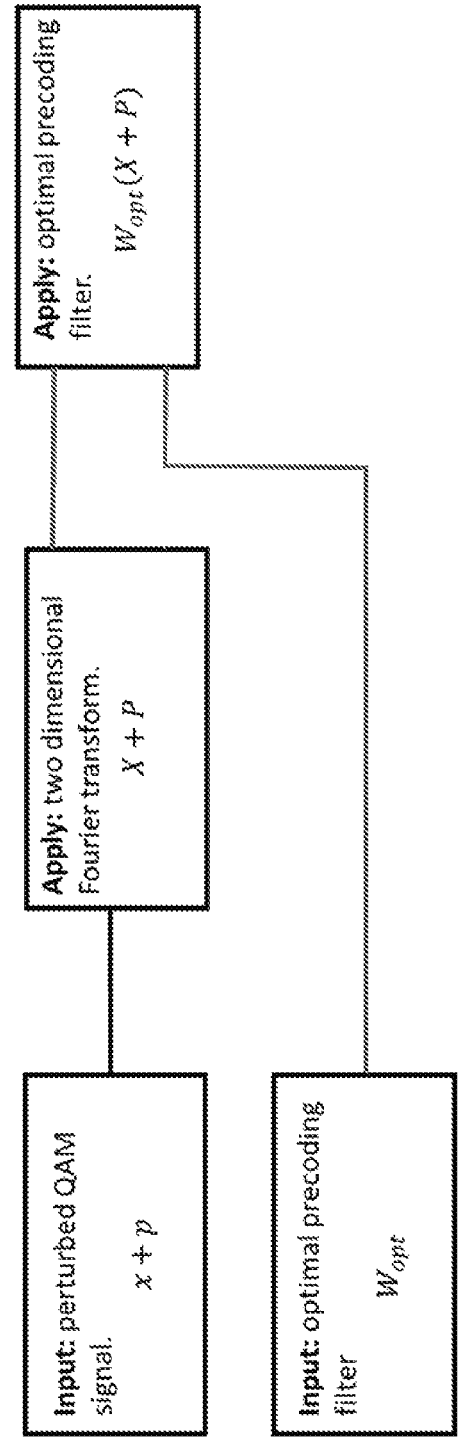
FIG. 39 is a block diagram illustrating an example of application of a precoding filter.

Application of the optimal precoding filter: the computation can be performed independently for each time frequency bin. The computation is summarized in FIG. 39. The perturbed QAM signal is processed through a two dimensional Fourier transform to generate a 2D transformed perturbed signal. The optimal precoding filter is applied to the 2D transformed perturbed signal.

Figure 40:
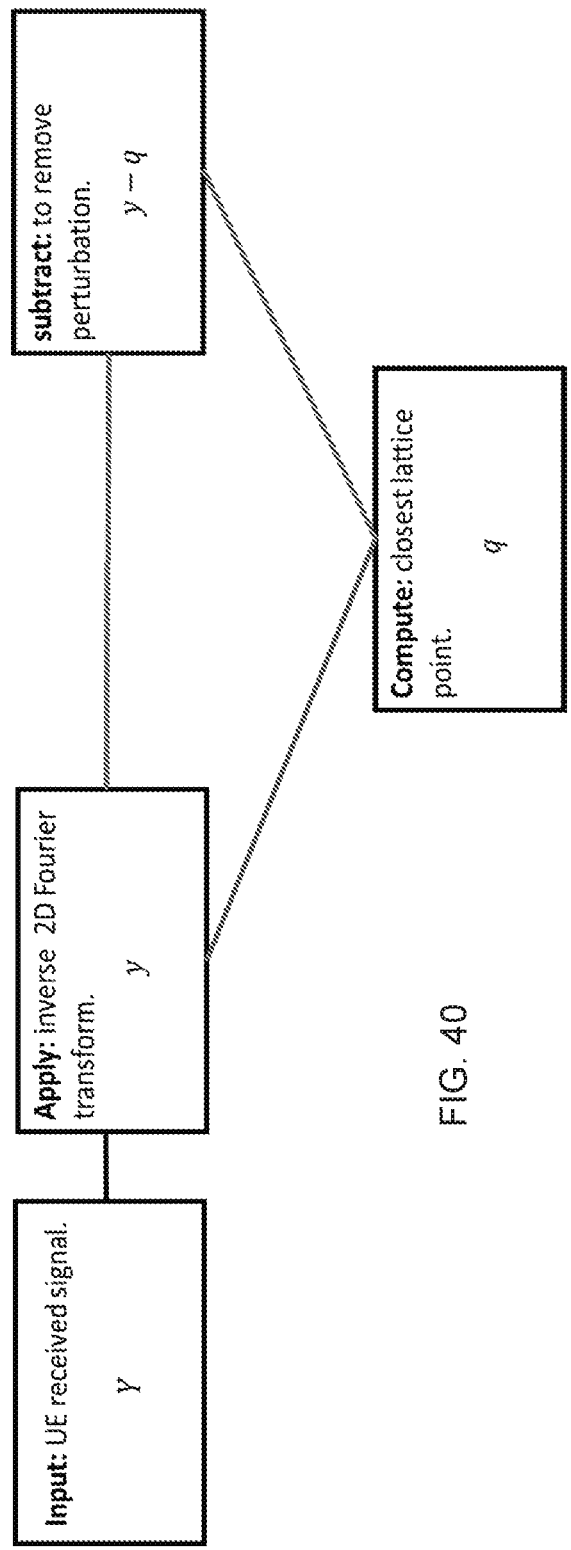
FIG. 40 is a block diagram illustrating an example process of UE removing the perturbation.

UEs removes perturbation: the computation can be FIG. 40. At UE, the input signal received is transformed through an inverse 2D Fourier transform. The closest lattice point for the resulting transformed signal is determined and then removed from the 2D transformed perturbed signal.

Spatial Tomlinson Harashima Precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_u \times L_h}$.

From this information, the hub computes the "optimal" precoding filter, which minimizes the expected error energy experienced by the UEs:

$$W_{opt} = \left(\hat{H}^* \hat{H} + R_{\Delta H} + \frac{N_0 L_u}{L_h} I\right)^{-1} \hat{H}^*$$

By applying the precoding filter to the QAM vector the hub constructs a signal to transmit over the air: $\lambda W_{opt} x \in \mathbb{C}^{L_h}$, where $\lambda$ is a constant used to enforce the transmit energy constraints. The signal passes through the downlink channel and is received by the UEs:

$$\lambda H W_{opt} x + w,$$

Where $w \in \mathbb{C}^{L_u}$ denotes AWGN noise. The UEs remove the normalization constant giving a soft estimate of the QAM signal:

$$x + e,$$

where $e \in \mathbb{C}^{L_u}$ denotes the estimate error. The expected error energy can be computed using the error metric:

$$\text{expected error energy} = x^* M_{error} x$$

where $M_{error}$ is a positive definite matrix computed by:

$$M_{error} = (\hat{H} W_{opt} - I)^* (\hat{H} W_{opt} - I) + W_{opt}^* \left(R_{\Delta H} + \frac{N_0 L_u}{L_h}\right) W_{opt}$$

Review of Vector Perturbation

The expected error energy can be greatly reduced by perturbing the QAM signal by a vector $v \in \mathbb{C}^{L_u}$. The hub now transmits $\lambda W_{opt}(x+v) \in \mathbb{C}^{L_h}$. After removing the normalization constant, the UEs have a soft estimate of the perturbed QAM signal:

$$x + v + e$$

Again, the expected error energy can be computed using the error metric:

$$\text{expected error energy} = (x+v)^* M_{error}(x+v)$$

The optimal perturbation vector minimizes the expected error energy:

$$v_{opt} = \arg\min_v (x+v)^* M_{error}(x+v).$$

Computing the optimal perturbation vector is in general NP-hard, therefore, in practice an approximation of the optimal perturbation is computed instead. For the remainder of the document we assume the following signal and perturbation structure:

The QAMs lie in the box $[-1, 1] \times j[-1,1]$.

The perturbation vectors lie on the coarse lattice: $(2\mathbb{Z} + 2j\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error} = U^* D U,$$

where $D$ is a diagonal matrix with positive entries and $U$ is unit upper triangular. Using this decomposition, the expected error energy can be expressed as:

$$\text{expected error energy} = (U(x+v))^* D(U(x+v)) = z^* Dz = \Sigma_{n=1}^{L_u} D(n,n)|z(n)|^2,$$

where $z = U(x+v)$. We note that minimizing the expected error energy is equivalent to minimizing the energy of the $z$ entries, where:

$$z(L_u) = x(L_u) + v(L_u),$$

$$z(n) = x(n) + v(n) + \sum_{m=n+1}^{L_u} U(n, m)(x(m) + v(m)),$$

for n=1, 2, ..., $L_u$−1. Spatial THP iteratively choses a perturbation vector in the following way.

$$v(L_u)=0$$

Figure 41:
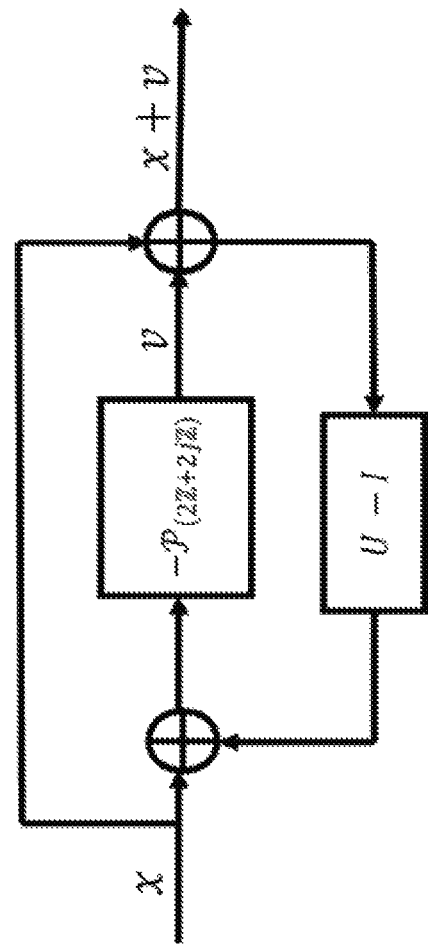
FIG. 41 is a block diagram illustrating an example spatial Tomlinsim Harashima precoder (THP).

Suppose $v(n+1), v(n+2), \ldots, v(L_u)$ have been chosen, then:

$$v(n) = -\mathcal{P}_{(2\mathbb{Z}+2j\mathbb{Z})}\left(x(n) + \sum_{m=n+1}^{L_u} U(n,m)(x(m)+v(m))\right)$$

where $\mathcal{F}_{(2\mathbb{Z}+2j\mathbb{Z})}$ denotes projection onto the coarse lattice. We note that by construction the coarse perturbation vector bounds the energy of the entries of z by two. FIG. 41 displays a block diagram of spatial THP.

Simulation Results

We now present the results of a simple simulation to illustrate the use of spatial THP. Table 4 summarizes the simulation setup.

TABLE 4

Simulation setup

| | |
|---|---|
| Number of hub antennas | 2 |
| Number of UEs | 2 (one antenna each) |
| Channel condition number | 10 dB |
| Modulation | PAM infinity (data uniformly disturbed on the interval [−1, 1]) |
| Data noise variance | −35 dB |
| Channel noise variance | −35 dB |

Figure 42:
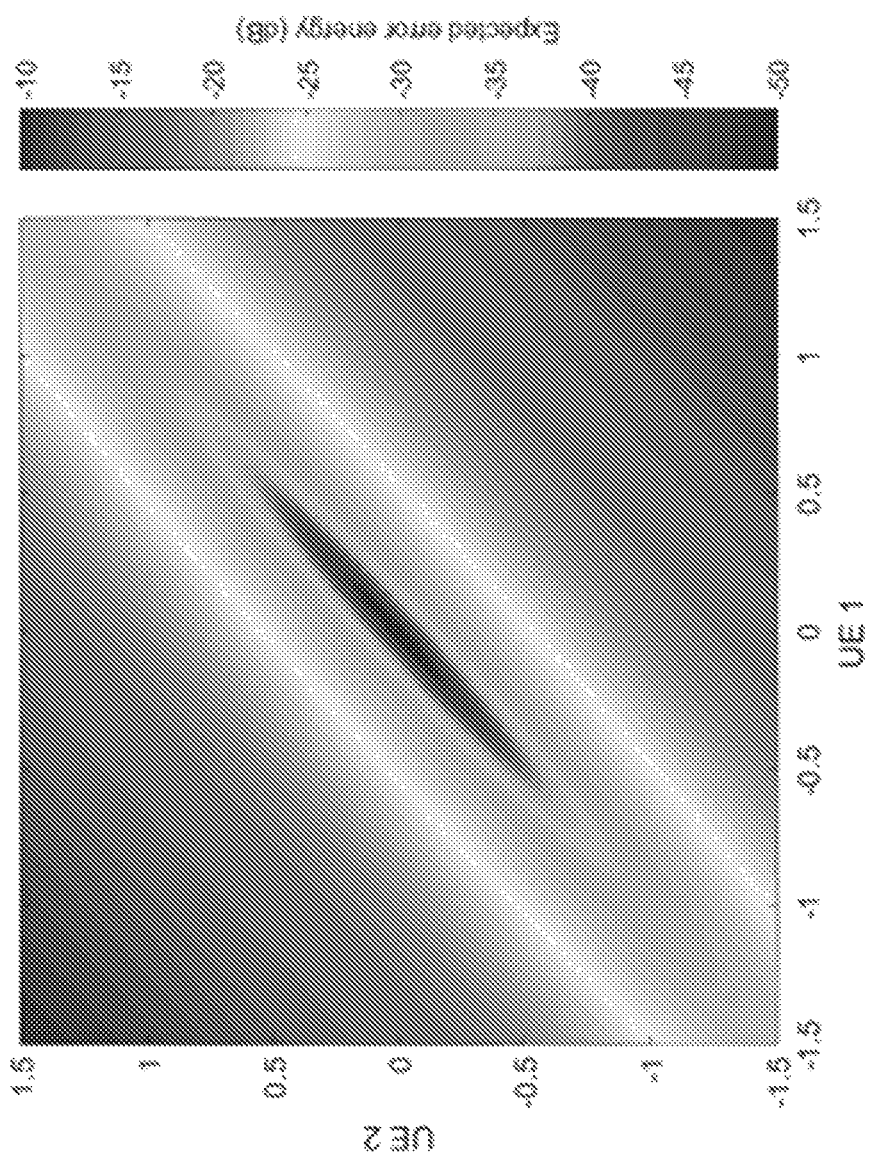
FIG. 42 is a spectral chart of the expected energy error for different exemplary pulse amplitude modulated (PAM) vectors.

FIG. 42 displays the expected error energy for different PAM vectors. We note two aspects of the figure.

The error energy is low when the signal transmitted to UE1 and UE2 are similar. Conversely, the error energy is high when the signals transmitted to the UEs are dissimilar. We can expect this pattern to appear when two UEs are spatially close together; in these situations, it is advantageous to transmit the same message to both UEs.

The error energy has the shape of an ellipses. The axes of the ellipse are defined by the eigenvectors of $M_{error}$.

Figure 43:
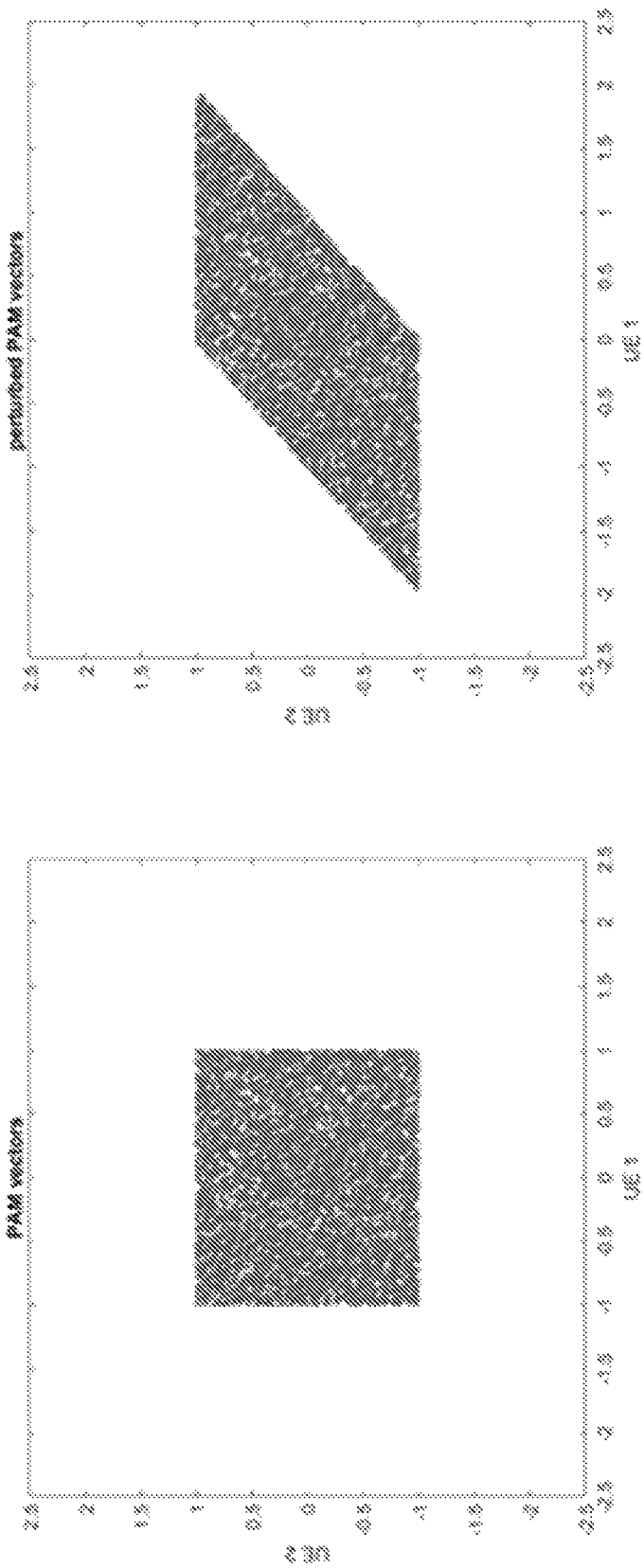
FIG. 43 is a plot illustrating an example result of a spatial THP.

A large number data of PAM vectors was generated and spatial TI-IP was applied. FIG. 43 shows the result. Note that the perturbed PAM vectors are clustered along the axis with low expected error energy.

Section 3: Channel Estimation for OTFS Systems

Figure 44:
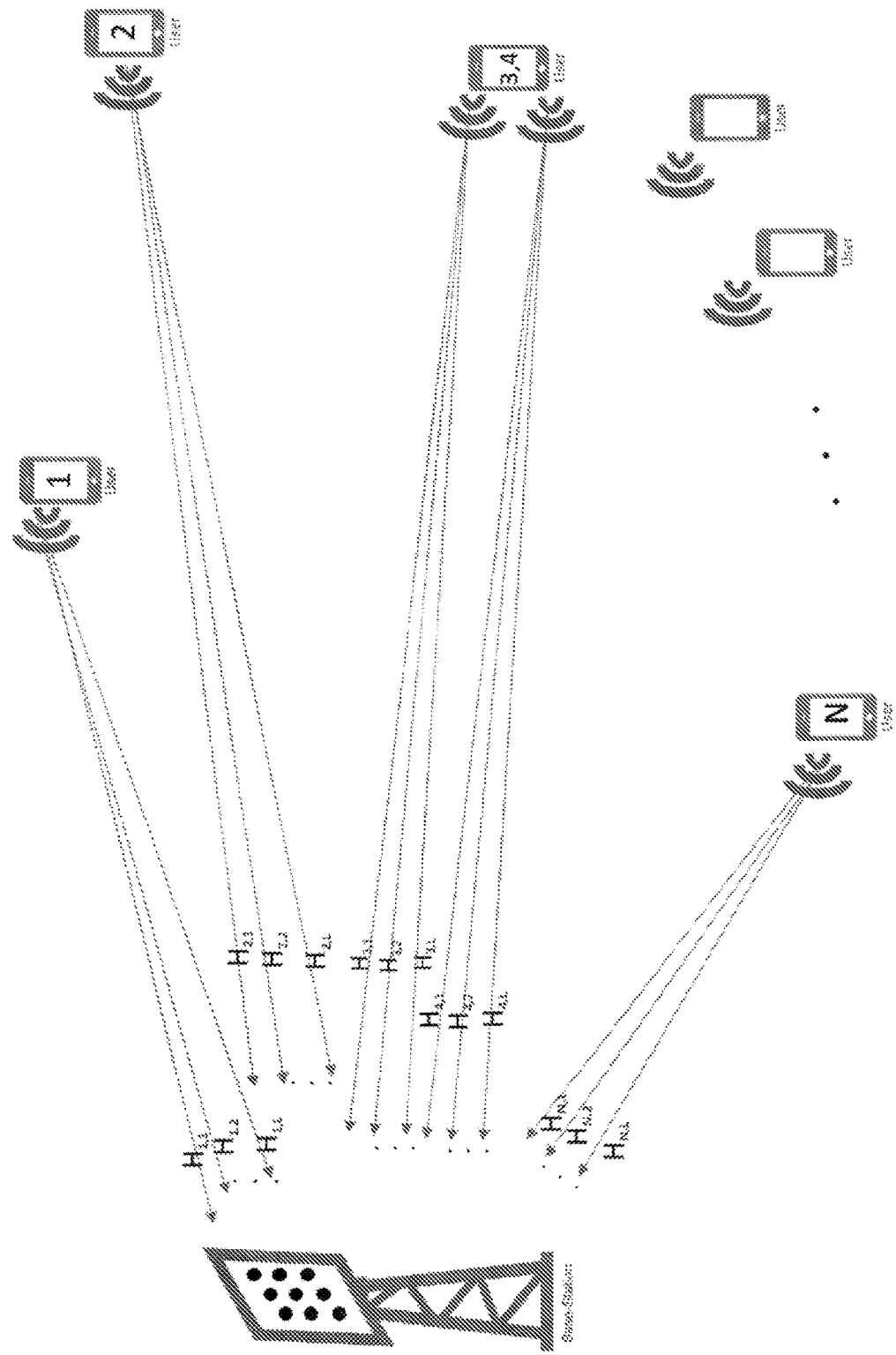
FIG. 44 shows an example of a wireless system including a base station with L antennas and multiple users.

This section overviews channel estimation for OTFS systems, and in particular, aspects of channel estimation and scheduling for a massive number of users. A wireless system, with a multi-antenna base-station and multiple user antennas, is shown in FIG. 44. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In some embodiments, and when the channels are not static and when the number of users is very large, some of the challenges of such a precoded system include:

Accurately and efficiently estimating all the required channels

Predicting the changes in the channels during the downlink transmission time

Typical solutions in systems, which assume a low number of users and static channels, are to let each user transmit known pilot symbols (reference signals) from each one of its antennas. These pilots are received by all the base-station antennas and used to estimate the channel. It is important that these pilot symbols do not experience significant interference, so that the channel estimation quality is high. For this reason, they are typically sent in an orthogonal way to other transmissions at the same time. There are different methods for packing multiple pilots in an orthogonal (or nearly-orthogonal) way, but these methods are usually limited by the number of pilots that can be packed together (depending on the channel conditions) without causing significant interference to each other. Therefore, it becomes very difficult to have an efficient system, when the number of user antennas is high and the channels are not static. The amount of transmission resources that is needed for uplink pilots may take a considerable amount of the system's capacity or even make it unimplementable. For prediction of the channel, it is typically assumed that the channel is completely static and will not change from the time it was estimated till the end of the downlink transmission. This assumption usually causes significant degradation in non-static channels.

It is assumed that the downlink and uplink channels are reciprocal and after calibration it is possible to compensate for the difference in the uplink-downlink and downlink-uplink channel responses. Some example embodiments of the calibration process using reciprocity are further discussed in Section 5.

Embodiments of the disclosed technology include a system and a method for packing and separating multiple non-orthogonal pilots, as well as a method for channel prediction. In such a system, it is possible to pack together a considerably higher number of pilots comparing to other commonly used methods, thus allowing an accurate prediction of the channel for precoding.

Second-Order Training Statistics

The system consists of a preliminary training step, in which all users send uplink orthogonal pilots to the base-station. Although these pilots are orthogonal, they may be sent at a very low rate (such as one every second) and therefore do not overload the system too much. The base-station receives a multiple of $N_{SOS}$ such transmissions of these pilots, and use them to compute the second-order statistics (covariance) of each channel.

Figure 45:
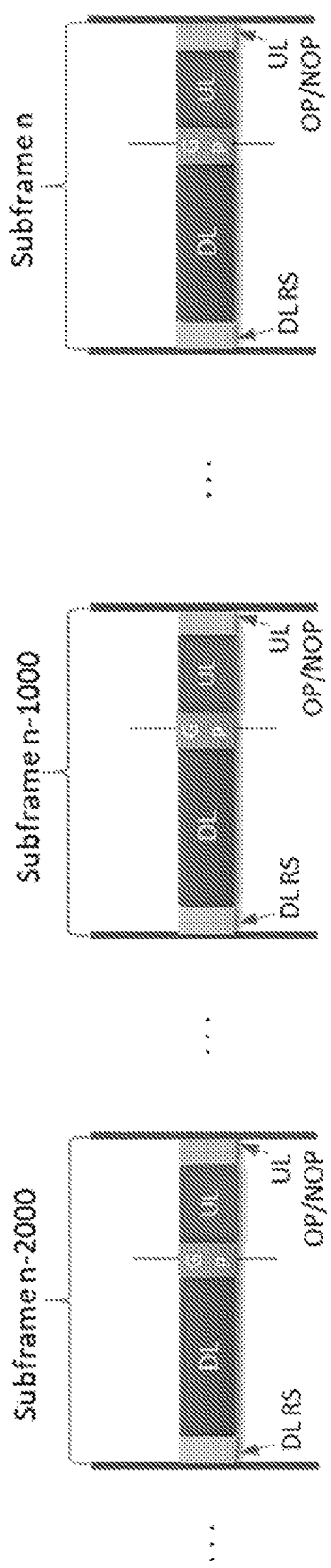
FIG. 45 shows an example of a subframe structure that can be used to compute second-order statistics for training.

FIG. 45 shows an example of such a system, where a subframe of length 1 msec consists of a downlink portion (DL), a guard period (GP) and an uplink portion (UL). Some of the uplink portion is dedicated to orthogonal pilots (OP) and non-orthogonal pilots (NOP). Each specific user is scheduled to send on these resources its pilots every 1000 subframes, which are equivalent to 1 sec. After the reception of $N_{SOS}$ subframes with pilots (equivalent to $N_{SOS}$ seconds), the base-station will compute the second-order statistics of this channel.

The computation of the second-order statistics for a user antenna u is defined as:

For each received subframe i=1, 2, ..., $N_{SOS}$ with orthogonal pilots and for each one of the L base-station receive antennas—estimate the channel along the entire frequency band ($N_f$ grid elements) from the pilots and store it as the i-th column of the matrix $H^{(u)}$ with dimensions $(N_f L) \times N_{SOS}$.

Compute the covariance matrix $R_{HH}^{(u)} = (H^{(u)})^H H^{(u)}$, where $(\bullet)^H$ is the Hermitian operator.

For the case that the channel $H^{(u)}$ is non-zero-mean, both the mean and the covariance matrix should be determined.

To accommodate for possible future changes in the channel response, the second-order statistics may be updated later, after the training step is completed. It may be recomputed from scratch by sending again $N_{SOS}$ orthogonal pilots, or gradually updated. One possible method may be to remove the first column of $H^{(u)}$ and attach a new column at the end and then re-compute the covariance matrix again.

The interval at which these orthogonal pilots need to be repeated depends on the stationarity time of the channel, e.g., the time during which the second-order statistics stay approximately constant. This time can be chosen either to be a system-determined constant, or can be adapted to the environment. In particular, users can determine through observation of downlink broadcast pilot symbols changes in the second-order statistics, and request resources for transmission of the uplink pilots when a significant change has been observed. In another embodiment, the base-station may use the frequency of retransmission requests from the users to detect changes in the channel, and restart the process of computing the second-order statistics of the channel.

To reduce the computational load, it is possible to use principal component analysis (PCA) techniques on $R_{HH}^{(u)}$. We compute $\{\lambda^{(u)}\}$, the $K^{(u)}$ most dominant eigenvalues of $R_{HH}^{(u)}$, arranged in a diagonal matrix $D^{(u)}=\text{diag}(\lambda_1^{(u)}, \lambda_2^{(u)}, \ldots, \lambda_{K^{(u)}}^{(u)})$ and their corresponding eigenvectors matrix $V^{(u)}$. Typically, $K^{(u)}$ will be in the order of the number of reflectors along the wireless path. The covariance matrix can then be approximated by $R_{HH}^{(u)} \approx V^{(u)} \cdot D^{(u)} \cdot (V^{(u)})^H$.

Non-Orthogonal Pilots

The non-orthogonal pilots (NOP), $P^{(u)}$, for user antenna u, may be defined as a pseudo-random sequence of known symbols and of size $N_{NOP}$, over a set of frequency grid elements. The base-station can schedule many users to transmit their non-orthogonal pilots at the same subframe using overlapping time and frequency resources. The base-station will be able to separate these pilots and obtain a high-quality channel estimation for all the users, using the method describes below.

Define the vector Y of size $(L \cdot N_{NOP}) \times 1$, as the base-station received signal over all its antennas, at the frequency grid elements of the shared non-orthogonal pilots. Let $\tilde{V}^{(u)}$ be the eigenvectors matrix $V^{(u)}$ decimated along its first dimension (frequency-space) to the locations of the non-orthogonal pilots.

The base-station may apply a Minimum-Mean-Square-Error (MMSE) estimator to separate the pilots of every user antenna:

For every user antenna u, compute $$R_{YY}^{(u)} = [\tilde{V}^{(u)} \odot P^{(u)}] \cdot D^{(u)} \cdot [\tilde{V}(u) \odot P^{(u)}]^H$$

$$R_{XY}^{(u)} = \tilde{V}^{(u)} \cdot D^{(u)} \cdot [\tilde{V}(u) \odot P^{(u)}]^H$$

Herein, $\odot$ is defined as the element-by-element multiplication. For a matrix A and vector B, the $A \odot B$ operation includes replicating the vector B to match the size of the matrix A before applying the element-by-element multiplication.

If principal component analysis (PCA) is not used, the covariance matrices can be computed directly as:

$$R_{YY}^{(u)} = (P^{(u)}[P^{(u)}]^H) \odot R_{HH}^{(u)}$$

$$R_{XY}^{(u)} = (1[P^{(u)}]^H) \odot R_{HH}^{(u)}$$

For the set of user antennas shared on the same resources $u \in U$, compute $$R_{YY} = \Sigma_{u \in U} R_{YY}^{(u)}$$

and invert it. Note that it is possible to apply PCA here as well by finding the dominant eigenvalues of $R_{YY}$ ($D_{R_{YY}}$) and their corresponding eigenvectors matrix ($V_{R_{YY}}$) and approximating the inverse with $R_{YY}^{-1} \approx V_{R_{YY}} \cdot D_{R_{YY}}^{-1} \cdot (V_{R_{YY}})^H$.

For each user antenna u, compute the pilot separation filter $$C_P^{(u)} = R_{XY}^{(u)} \cdot R_{YY}^{-1}$$

For each user antenna u, separate its non-orthogonal pilots by computing $$H_{NOP}^{(u)} = C_P^{(u)} \cdot Y$$

Note that $H_{NOP}^{(u)}$ is the channel response over the frequency grid-elements of the non-orthogonal pilots for the L base-station received antennas. It may be also interpolated along frequency to obtain the channel response over the entire bandwidth.

Prediction Training

Figure 46:
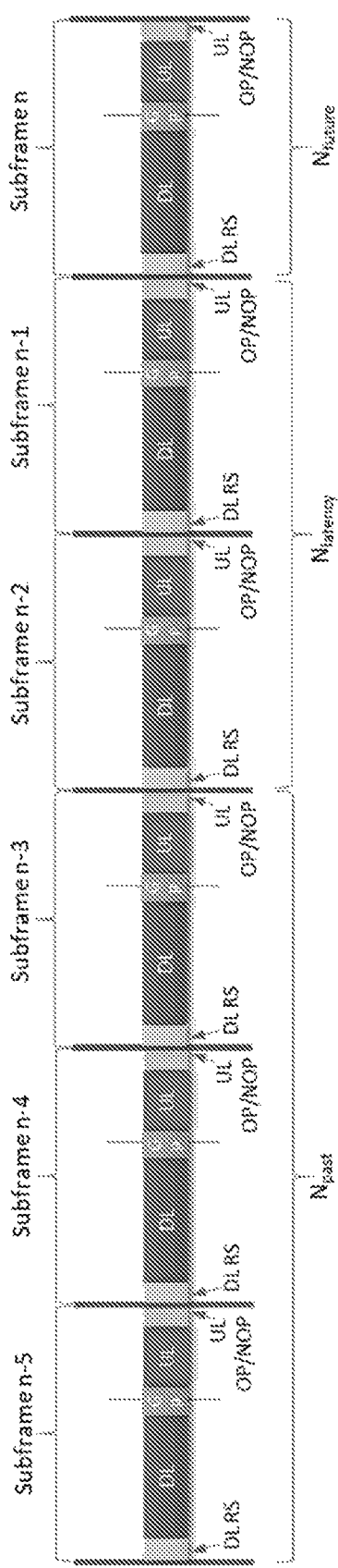
FIG. 46 shows an example of prediction training for channel estimation.

The method described in the previous section for separating non-orthogonal pilots is applied to train different users for prediction. In this step, a user sends uplink non-orthogonal pilots on consecutive subframes, which are divided to 3 different sections, as shown in the example in FIG. 46.

1. Past—the first $N_{past}$ subframes. These subframes will later be used to predict future subframes.

2. Latency—the following $N_{latency}$ subframes are used for the latency required for prediction and precoding computations.

3. Future—the last $N_{future}$ subframes (typically one), where the channel at the downlink portion will be later predicted.

Each user, is scheduled $N_{PR}$ times to send uplink non-orthogonal pilots on consecutive $N_{past} + N_{latency} + N_{future}$ subframes. Note that in one uplink symbol in the subframe, both orthogonal and non-orthogonal pilots may be packed together (although the number of orthogonal pilots will be significantly lower than the number of non-orthogonal pilots). The base-station applies the pilot separation filter for the non-orthogonal pilots of each user and computes $H_{NOP}^{(u)}$. To reduce storage and computation, the channel response may be compressed using the eigenvector matrix computed in the second-order statistics step $$H_K^{(u)} = (\tilde{V}^{(u)})^H \cdot H_{NOP}^{(u)}$$

For subframes, which are part of the "Past" section, store $H_K^{(u)}$ as columns in the matrix $H_{past,(i)}^{(u)}$, where $i = 1, 2, \ldots, N_{PR}$. Use all or part of the non-orthogonal pilots to interpolate the channel over the whole or part of the downlink portion of the "Future" subframes, compress it using $\tilde{V}^{(u)}$ and store it as $H_{future,(i)}^{(u)}$. Compute the following covariance matrices:

$$R_{past,(i)}^{(u)} = H_{past,(i)}^{(u)} \cdot (H_{past,(i)}^{(u)})^H$$

$$R_{future,(i)}^{(u)} = H_{future,(i)}^{(u)} \cdot (H_{future,(i)}^{(u)})^H$$

$$R_{future\ past,(i)}^{(u)} = H_{future,(i)}^{(u)} \cdot (H_{past,(i)}^{(u)})^H$$

After all $N_{PR}$ groups of prediction training subframes have been scheduled, compute the average covariance matrices for each user $$R_{past}^{(u)} = \frac{1}{N_{PR}} \sum_{i=1}^{N_{PR}} R_{past,(i)}^{(u)}$$

$$R_{future}^{(u)} = \frac{1}{N_{PR}} \sum_{i=1}^{N_{PR}} R_{future,(i)}^{(u)}$$

$$R_{future\_past}^{(u)} = \frac{1}{N_{PR}} \sum_{i=1}^{N_{PR}} R_{future\_past,(i)}^{(u)}$$

Finally, for each user compute the MMSE prediction filter $$C_{PR}^{(u)} = R_{future\_past}^{(u)} \cdot (R_{past}^{(u)})^{-1}$$

and its error variance for the precoder $$R_E^{(u)} = R_{future}^{(u)} - C_{PR}^{(u)} \cdot (R_{future\_past}^{(u)})^H.$$

Scheduling a Downlink Precoded Transmission

Figure 47:
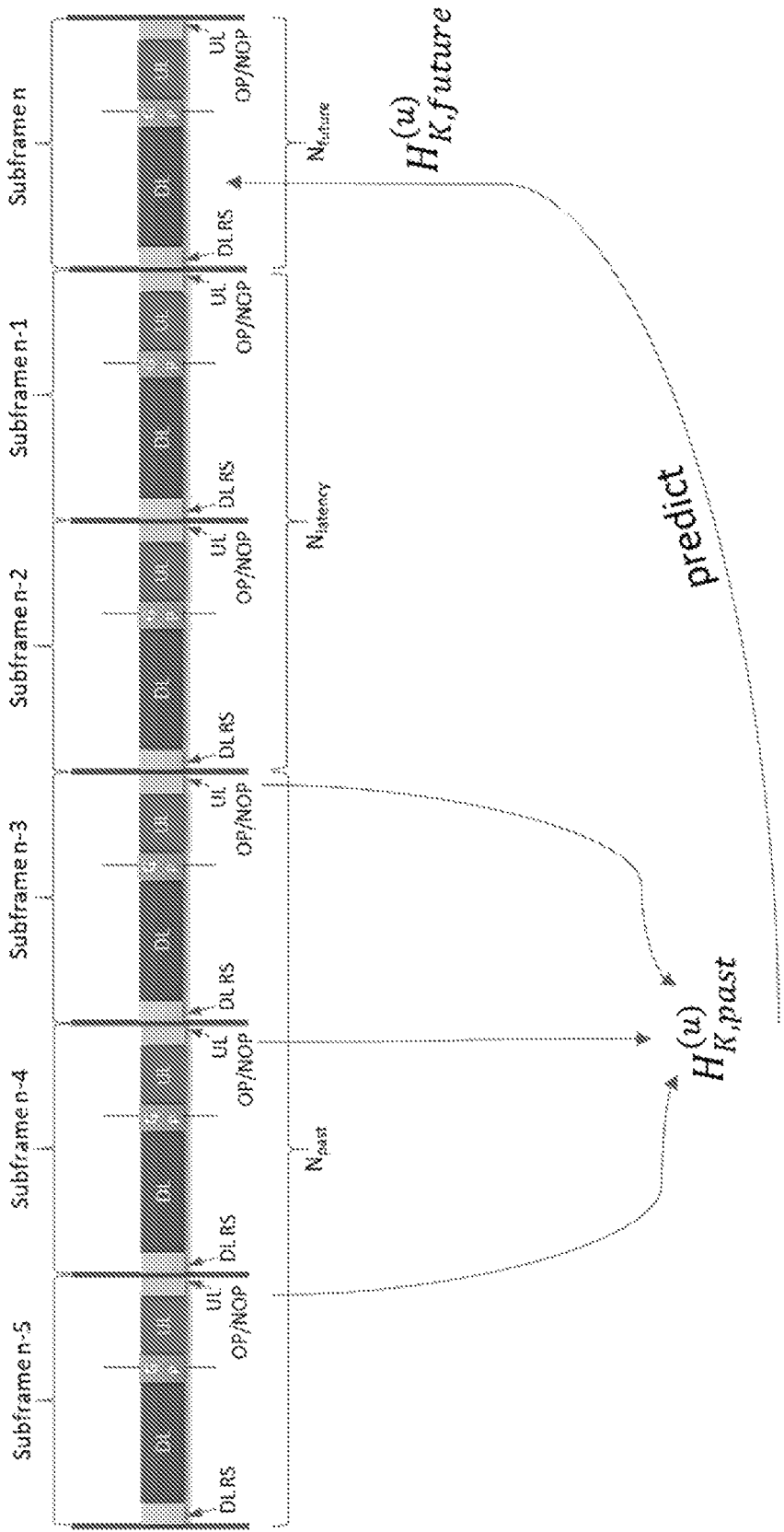
FIG. 47 shows an example of prediction for channel estimation.

For each subframe with a precoded downlink transmission, the base-station should schedule all the users of that transmission to send uplink non-orthogonal pilots for $N_{past}$ consecutive subframes, starting $N_{past} + N_{latency}$ subframes before it, as shown in FIG. 47. The base-station will separate the non-orthogonal pilots of each user, compress it and store the channel response as $H_{K,past}^{(u)}$. Then, it will apply the prediction filter to get the compressed channel response for the future part $$H_{K,future}^{(u)} = C_{PR}^{(u)} \cdot H_{K,past}^{(u)}$$

Finally, the uncompressed channel response is computed as $$H_{future}^{(u)} = \tilde{V}^{(u)} \cdot H_{K,future}^{(u)}$$

The base-station may correct for differences in the reciprocal channel by applying a phase and amplitude correction, $\alpha(f)$, for each frequency grid-element $$H_{future\_reciprocity}^{(u)}(f) = \alpha(f) \cdot H_{future}^{(u)}(f)$$

Then, use $H_{future\_reciprocity}^{(u)}$ and $R_E^{(u)}$ of the participating users to compute the precoder for the downlink transmission.

Scheduling of the Uplink Pilots

If during a frame there are multiple orthogonal resources available for pilot transmission (e.g., different timeslots or different frequency grid elements), then the set of uplink pilots that needs to be transmitted can be divided into sets such that each set is transmitted on a different resource. The criterion of for the division into sets can be, e.g., the achievable pilot SINR. The transmission of non-orthogonal pilots leads to a reduction in the achievable pilot SINR, which is the more pronounced the stronger the alignment of the vector spaces containing the correlation matrices from different users is. Thus, arranging users in sets such that two pilots with very similar correlation matrices are not transmitted at the same time improves performance. However, other criteria are possible as well. For example, for users that have only a low SINR during data transmission, achieving a high pilot SINR might be wasteful; thus, achieving an optimal "matching" of the pilot SINR to the data SINR might be another possible criterion.

The embodiments of the disclosed technology described in this section may be characterized, but not limited, by the following features:

A wireless system in which a network node performs precoded downlink transmissions, which support a massive number of users, consisting of channel prediction, reciprocity adjustment and precoding, based on the second-order statistics of the channels.

A system including a mix of uplink orthogonal pilots and non-orthogonal pilots.

Computing the second-order statistics of a channel based on orthogonal pilots.

Separating non-orthogonal pilots from multiple users, using second-order statistics and computation of channel estimation.

Training for prediction of channel estimates.

Scheduling non-orthogonal uplink pilots based on second-order statistics.

Compressing channel responses using PCA

FIGS. 48-52 are flowchart representations of examples of wireless communication methods for channel estimation in OTFS systems.

FIG. 48 is a flowchart showing operations performed in an example method 4800 for wireless communication. The method 4800 includes, at step 4802, performing channel training at a receiving wireless device based on reception of orthogonal pilots from multiple transmitting device antennas over a wireless channel; wherein the channel training includes determining second order statistics of time variations in the wireless channel.

FIG. 49 is a flowchart showing operations performed in an example method 4900 for wireless communication. The method 4900 includes, at step 4902, receiving, using multiple receive antennas, from a number of user devices, non-orthogonal pilots wherein at least some transmissions of the non-orthogonal pilots from different user devices overlap in at least some time and frequency resources.

The method 4900 includes, at step 4904, estimating individual pilots from the number of user devices by computing a pilot separation filter for each antenna.

The method 4900 includes, at step 4906, estimating the wireless channel at time and frequency resources used by the non-orthogonal pilots by filtering the receiving signal at the multiple receiver antennas.

Figure 50:
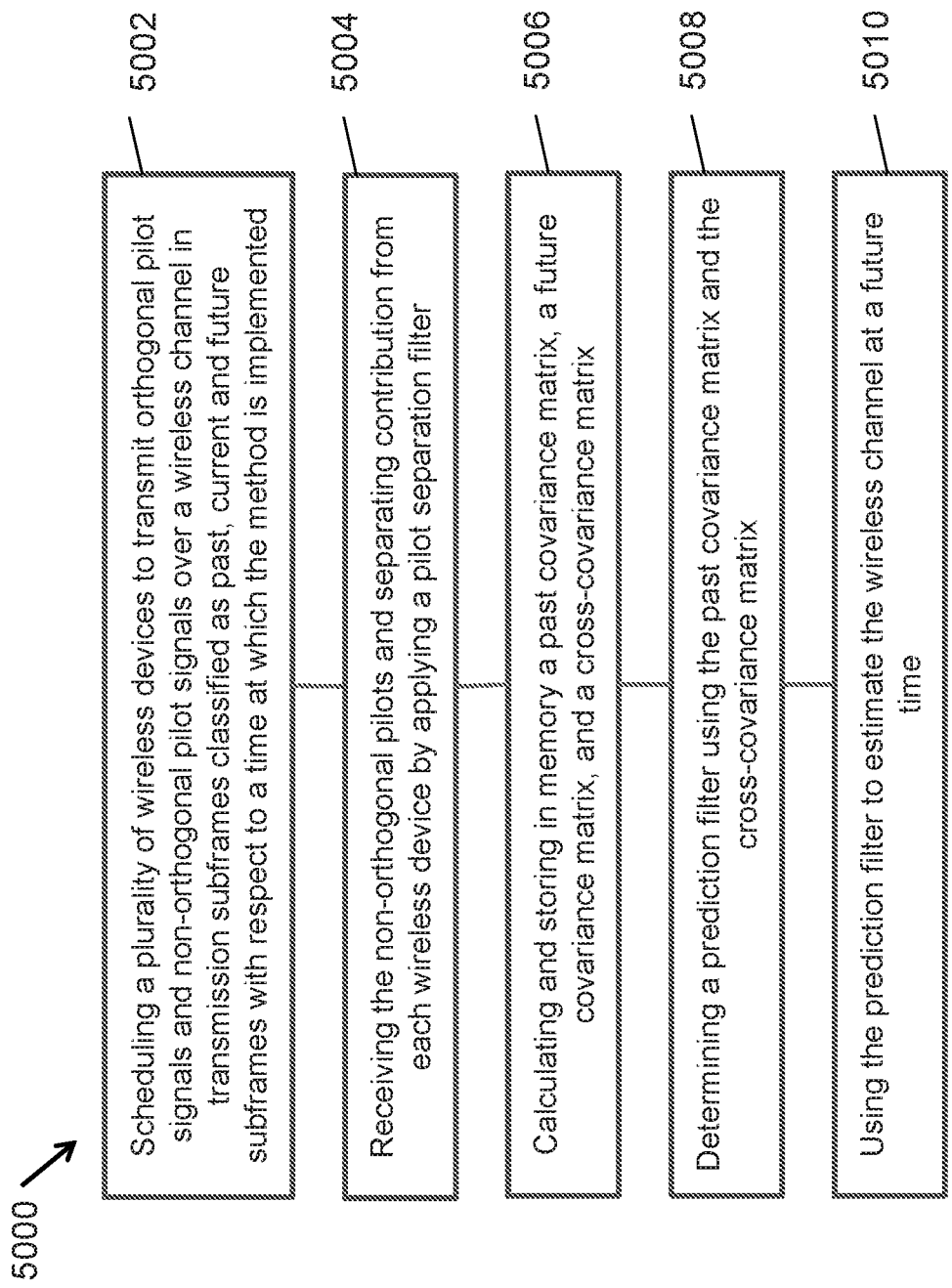

FIG. 50 is a flowchart showing operations performed in an example method 5000 for wireless communication. The method 5000 includes, at step 5002, scheduling a plurality of wireless devices to transmit orthogonal pilot signals and non-orthogonal pilot signals over a wireless channel in transmission subframes classified as past, current and future subframes with respect to a time at which the method is implemented.

The method 5000 includes, at step 5004, receiving the non-orthogonal pilots and separating contribution from each wireless device by applying a pilot separation filter.

The method 5000 includes, at step 5006, calculating and storing in memory a past covariance matrix, a future covariance matrix, and a cross-covariance matrix.

The method 5000 includes, at step 5008, determining a prediction filter using the past covariance matrix and the cross-covariance matrix The method 5000 includes, at step 5010, using the prediction filter to estimate the wireless channel at a future time.

Figure 51:
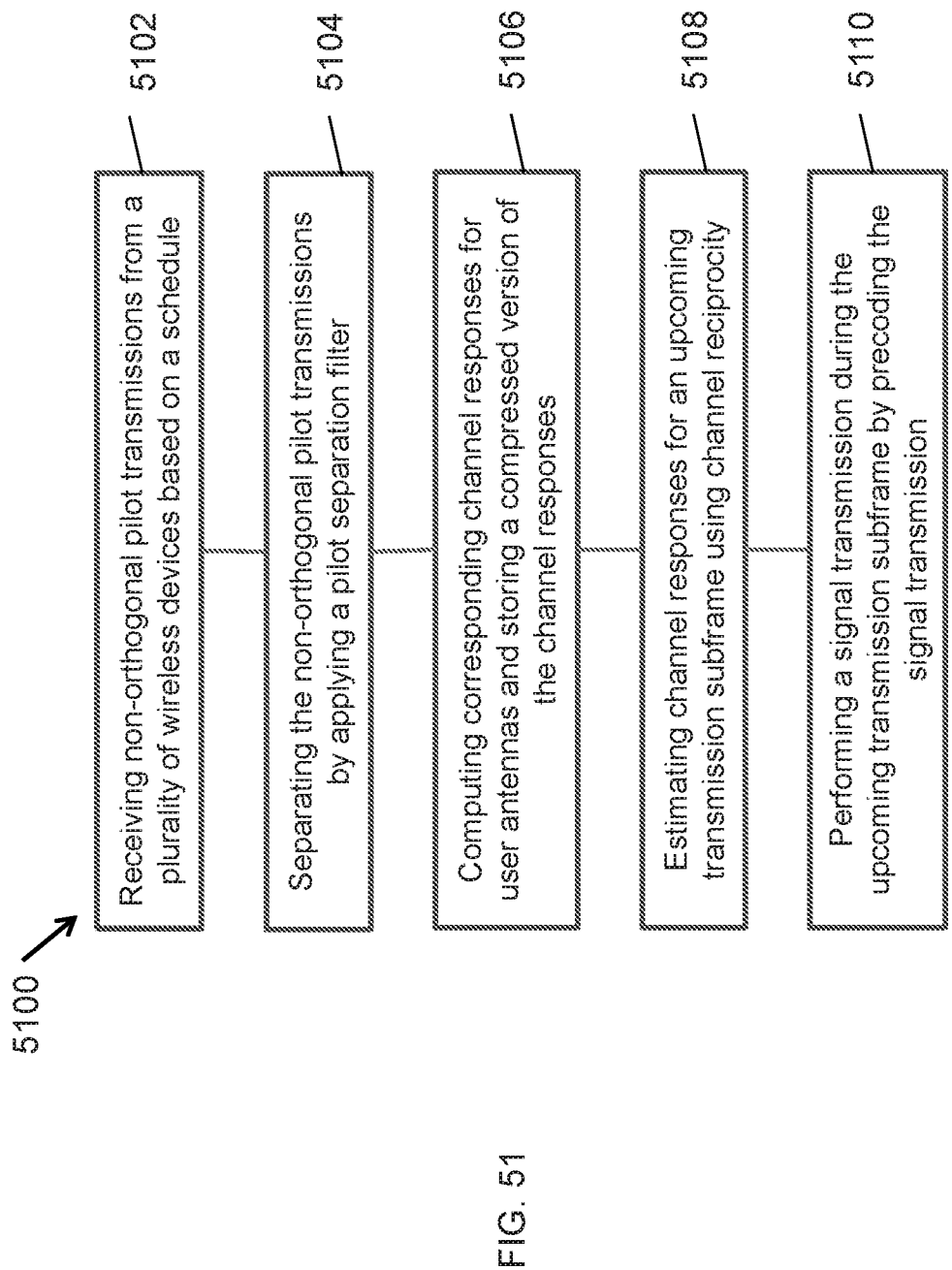

FIG. 51 is a flowchart showing operations performed in an example method 5100 for wireless communication. The method 5100 includes, at step 5102, receiving non-orthogonal pilot transmissions from a plurality of wireless devices based on a schedule.

The method 5100 includes, at step 5104, separating the non-orthogonal pilot transmissions by applying a pilot separation filter.

The method 5100 includes, at step 5106, computing corresponding channel responses for user antennas and storing a compressed version of the channel responses.

The method 5100 includes, at step 5108, estimating channel responses for an upcoming transmission subframe using channel reciprocity.

The method 5100 includes, at step 5110, performing a signal transmission during the upcoming transmission subframe by precoding the signal transmission.

Figure 52:
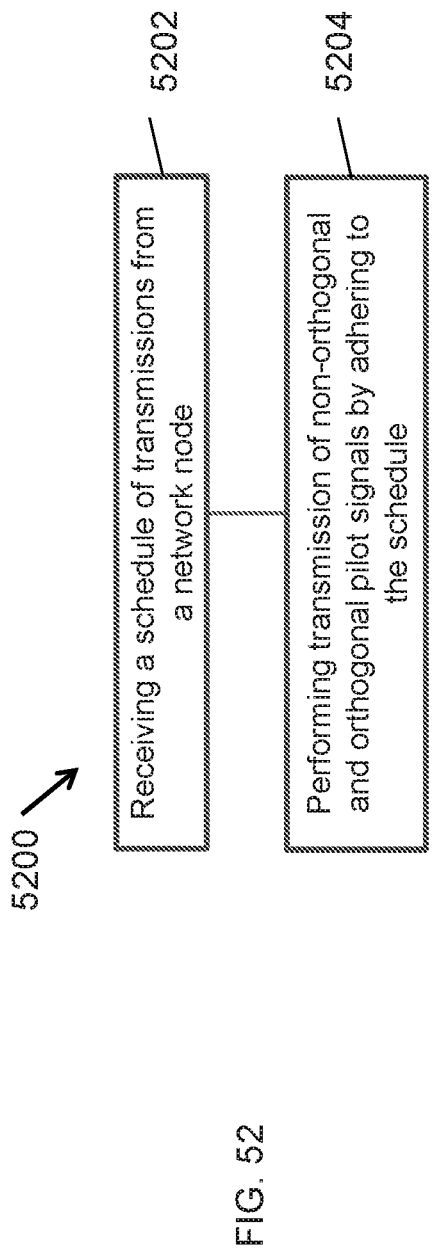

FIG. 52 is a flowchart showing operations performed in an example method 5200 for wireless communication. The method 5200 includes, at step 5202, receiving a schedule of transmissions from a network node. The method 5200 includes, at step 5204, performing transmission of non-orthogonal and orthogonal pilot signals by adhering to the schedule.

Some embodiments and techniques related to methods 4800, 4900, 5000, 5100 and 5200 may be described using clause-based descriptions throughout the present document.

A1. A wireless communication method, implementable by a wireless communication apparatus, comprising: performing channel training at a receiving wireless device based on reception of orthogonal pilots from multiple transmitting device antennas over a wireless channel; wherein the channel training includes determining second order statistics of time variations in the wireless channel. The channel training may be used, for example, for subsequent modulation and other operational parameter changes in communication between the receiving wireless device and the multiple transmitting devices. For example, the channel training may be used to determine modulation and coding indexes or pre-coding matrices, and so on. Various examples of second order statistics of the channel with respect to the temporal dimension are provided throughout the present document.

A2. The method of clause A1, wherein the determining second order statistics includes, for each received subframe with orthogonal pilot, and for each of a plurality of receive antennas, determining an estimate of the wireless channel and computing a covariance matrix of the estimate as a function of time. Mathematical formulas and various computational approaches for determining the covariance matrix are described throughout the present document, e.g., in Section 3 with respect to the covariance matrix $R_{HH}^{(u)}$.

A3. The method of clause A2, wherein the estimate of the wireless channel is performed over an entire frequency band. For example, unlike traditional OFDMA techniques, where a channel is directly estimated only for the subband(s) occupied by a pilot signal, and channel at intermediate subbands is inferred from the measured channel response in the pilot subbands, the present technology may be used to perform a channel estimate over the entire bandwidth of the wireless channel.

A4. The method of clauses A1-A3, further including implementing the method for each antenna of the multiple transmitting devices. For example, individual statistics may be calculated for each receive antenna and a channel estimate may be performed for each antenna.

A5. The method of clauses A1-A3, wherein periodicity of occurrence of the orthogonal pilots is greater than an estimated time period over which the estimate of the wireless channel is constant. Here, "constant" would mean, for example, within a threshold (e.g., less than 5 percent) or within a tolerance that the variation in the estimate does not produce a greater than 0.2 to 0.5 dB change to the pre-coding coefficients in terms of SNR.

A6. The method of clause A2, wherein the determining the second order statistics includes performing principal component analysis in which a number of most dominant eigenvalues of the covariance matrix are used; and using an approximation of the covariance matrix based on the principal component analysis for determining the second order statistics. For example, the number of most dominant eigenvalues may be determined based on energy in the eigenvalues to within 80-99 percent of the total energy of eigenvalues.

A7. A method of estimating a wireless channel, including: receiving, using multiple receive antennas, from a number of user devices, non-orthogonal pilots wherein at least some transmissions of the non-orthogonal pilots from different user devices overlap in at least some time and frequency resources; estimating individual pilots from the number of user devices by computing a pilot separation filter for each antenna; and estimating the wireless channel at time and frequency resources used by the non-orthogonal pilots by filtering the receiving signal at the multiple receiver antennas. The estimate of the wireless channel may be used to modify subsequent communication between the user devices and the device fitted with the multiple receive antennas.

A8. The method of clause A7, wherein the computing the pilot separation filter is performed using a principal component analysis.

A9. The method of clause A7, wherein the computing the pilot separation filter is performed by a direct computation of covariance matrices for each user antenna.

A10. The method of any of clauses A7-A9, wherein the computing the pilot separation filter further uses second order statistics of all channels of a selected set of the number of user devices.

A11. A method of wireless communication; comprising: scheduling a plurality of wireless devices to transmit orthogonal pilot signals and non-orthogonal pilot signals over a wireless channel in transmission subframes classified as past, current and future subframes with respect to a time at which the method is implemented; receiving the non-orthogonal pilots and separating contribution from each wireless device by applying a pilot separation filter; calculating and storing in memory a past covariance matrix, a future covariance matrix, and a cross-covariance matrix; determining a prediction filter using the past covariance matrix and the cross-covariance matrix; and using the prediction filter to estimate the wireless channel at a future time.

A12. The method of clause A11, wherein the determining the prediction filter includes using an average of the past covariance matrix with other past covariance matrices calculated for past subframes.

A13. The method of any of clauses A11-A12, wherein the determining the prediction filter includes using an average of the future covariance matrix with other future covariance matrices calculated for future subframes.

A14. The method of any of clauses A11-A13, wherein the determining the prediction filter includes using an average of a past-future cross-covariance matrix with other past-future covariance matrices calculated for past and future subframes.

The number of past or future frames used may be predetermined based on expected variability in the channel response. In some embodiments, the number of past or future frames used may be adjusted based on a desired responsiveness to time-varying nature of the channel and availability of computational resources.

A15. The method of any of clauses A11-A13, further including calculating a prediction error covariance matrix for the computation of the precoder.

A16. The method of clause A11, wherein the calculating and storing operation includes storing an intermediate estimated channel matrix based on the non-orthogonal pilots.

A17. The method of clause A12, wherein the intermediate estimated channel matrix is stored in a compressed format by using a corresponding eigenvector matrix representation.

A18. The method of clause A11, wherein the future covariance matrix is computed from interpolation of channel response based on received non-orthogonal pilot signals.

A19. A method of wireless communication, performed by a network node, comprising: receiving non-orthogonal pilot transmissions from a plurality of wireless devices based on a schedule; separating the non-orthogonal pilot transmissions by applying a pilot separation filter; computing corresponding channel responses for user antennas and storing a compressed version of the channel responses; estimating channel responses for an upcoming transmission subframe using channel reciprocity; and performing a signal transmission during the upcoming transmission subframe by precoding the signal transmission. The network node may be a base station, or an access point, a fixed wireless access point, or variously called as eNodeB, gNB, and so on.

A20. The method clause A19, wherein the precoding includes using an approximation of inverse of the channel responses for the upcoming transmission subframe.

A21. The method of clause A19, wherein further including communicating, prior to transmission of the non-orthogonal pilot transmissions by the plurality of user devices, the schedule to the plurality of user devices.

A22. The method of clause A19, wherein the pilot separation filter is computed using a principal component analysis.

A23. The method of clause A19, wherein the pilot separation filter is computed by a direct computation of covariance matrices for each user antenna.

A24. The method of clause A19, wherein the schedule is generated such that two pilot transmissions with similar correlation matrices are transmitted in non-overlapping time resources.

A25. The method of clause A19, wherein the schedule is generated using an estimate of signal to interference plus noise (SINR) estimate of each non-orthogonal pilot transmission such that data SINR and pilot SINR for each user device are proportional to each other.

A26. A wireless communication method implemented at a wireless device, comprising: receiving a schedule of transmissions from a network node, and performing transmission of non-orthogonal and orthogonal pilot signals by adhering to the schedule.

Section 4: Pilot Scheduling to Reduce Transmission Overhead

This section covers scheduling pilots to reduce transmission overhead and improve the throughput of a wireless communication system. One possible FWA system design is based on separating users based on their angular power spectra. For example, users can operate in parallel if they do not create "significant" interference in each other's "beams." A beam may for example be a Luneburg beam. A precoding vector can also be associated with a beam pattern. However, for ease of explanation, the word "precoder pattern" is used in the present description. Consider as an example a system with 8 beams in a 90-degree sector, such that any two adjacent beams have overlapping beam patterns, while beams whose difference of indices is at least 2 are orthogonal to each other. If there is a pure line of sight (LoS), or a small angular spread around the LoS direction, then a spatial reuse factor of 2 may be possible. For example, beams 1, 3, 5, and 7 can operate in parallel (and similarly beams 2, 4, 6, 8). However, most channels provide a larger angular spread than can be handled by such a configuration, so that only beams with a wider angular separation may use the same time/frequency resources; e.g., a reuse factor on the order of 4 may be achieved. This means that only 2 users can operate on the same time-frequency resources within one sector, so that the overall performance gain compared to traditional systems is somewhat limited.

Considerably better spatial reuse can be achieved when the user separation is based on instantaneous channel state information, using joint receive processing of the multiple beam signals, and joint precoding, for the uplink and downlink, respectively. To take the example of the uplink, with N antenna (beam) ports, N signals can be separated, so that N users can be active at the same time (and analogously for the downlink). The simplest way to achieve this is zero-forcing, though it may suffer from poor performance in particular if users are close together (in mathematical terms, this occurs if their channel vectors are nearly linearly dependent). More sophisticated techniques, such as turbo equalization in the uplink, and Tomlinson-Harashima Precoding (THP) in the downlink can improve the performance further. Such implementations can increase signal to interference plus noise ratio (SINR) for the users, though they may not increase the degrees of freedom.

However, while these methods have great advantages, they rely on the knowledge of the instantaneous channel state information (CSI) for the processing, while the beam-based transmission can be performed simply by the time-averaged (for FWA) or second order (for mobile) systems CSI. The problem is aggravated by two facts:

1) while N users can be served in parallel (since they are separated by their different instantaneous CSI), the pilots cannot be separated this way (because the CSI is not yet known when the pilots are transmitted—it is a "chicken and egg" problem). Thus, pilots can be separated based on their average or second-order statistics.

2) OTFS modulation may have a higher pilot overhead compared to, e.g., OFDMA, because of the spreading of the information over the whole time-frequency plane, such that each user attempts to determine the CSI for the whole bandwidth.

Example System Model and Basic Analysis

A. Assumptions for the Analysis

An example system is described and for ease of explanation, the following assumptions are made:

1) Luneburg lens with 8 beams. Adjacent beams have overlap, beams separated by at least 1 other beam have a pattern overlap separation of better than 30 dB. However, in general, any number of beams may be used.

2) For the uplink, no use of continuous pilots. Channels might be estimated either based on the pilots embedded in the data packets. Alternatively, placing a packet in a queue for, say 4 ms, to allow transmission of uplink pilots before the transmission of data can improve channel estimation performance.

3) For the downlink, every UE observes broadcast pilots, which, in this example, are sent periodically or continuously, and extrapolates the channel for the next downlink frame. It then might send this information, in quantized form, to the BS (for the case that explicit channel state feedback is used).

4) The discussion here only considers the basic degrees of freedom for the pilot tones, not the details of overhead associated with delay-Doppler versus time-frequency multiplexing. In some implementations, both may give approximately the same overhead.

5) A frame structure with 1 ms frame duration is used. Different users may transmit in different frames. It is assumed that in the uplink and for the precoded pilots of the downlink, two pilots are transmitted per user, one at the beginning of the frame, and one at the end of the frame, so that interpolation can be done. For the broadcast pilots in the downlink, this may not be done, since it will be transmitted once per frame anyway, so that interpolation and extrapolation is implicitly possible.

6) A system bandwidth of 10 MHz is assumed.

B. Efficiency of an Example System

The following presents a first example calculation of the pilot overhead when the pilots in all beams are kept completely orthogonal. For the example, first compute the degrees of freedom for the pilot for each user. With 10 MHz bandwidth and 1 ms frame duration, and two polarizations, there are in general 10,000 "resolvable bins" (degrees of freedom) that can be used for either data transmission or pilot tone transmission. The propagation channel has 200 degrees of freedom (resolvable delay bin 100 ns and 5 microseconds maximum excess delay means 50 delay coefficients characterize the channel, plus two resolvable Doppler bins within each channel, on each of two polarizations). Thus, the pilot tones for each user constitute an overhead of 2% of the total transmission resources. Due to the principle of OTFS of spreading over the whole system bandwidth and frame duration, the pilot tone overhead does not depend on the percentage of resources assigned to each user, but is a percentage of taken over all resources. This implies a high overhead when many users with small number of bytes per packet are active.

If completely orthogonalizing the users in the spatial and polarization domains, then the pilot overhead gets multiplied with the number of beams and polarizations. In other words, reserve a separate delay-Doppler (or time-frequency) resource for the pilot of each beam, which ensures that there is no pilot contamination. The broadcast pilots in the downlink need therefore 16% of the total resources (assuming communication in a sector) or 64% (for a full circular cell). The following examples will mostly concentrate on a single sector.

Similarly, for the uplink pilots, orthogonal pilots may be used for each of the users, in each of the beams. This results in a 16% overhead per user; with multiple users, this quickly becomes unsustainable.

The overhead for digitized feedback from the users can also be considerable. Since there are 200 channel degrees of freedom, quantization with 24 bit (12 bits each on I and Q branch) results in 4.8 Mbit/s for each user. Equivalently, if assuming on average 16 QAM (4 bit/s/Hz spectral efficiency), 1200 channel degrees of freedom are used up for the feedback of quantized information from a single user. This implies that the feedback of the digitized information is by a factor 6 less spectrally efficient than the transmission of an analog uplink pilot whose information can be used. Furthermore, the feedback is sent for the channel state information (CSI) from each BS antenna element to the customer premises equipment (CPE) or user device. Even though the feedback can be sent in a form that allows joint detection, in other words, the feedback info from users in different beams can be sent simultaneously, the overall effort for such feedback seems prohibitively large.

In addition, it is useful to consider the overhead of the embedded pilots for the downlink, where they are transmitted precoded in the same way as the data, and thus are used for the demodulation. By the nature of zero-forcing precoding, pilots can be transmitted on each beam separately. Thus, the overhead for the embedded downlink pilots is about 2% of the resources times the average number of users per beam.

For explicit feedback, there is yet another factor to consider, namely the overhead for the uplink pilots that accompany the transmission of the feedback data. This tends to be the dominant factor. Overhead reduction methods are discussed in the next section.

Overhead Reduction Methods

From the above description, it can be seen that overhead reduction is useful. The main bottlenecks indeed are the downlink broadcast pilots and the uplink pilots, since these pilots have to be sent on different time-frequency (or delay/Doppler) resources in different beams. However, under some circumstances, overhead reduction for the feedback packets is important as well. Before going into details, it is worth repeating why transmitters cannot transmit pilots on all beams all the time. Neither the UL pilots nor the broadcast DL pilots are precoded. To separate the pilots from/to different users, transmitters would have to beamform, but in order to beamform, a transmitter should know the channel, e.g., have decided pilots. Thus, a continuous transmission of pilots leads to "pilot contamination", e.g., the signals from/to users employing the same pilots interfere with each other and lead to a reduced pilot SINR. Since the pilot quality determines the capability of coherently decoding the received data signal, reduction of the pilot SINR is—to a first approximation—as detrimental as reduction of the data SINR. While countermeasures such as joint equalization and decoding are possible, they greatly increase complexity and still result in a performance loss.

One effective method of reducing pilot contamination is minimum mean square error (MMSE) filtering, which achieves separation of users with the same pilot tones by projection of the desired users' pilot onto the null-space of the channel correlation matrix of the interfering user. This reduces interference, though at the price of reduced signal power of the desired user. This method can be combined with any and all of the methods described below, and, in some situations, such a combined method will achieve the best performance. In some embodiments, linearly dependent pilot tones for the different users (instead of sets of users that use the same pilots within such a set, while the pilots in different sets are orthogonal to each other) may be used. Again, such a whitening approach can be used in conjunction with the methods described here.

A. Pilot Scheduling

The previous derivations assumed that the downlink broadcast and uplink pilots in different beams are on orthogonal resources, in order to reduce the overhead. Such an arrangement may not be needed when the angular spectra of the users are sufficiently separated. The simplest assumption is that each user has only a very small angular spread; then users that are on beams without overlaps (beam 1, 3, 5, . . . etc.) can be transmitted simultaneously. For a larger angular spread, a larger spacing between the beams is used.

Still, if, e.g., every 4th beam can be used, then the overall overhead for the downlink broadcast pilots reduces, e.g., from 32% to 16% in one sector. Equally importantly, the overhead remains at 16% when moving from a sector to a 360 degree cell.

However, this consideration still assumes that there is a compact support of the angular power spectrum, and there is no "crosstalk", e.g., between a beam at 0 degree and one at 60 degree. Often, this is not the case. In the presence of scattering objects, the sets of directions of contributions from/to different user devices can be quite different, and not simply a translation (in angle domain) of each other. If simply basing the beam reuse on the "worst case", one might end up with complete orthogonalization. Thus, for every deployment, it is useful to assess individually what the best pattern is for a spatial reuse of the pilots. This is henceforth called "pilot scheduling".

Before describing some examples of pilot scheduling embodiments, note that it is based on the knowledge of the power transfer matrix (PTM). The PTM may be a K×M matrix, where M is the number of beams at the BS, and K is the number of UEs. The (I,j)th entry of the PMT is then the amount of power (averaged over small-scale fading or time) arriving at the j-th beam when the i-th UE transmits with unit power (one simplification we assume in this exemplary description is that the PTM is identical for the two polarizations, which is reasonable, e.g., when there is sufficient frequency selectivity such that OTFS averages out small-scale fading over its transmission bandwidth; in any case generalization to having different PMT entries for different polarization ports is straightforward). For example, in the uplink, the receiver (base station) should know when a particular user transmits a pilot tone, in which beams to anticipate appreciable energy. This might again seem like a "chicken and egg" problem, since the aim of the pilot transmission is to learn about the channel between the user and the BS. However, the PTM is based on the knowledge of the average or second order channel state information (CSI). Since this property of a channel changes very slowly (on the order of seconds for mobile systems, on the order of minutes or more for FWA), learning the PTM does not require a significant percentage of time-frequency resources. While provisions should be taken in the protocol for suitable mechanisms, those pose no fundamental difficulty, and the remainder of the report simply assumes that PIM is known.

1) Pilot scheduling for the uplink: as mentioned above, the PTM contains information about the amount of power that is transferred from the ith user to the jth beam. Now, given the PTM, the question is: when can two uplink pilots be transmitted on the same time-frequency resources?

The answer may depend on the subsequent data transmission, for example, if the criterion is: "is the loss of capacity resulting from the imperfect beamforming vectors is less than the spectral efficiency gain of the reduced pilot overhead". Conventional techniques do not consider such a criterion. This aspect of inquiry can be used in many advantageous ways:

a) It is not necessary to have highly accurate (contamination-free) pilots if the subsequent data transmission uses a low-order QAM anyways.

b) The pilot scheduling depends on the receiver type. First, different receivers allow different modulation schemes (even for the same SINR). Second, a receiver with iterative channel estimation and data decoding might be able to deal with more pilot contamination, since it processes the decoded data (protected by forward error correction FEC) to improve the channel estimates and reduce contamination effects.

c) The pilot scheduling, and the pilot reuse, may change whenever the transmitting users change. A fixed scheduling, such as beams 1, 5, 9, . . . etc. may be highly suboptimum.

d) Given the high overhead for uplink pilots, allowing considerable pilot contamination, and use of associated low SINR and modulation coding scheme (MCS), is reasonable, in particular for small data packets.

e) For an FWA system, it may be reasonable to allow uplink transmission without embedded pilots, basing the demodulation solely on the average channel state. However, due to the clock drift, a few pilots for phase/timing synchronizations may still be used, but no pilots may be used for channel re-estimation. For those short packets, a reduced-order MCS may be used. Alternatively, the short packets could be transmitted on a subband of the time-frequency resources, where the subband could even be selected to provide opportunistic scheduling gain.

The optimum scheduler may be highly complicated, and may change whenever the combination of considered user devices changes. Due to the huge number of possible user combinations in the different beams, it may not even possible to compute the optimum scheduler for each combination in advance and then reuse. Thus, a simplified (and suboptimum) scheduler may have to be designed.

2) Pilot scheduling for the downlink: The scheduler for the downlink broadcast pilots has some similarities to the uplink pilots, in that it is based on the PTM. However, one difference is worth noting: the scheduler has to provide acceptable levels of pilot contamination for all users in the system, since all users are monitoring the broadcast pilots and extrapolate the channel in order to be able to feed back the extrapolated channel when the need arises. Thus, the reuse factor of the broadcast pilots may be large (meaning there is less reuse) than for the uplink pilots. For the computation of the pilot schedule, a few things may be taken into account:

a) the schedule may only be changed when the active user devices change, e.g., a modem goes to sleep or wakes up. This happens on a much rarer basis than the schedule change in the uplink, which happens whenever the actually transmitting user devices change.

b) In the downlink pilots, it may not be exactly known what pilot quality will be required at what time (e.g., the required SINR), since the transmitting user schedule is not yet known (e.g., when the pilots are transmitted continuously). Thus, it may be assumed that data transmission could occur without interference (e.g., all other beams are silent because there are no data to transmit), so that the data transmission for the user under consideration happens with the MCS that is supported by the SNR.

c) It is possible that one (or a few) user devices become a "bottleneck", in the sense that they require a large reuse factor when all other users might allow dense reuse. It is thus useful to consider the tradeoff of reducing the pilot quality to these bottleneck user devices and reducing the MCS for the data transmission, as this might lead to an increase of sum spectral efficiency, and may be performed by taking minimum (committed) service quality constraints into account.

Since broadcast pilots are always transmitted from the BS, and can be only either transmitted or not transmitted (there is no power control for them), the number of possible combinations is manageable ($2^8$), and it is thus possible to compute the SINR at all users in the cell for all pilot schedules, and check whether they result in acceptable SNR at all users, and pick the best one. As outlined above, there is no need to recompute the schedule, except when the set of active user devices changes. When considering a combination of this scheme with MMSE receivers, scheduling should be based on the SINR that occurs after the MMSE filtering.

B. Exploiting the Properties of FWA

One way for reducing the overhead is to exploit the special properties of FWA channels, namely that the instantaneous channel is the average channel plus a small perturbation. This can be exploited both for reducing the reuse factor, and for more efficient quantization.

1) Reducing the reuse factor: The goal of the pilot tones is to determine the CSI for each user device with a certain accuracy. Let us consider the uplink: for the i-th user in the j-th beam, the CSI can be written as $H^{av}_{ij}+\Delta H_{ij}$; the power ratio $(\Delta H_{ij}/H^{av}_{ij})^2$ is the temporal Rice factor for this particular link $K_{ij}$. Now any pilot contamination based on $H^{av}_{ij}$ is known and can be eliminated by interference cancellation. Thus, denoting the kj-th entry of the PTM $C_{kj}$, then a naïve assessment of the pilot contamination would say that the achievable pilot SIR in the j-th beam is $C_{ij}/C_{kj}$. However, by first subtracting the known contribution $H^{av}_{kj}$ from the overall received signal, $K_{kj}C_{ij}/C_{kj}$ can be achieved. Having thus improved the SIR for each user, the system can employ a much smaller reuse factor (that is, reduce overhead). In practice this method can probably reduce the reuse factor by about a factor of 2. The same approach can also be applied in the downlink. The improvement that can be achieved will differ from user device to user device, and the overall reuse factor improvement will be determined by the "bottleneck links" (the ones requiring the largest reuse factor). Some embodiments can sacrifice throughput on a few links if that helps to reduce the pilot reuse factor and thus overhead, as described above. When combining this method with MMSE filtering, the procedure may occur in two steps: first, the time-invariant part of the channel is subtracted. The time-variant part is estimated with the help of the MMSE filtering (employing the channel correlation matrix of the time-variant part), and then the total channel is obtained as the sum of the time-invariant and the thus-estimated time-variant channel.

2) Improved quantization: Another question is the level of quantization that is to be used for the case that explicit feedback is used. Generally, the rule is that quantization noise is 6 dB for every bit of resolution. The 12 bit resolution assumed above for the feedback of the CSI thus amply covers the desired signal-to-quantization-noise ratio and dynamic range. However, in a fixed wireless system, implementations do not need a large dynamic range margin (the received power level stays constant except for small variations), and any variations around the mean are small. Thus, assume a temporal Rice factor of 10 dB, and an average signal level of −60 dBm. This means that the actual fluctuations of the signal have a signal power of −70 dBm. 4-bit quantization provides −24 dB quantization noise, so that the quantization noise level is at −94 dBm, providing more than enough SIR. Embodiments can thus actually reduce the amount of feedback bits by a factor of 3 (from 12-bit as assumed above to 4 bits) without noticeable performance impact.

3) Adaptivity of the methods: The improvements described above use the decomposition of the signal into fixed and time-varying parts, and the improvements are the larger the larger the temporal Rice factor is. Measurements have shown that the temporal Rice factor varies from cell to cell, and even UE to UE, and furthermore might change over time. It is thus difficult to determine in advance the reduction of the reuse factor, or the suitable quantization. For the reduction of the reuse factor, variations of the Rice factor from cell to cell and between user devices such as UEs can be taken care of as a part of the pilot scheduling design, as described above. Changes in the temporal Rice factor (e.g., due to reduced car traffic during nighttime, or reduction of vegetation scatter due to change in wind speed) might trigger a new scheduling of pilots even when the active user set has not changed. For the quantization, the protocol should not contain a fixed number of quantization bits, but rather allow an adaptive design, e.g., by having the feedback packet denote in the preamble how many bits are used for quantization.

C. Reduction Methods for Small Packet Size

The most problematic situation occurs when a large number of users, each with a small packet, are scheduled within one frame. Such a situation is problematic no matter whether it occurs in the uplink or the downlink, as the pilot overhead in either case is significant. This problem can be combatted in two ways (as alluded to above)

1) reduce the bandwidth assigned to each user. This is a deviation from the principle of full-spreading OTFS, but well aligned with other implementations of OTFS that can assign a subband to a particular user, and furthermore to various forms of OFDMA.

The two design trade-offs of the approach are that (i) it may use a more sophisticated scheduler, which now considers frequency selectivity as well, and (ii) it is a deviation from the simple transmission structure described above, where different users are designed different timeslots and/or delay/Doppler bins. Both of these issues might be solved by a multi-subband approach (e.g., 4 equally spaced subbands), though this may trade off some performance (compared to full OTFS) and retains some significant pilot overhead, since at least CSI in the 4 chosen subbands has to be transmitted.

2) transmit the small packets without any pilots, relying on the average CSI for suppression of inter-beam interference. It is noteworthy that for the downlink, an implementation can sacrifice SIR (due to pilot contamination) on some links without disturbing others. Imagine that precise CSI for UE j is available, while it is not available for UE k. An implementation can thus ensure that the transmission for k lies in the exact null-space of j, since the CSI vector $hj=[h_{1j}; h_{2j}; \ldots]$ is known accurately, and thus its nullspace can be determined accurately as well. So, if the link to j wants to send a big data packet for which the use of a high-order MCS is essential, then the system can invest more resources (e.g., reduce pilot imprecision) for this link, and reap the benefits.

3) For the uplink, the approach 2 may not work: in order to have high SINR for the signal from the j-th user, it is advantageous to suppress the interference from all other users that are transmitting in parallel. Thus, instead one approach may be to provide orthogonalization in time/frequency (or delay/Doppler) between the group of users that needs low pilot contamination (usually large packets, so that the efficiency gain from transmitting pilots outweighs the overhead), and another group of users (the ones with small packets) that do not transmit pilots (or just synchronization pilots) and thus are efficient, yet have to operate with lower-order MCS due to the pilot contamination. It must be noted that methods 2 and 3 only work for FWA systems, where one can make use of the average CSI to get a reasonable channel estimate without instantaneous pilots. When migrating to a mobile system, it is recommended to move to approach 1.

Examples for the Achievable Gain

This section describes some examples of the gain that can be achieved by the proposed methods versus a baseline system. It should be noted that the gain will be different depending on the number of users, the type of traffic, and particularly the directional channel properties. There are examples where the simple orthogonalization scheme provides optimum efficiency, so that no gain can be achieved, and other examples where the gain can be more than an order of magnitude. The section will use what can be considered "typical" examples. Ray tracing data for typical environments and traffic data from deployed FWA or similar systems, for example, can be used to identify a typical or representative system.

A. Gain of Pilot Scheduling

One purpose of pilot scheduling is to place pilots on such time-frequency resources that they either do not interfere significantly with each other, or that the capacity loss by using more spectral resources for pilots is less than the loss one would get from pilot contamination. In a strictly orthogonal system, there is no pilot contamination, but 16% of all spectral resources must be dedicated to the downlink pilots, and a fraction 0.16*Nupb of the resources for the uplink pilots, where Nupb is the number of users per beam in the uplink. For a full 360 degree cell, the numbers are 64% and 0.64*Nupb.

A possibly simplest form of pilot scheduling is just a reuse of the pilot in every P-th beam, where P is chosen such that the interference between two beams separated by P is "acceptable" (either negligible, or with a sufficiently low penalty on the capacity of the data stream). This scheme achieves a gain of 36/P in a completely homogeneous environment. For a suburban LoS type of environment, P is typically 4, so that the pilot overhead can be reduced by a factor of 9 (almost an order of magnitude) for a 360 degree cell. Equivalently, for the uplink pilots, the number of users in the cell can be increased by a factor of 9 (this assumes that the overhead for the uplink pilots dominates the feedback overhead, as discussed above).

Simple scheduling may work only in an environment with homogeneous channel and user conditions. It can be seen that a single (uplink) user with angular spread covering PO beams would entail a change in the angular reuse factor to PO (assuming that a regular reuse pattern for all users is used), thus reducing the achievable gain. The more irregular the environment, the more difficult it is to find a reasonable regular reuse factor, and in the extreme case, complete orthogonalization might be necessary for regular reuse patterns, while an irregular scheduling that simply finds the best combination of users for transmitting on the same spectral resources, could provide angular reuse factors on the order of 10. However, in an environment with high angular dispersion (e.g., microcell in a street canyon), where radiation is incident on the BS from all directions, even adaptive scheduling cannot provide significant advantages over orthogonalization.

In conclusion, pilot scheduling provides an order-of-magnitude reduction in pilot overhead, or equivalently an order of magnitude larger number of users that can be accommodated for a fixed pilot overhead, compared to full orthogonalization. Compared to simple (regular) pilot reuse, environment-adaptive scheduling retains most of the possible gains, while regular scheduling starts to lose its advantages over complete orthogonalization as the environment becomes more irregular.

B. Exploiting FWA Properties for Pilot Scheduling

The exploitation of FWA properties can be more easily quantified if we retain the same reuse factor P as we would have with a "regular" scheme, but just make use of the better signal-to-interference ratio of the pilots (e.g., reduced pilot contamination). As outlined in Sec. 3.2, the reduction in the pilot contamination is equal to the temporal Rice factor. Assuming 15 dB as a typical value, and assuming a high-enough SNR that the capacity of the data transmission is dominated by pilot contamination, the SINR per user is thus improved by 15 dB. Since 3 dB SNR improvement provide 1 bit/s/Hz increase in spectral efficiency, this means that for each user, capacity is increased by 5 bit/s/Hz. Assuming 32 QAM as the usual modulation scheme, an implementation can double the capacity through this scheme.

A different way to look at the advantages is to see how much the number of users per beam can be increased, when keeping the pilot SIR constant. This can depend on the angular spectrum of the user devices. However, with a 15 dB suppression of the interference, one can conjecture that (with suitable scheduling), a reuse factor of P=2, and possibly even P=1, is feasible. This implies that compared to the case where an implementation does not use this property, a doubling or quadrupling of the number of users is feasible (and even more in highly dispersive environments)

In summary, exploiting the FWA properties for pilot scheduling doubles the capacity, or quadruples the number of users C. Exploiting the FWA Properties for Reduction of Feedback Overhead As outlined above, exploiting the FWA properties allow to reduce the feedback from 12 bit to 4 bit, thus reducing overhead by a factor of 3. Further advantages can be gained if the time-variant part occurs only in the parts of the impulse response with small delay, as was shown to hold in a number of Cohere internal measurements (see report last year). Then the feedback can be restricted to the delay range over which the time changes occur. If, for example, this range is 500 ns, then the feedback effort is reduced by a further factor of 10 (500 ns/5 microsec). In summary, the reduction of the feedback overhead can be by a factor of 3 to 30.

Figure 53:
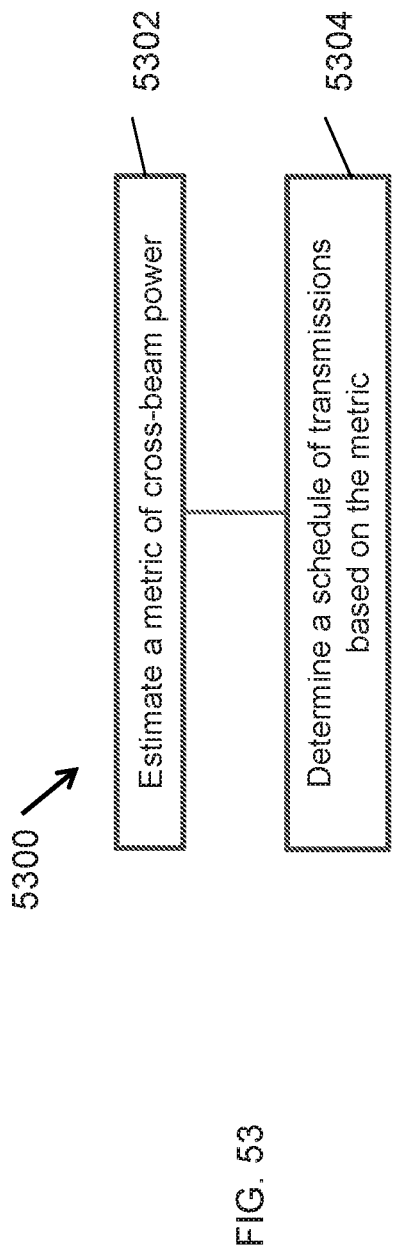
FIGS. 53-54 are flowchart representations of examples of wireless communication methods for pilot scheduling to reduce transmission overhead.
Figure 54:
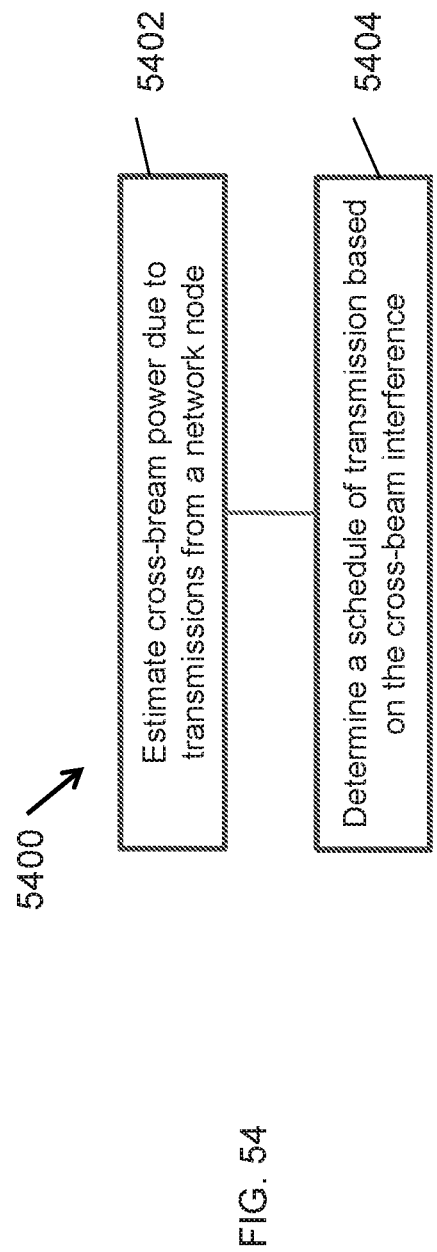

FIGS. 53 and 54 are flowchart representations of examples of wireless communication methods for pilot scheduling to reduce transmission overhead.

FIG. 53 is a flowchart showing operations performed in an example method 5300 for wireless communication. The method 5300 includes, at step 5302, estimating a metric of cross-beam power. The method 5300 includes, at step 5304, determining, based on the metric, a schedule of transmissions.

FIG. 54 is a flowchart showing operations performed in an example method 5400 for wireless communication. The method 5400 includes, at step 5402, estimating cross-bream power due to transmissions from a network node. The method 5400 includes, at step 5404, determining a schedule of transmission based on the cross-beam interference.

Some embodiments and techniques related to methods 5300 and 5400 may be described using the following clause-based description.

B1. A wireless communication method, implemented at a network-side node in a wireless communication network, comprising: estimating a metric of cross-beam power resulting from transmissions from multiple user devices to the network-side node by measuring power received in a j-th beam from an i-th user device's transmission; and determining, based on the metric, a schedule for future transmissions of pilot signals by the multiple user devices to the network node.

B2. The method of clause B1, further including: storing the metric as a power transfer matrix in which rows represent user devices and columns represent beam identities, such that an entry at a given row and a given column of the matrix represents a received power level estimate in a beam corresponding to the given column, when a user device corresponding to the given row transmits.

B3. The method of clauses B1 or B2, wherein the schedule specifies delay-Doppler domain resources used future pilot transmissions by the multiple user devices.

B4. The method of clause B1, wherein the schedule reuses transmission resources for transmissions from the multiple user devices, wherein an amount of reuse is related to the inverse of a signal to interference plus noise ratio (SINR) requirement of modulation in the future data transmissions from the multiple user devices.

B5. The method of any of clauses B1 to B4, wherein the schedule reuses transmission resources for transmissions from the multiple user devices, wherein an amount of reuse is dependent on sizes of packets transmitted from the multiple user devices.

B6. The method of clause B 1, wherein, for data transmissions having packet size below a threshold, the pilot transmissions are scheduled for transmission in an unembedded manner with respect to the data transmissions.

B7. The method of clause B6, further including scheduling data transmissions having a packet size below the threshold using orthogonal time-frequency or delay-Doppler resources and scheduling transmissions resources for packets with embedded pilots on time-frequency or delay-Doppler resources that are non-orthogonal to each other.

B8. The method of clause B2, further including learning the power transfer matrix using signal receptions from the multiple user devices, wherein the signals are orthogonal to each other.

B9. The method of clause B2, further including learning the power transfer matrix using signal receptions over multiple beams.

B10. The method of clause B1, further including re-calculating the schedule to account for changes in a set of user devices that are actively transmitting during a time interval.

B11. The method of clause B1, wherein the wireless communication network is a fixed wireless access network.

B12. The method of clause B11, further including: receiving pilot transmissions; separating the pilot transmissions by canceling contribution of time-invariant part of the channel to produce a time-variant channel component signal; and performing channel estimation using the non-stationary channel component signal.

B13. The method of clause B12, wherein the channel estimation is performed using minimum mean square error filtering.

B14. The method of any of clauses B1 to B13, wherein the transmissions from the multiple user devices are whitened by configuring pilot signal transmission from at least some of the multiple devices to be linearly dependent versions of each other.

B15. The method of any of clauses B1 to B14, wherein at least some of the pilot transmissions scheduled by the schedule accompany data transmissions for feedback from the multiple user devices to the network-side node, wherein the feedback includes channel state reports generated by the multiple user devices based on pilot transmissions from the network-side node received at the multiple user devices.

B16. The method of clause B15, wherein the feedback is scheduled to have a bit resolution that is based on a time variant part of the channel.

B17. A wireless communication method, implemented at a network-side node in a wireless communication network, comprising: estimating a metric of cross-beam power in the wireless communication network based on information regarding an ith user device's estimate of signal and interference plus noise ratio for a transmission on jth beam by the network-side node; and determining, based on the metric, a schedule for future transmissions of pilot signals to the multiple user devices by the network node.

B18. The method of clause B17, further including updating the schedule to account for changes in active user devices in the wireless communication network.

B19. The method of clause B17, further including: identifying a group of user devices from the multiple user devices, wherein the group of user devices have a downlink spectral efficiency that is less than remaining user devices; and scheduling pilot transmissions to the group of user devices using a modulation coding scheme that is less efficient than that used for the remaining user devices.

B20. The method of clause B17, wherein determining the schedule includes: estimating, for a beam, for a number of separate pilot signal transmissions in the beam, a corresponding signal to interference plus noise ratio (SINR) as relevant for all receiving user devices; and scheduling, in the schedule, one of the number of separate pilot signal transmission based on a worst-case metric.

B21. The method of clause B17, wherein the schedule reuses transmission resources for transmissions from the multiple user devices, wherein an amount of reuse is dependent on sizes of packets transmitted from the multiple user devices.

B22. The method of clause B17, further including: determining, for a user device, that the user device is unable to support a target resource reuse in the wireless communication network; and scheduling the user device to perform data transmissions using a modulation and coding scheme that is lower than a best achievable modulation and coding scheme for the user device, wherein the modulation and coding scheme is based on pilot transmissions according to the target resource reuse.

B23. The method of clause B18, wherein, the scheduling includes scheduling, for a first user device, a pilot transmission using a first channel state vector that has a null in a direction of a second channel state vector corresponding to a second user device for whom channel state information is known with a better accuracy than that of the first user device.

B24. The method of clause B17, further including: subtracting a time-invariant part of a channel from the network-side device to the multiple user devices, estimating a time-variant part of the channel; and predicting an overall response of the channel as a sum of time-invariant part and the time-variant part predicted from the estimating.

B25. The method of clause B22, wherein the estimating the time-variant part of the channel includes performing channel extrapolation using minimum mean square error filtering.

B26. The method of any of clauses B1 to B15, further including transmitting the schedule to the multiple user devices.

Section 5: Reciprocal Calibration of a Communication Channel

This section covers reciprocal calibration of a communication channel for reverse channel estimation. In the recent years, to meet the increased demand on available bandwidth, many new techniques have been introduced in wireless communications. For example, the amount of bandwidth, measured as a total number or as a number of bits per Hertz per second number, has grown steadily over years in prevalent communication standards such as the Long Term Evolution (LTE). This trend is expected to grow even more due to the explosion of smartphones and multimedia streaming services.

Of the available bandwidth in a wireless network, some bandwidth is typically used by system overhead signaling that may be used for maintaining operational efficiency of the system. Examples of the overhead signaling includes transmission of pilot signals, transmission of system information, and so on. With time-varying nature of a communication channel between mobile end point(s), the system messages may have to be exchanged more frequently and the overhead may end up becoming significant. The embodiments described in the present document can be used to alleviate such bandwidth overhead, and solve other problems faced in wireless communication systems.

Figure 55:
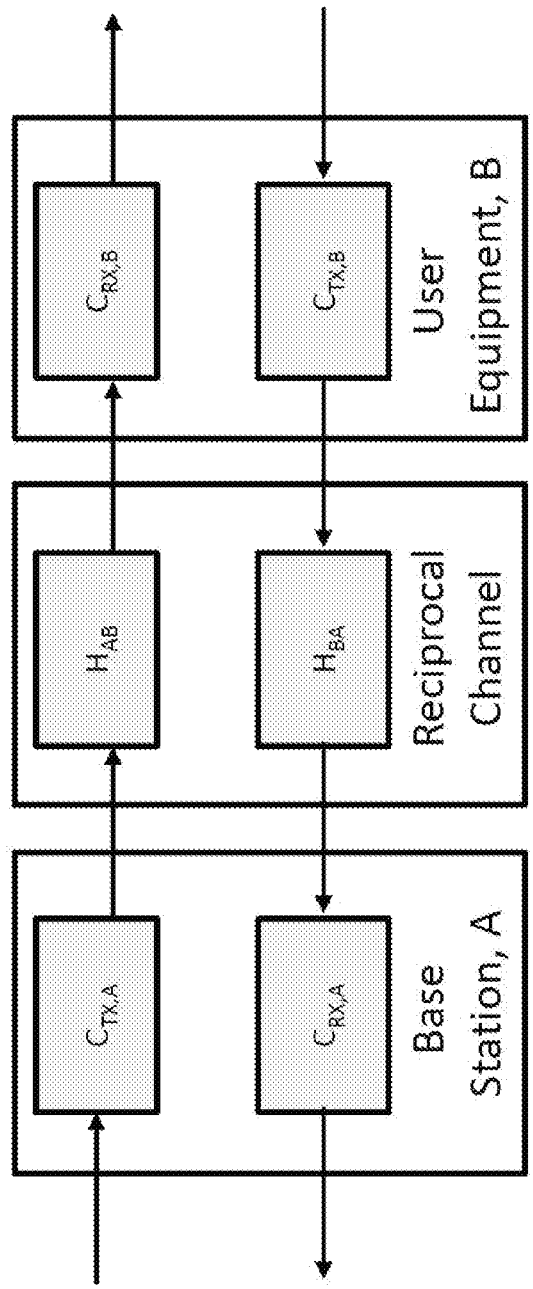
FIG. 55 shows an example of a wireless channel with reciprocity.

FIG. 55 shows an example block diagram of a communication channel with reciprocity. The composite wireless channel from A to B may be represented as: $\hat{H}_{A,B} = C_{RX,B} \cdot H_{A,B} \cdot C_{TX,A}$.

For the reciprocal channel, assume that $H_{AB} = \lambda H_{BA}^T$ for a complex scalar $\lambda$.

In the case of a non-reciprocal channel, with analog and RF components, Non-reciprocal analog and RF components: $C_{TX, A}, C_{RX, A}, C_{RX, B}, C_{TX, B}$, ideally for simplicity, it is beneficial if each matrix is a diagonal matrix. Such an embodiment may also use a design that minimizes the coupling between Tx and Rx paths.

Similarly, the composite channel from B to A is given by $\hat{H}_{B,A} = C_{RX, A} \cdot H_{B,A} \cdot C_{TX,B}$.

If all the C matrices can be estimated a priori, the BS to UE channel can be estimated from the UE to BS channel. In such a case, feeding back channel state information for transmit beamforming may not be needed, thereby making the upstream bandwidth available for data instead of having to transmit channel state information. Estimation of the C matrices may also improve system efficiency. In some embodiments disclosed herein, the reciprocity calibration may be performed by calibrating Tx and Rx of the BS and UE side during a startup or a pre-designated time. The diagonal matrices $C_{TX, A}, C_{RX, A}, C_{RX, B}, C_{TX, B}$ may be estimated. These matrices may be re-estimated and updated periodically. The rate of change of the C matrices will typically be slow and may be related to factors such as the operating temperature of the electronics used for Tx and Rx.

Brief Discussion

In point to multi-point (P2MP) systems and fixed wireless access (FWA) systems, multi-user MIMO (MU-MIMO) is used for increasing the system throughput. One of the components of MU-MIMO is a transmit pre-coder based beam-forming at the Base Station (BS) transmitter. BS sends signals to all User Equipments (UE) (say n of them) simultaneously.

In operation, n−1 signals, intended for n−1 individual UEs, will act as interference for the target UE. A transmit pre-coder cancels the interference generated at the target UE by the n−1 un-intended signals meant for other UEs. To build a pre-coder, down link channel state information (CSI) is used.

In an extrinsic beamforming technique, CSI is fed back from the UE to BS through a feedback up-link channel. However, considerable amount of data BW is used for this, thus affecting the overall system throughput efficiency.

For Time Division Duplex (TDD) systems, the physical channel in the air (sometimes called the radio channel) is reciprocal within the channel coherence time. e.g., the case wherein the uplink (UE to BS) and downlink (BS to UE) are identical (in SISO (transpose in MIMO). However, when the transceiver front-end (FE) hardware is also taken into account, channel reciprocity no longer holds. This is due to the non-symmetric characteristics of the RF hardware. It includes PA non-linearity, RF chain crosstalk, phase noise, LNA non-linearity and noise figure, carrier and clock drifts etc.

In some embodiments, a calibration mechanism can be designed to calibrate for the nonreciprocal components of the wireless link such that embodiments can estimate the down-link by observing the up-link with the help of these calibration coefficients. If this is feasible, no CSI feedback is necessary (as in the case of extrinsic beam forming), thus improving the overall system throughput efficiency. The associated beamforming is also sometimes called intrinsic beamforming. The technique disclosed in this patent document can be used to solve the above discussed problem, and others.

Notation

In the description herein, $h_{a1a2}$ denotes the channel from transmitter (TX) a1 to receiver (RX) a2. This notation is different from the conventional MIMO channel notation. In the conventional methods, this will be denoted as $h_{a2a1}$). Also, conjugate of a complex quantity is represented with a*, e.g., conj(h)=h*.

Example Embodiments

A. Downlink Channel Estimation from Uplink Channel and Calibration Coefficients

While the disclosed techniques are more generally applicable, for the ease of explanation, the following assumptions are made:

[1] cross talk between the TX-TX, RX-RX and TX-RX RF chains is negligible

[2] Antenna mutual coupling in negligible

[3] TX and RX at BS are working with clocks generated from the same PLL so that carrier and symbol clocks are synchronized in wireless transmissions among transceivers at A or B (and not necessarily between A and B). Here, "A" and "B" represent communication devices at two ends of a communication medium. For example, A may refer to a base station (or user equipment) and correspondingly B may refer to a user equipment (or base station). As another example, A may refer to a hub and B may refer to a remote station.

Without loss of generality, the channel from A to B may be called the downlink (DL) channel and the channel from B to A may be called the uplink (UL) channel. See, e.g., FIG. 56 and FIG. 57.

[4] same assumptions as above for UE.

Measurements on existing equipment have verified that a) the coupling between different RF paths is typically of the order of −30 dB. A careful design of the RF front end can ensure even lesser levels of cross talk. b) The isolation between the cross polarizations of the antenna is of the order of 15 to 20 dB. This means that if a signal of x dB power is sent on the vertical polarization of a cross polarized antenna, an image with (x−15) dB power will appear on the horizontal polarization. This isolation cannot be improved much even under improved antenna design. So, for the below calibration mechanism to work properly, embodiments should either use i) antenna with single polarization is used or ii) if dual polarized antenna are used, take care that simultaneous transmission on both the polarizations is never happening.

However, these assumptions can be relaxed, as described herein, and modifications in the below described calibration algorithm will be presented as well. If dual polarized antenna is the design choice, modifications to the disclosed algorithm as described herein could be used in some embodiments.

Some embodiments of a calibration algorithm are described herein for a 4×4 MIMO system. This is to keep the description simple and easy to comprehend. The same mechanism can be generalized to systems with any number of BS and UE antenna.

With reference to FIG. 56 and FIG. 57, a four antenna system 5600 at A and a four antenna system 5700 at B are depicted. For example, the configuration 5600 at A may represent a base station and the configuration 5700 at B may represent a UE (or vice versa). Let $\hat{h}_{a1a2}$ denote the channel from TX a1 to RX a2. It is constituted by 2 components a). The reciprocal radio channel from antenna a1 to antenna a2 and b) the non-reciprocal components at TX a1 and RX a2. Non-reciprocal components are captured in two memory-less complex scalars denoted by $t_{a1}$ and $r_{a2}$ corresponding to the TX and RX respectively. In this patent document, modifications when delay is involved will be demonstrated as well.

Thus, $\hat{h}_{a1a2}$ can be written as:

$$\hat{h}_{a1a2} = t_{a1} \cdot h_{a1a2} \cdot r_{a2} \quad (1)$$

Similarly, channel between TX at a2 to RX at $a_1$, $\hat{h}_{a2a1}$, can be written as, $$\hat{h}_{a2a1} = t_{a2} \cdot h_{a2a1} \cdot r_{a1} \quad (2)$$

Taking the ratio between $\hat{h}_{a1a2}$ and $\hat{h}_{a2a1}$, and noting that ha1a2 and ha2a1 are identical, the following can be written:

$$c_{a1a2} = \frac{t_{a1} \cdot r_{a2}}{r_{a1} \cdot t_{a2}} \quad (3)$$

$$= \frac{1}{c_{a2a1}}.$$

The coefficient $C_{a1a2}$ is referred to as the calibration coefficient from a1 to a2. Similarly, the calibration coefficient from a2 to a3, $c_{a2a3}$, can be written as:

$$c_{a2a3} = \frac{t_{a2} \cdot r_{a3}}{r_{a2} \cdot t_{a3}} \quad (4)$$

$$= \frac{t_{a1} \cdot r_{a3}}{r_{a1} \cdot t_{a3}} \cdot \frac{r_{a1} \cdot t_{a2}}{t_{a1} \cdot r_{a2}}$$

$$= \frac{c_{a1a3}}{c_{a1a2}}$$

From Eq. (4), it can be seen that the calibration coefficient between antenna a2 (TX) and antenna a3 (RX) can be written as the ratio of the calibration coefficients of the reference antenna a1 to that of a3 and a2. Similar relations can be derived for TXs and RXs at B, depicted in configuration 5700 of FIG. 57. Equations for calibration coefficients that involve antennas from both sides A and B can be derived as below.

$$c_{a2b2} = \frac{t_{a2} \cdot r_{b2}}{t_{b2} \cdot r_{a2}} \quad (5)$$

$$= \frac{t_{a1} \cdot r_{b1}}{t_{b1} \cdot r_{a1}} \cdot \frac{r_{a1} \cdot t_{a2}}{t_{a1} \cdot r_{a2}} \cdot \frac{t_{b1} \cdot r_{b2}}{t_{b2} \cdot r_{b1}}$$

$$= \frac{c_{a1b1}}{c_{a1a2}} \cdot c_{b1b2}$$

From Eq. (5), it should be clear that any wireless channel between A and B can be written in terms of a) a calibration coefficient with respect to a reference antenna at A, b) a calibration coefficient with respect to a reference antenna at B, and c) a calibration coefficient between the same reference antennas at A and B.

Similarly, the downstream channels (BS-UE) can be represented in terms of the upstream channels (UE-BS) and calibration coefficients.

$$\hat{h}_{a1b1} = c_{a1b1} \cdot \hat{h}_{b1a1}$$

$$\hat{h}_{a1b2} = c_{a1b1} \cdot c_{b1b2} \cdot \hat{h}_{b2a1} \, (c_{a1b2} \cdot \hat{h}_{b2a1})$$

$$\hat{h}_{a1b3} = c_{a1b1} \cdot c_{b1b3} \cdot \hat{h}_{b3a1} \, (c_{a1b3} \cdot \hat{h}_{b3a1})$$

$$\hat{h}_{a1b4} = c_{a1b1} \cdot c_{b1b4} \cdot \hat{h}_{b4a1}$$

Similarly, $$\hat{h}_{a2b1} = \frac{c_{a1b1}}{c_{a1a2}} \cdot \hat{h}_{b1a2} \quad (7)$$

$$\hat{h}_{a2b2} = \frac{c_{a1b1}}{c_{a1a2}} \cdot c_{b1b2} \cdot \hat{h}_{b2a2}$$

$$\hat{h}_{a2b3} = \frac{c_{a1b1}}{c_{a1a2}} \cdot c_{b1b3} \cdot \hat{h}_{b3a2}$$

$$\hat{h}_{a2b4} = \frac{c_{a1b1}}{c_{a1a2}} \cdot c_{b1b4} \cdot \hat{h}_{b4a2}.$$

Furthermore, $$\hat{h}_{a3b1} = \frac{c_{a1b1}}{c_{a1a3}} \cdot \hat{h}_{b1a3} \quad (8)$$

$$\hat{h}_{a3b2} = \frac{c_{a1b1}}{c_{a1a3}} \cdot c_{b1b2} \cdot \hat{h}_{b2a3}$$

-continued $$\hat{h}_{a3b3} = \frac{c_{a1b1}}{c_{a1a3}} \cdot c_{b1b3} \cdot \hat{h}_{b3a3}$$

$$\hat{h}_{a3b4} = \frac{c_{a1b1}}{c_{a1a3}} \cdot c_{b1b4} \cdot \hat{h}_{b4a3},$$

And finally $$\hat{h}_{a4b1} = \frac{c_{a1b1}}{c_{a1a4}} \cdot \hat{h}_{b1a4} \quad (9)$$

$$\hat{h}_{a4b2} = \frac{c_{a1b1}}{c_{a1a4}} \cdot c_{b1b2} \cdot \hat{h}_{b2a4}$$

$$\hat{h}_{a4b3} = \frac{c_{a1b1}}{c_{a1a4}} \cdot c_{b1b3} \cdot \hat{h}_{b3a4}$$

$$\hat{h}_{a4b4} = \frac{c_{a1b1}}{c_{a1a4}} \cdot c_{b1b4} \cdot \hat{h}_{b4a4}$$

Using the results from Eq. (6) to Eq. (9), and denoting $c_{a1b1}$ as $\zeta$, a complex constant, the downlink MIMO channel can be expressed in terms of the uplink MIMO channel using the following equation:

$$\begin{bmatrix} \hat{h}_{a1b1} & \hat{h}_{a2b1} & \hat{h}_{a3b1} & \hat{h}_{a4b1} \\ \hat{h}_{a1b2} & \hat{h}_{a2b2} & \hat{h}_{a3b2} & \hat{h}_{a4b2} \\ \hat{h}_{a1b3} & \hat{h}_{a3b3} & \hat{h}_{a3b3} & \hat{h}_{a4b3} \\ \hat{h}_{a1b4} & \hat{h}_{a3b4} & \hat{h}_{a3b4} & \hat{h}_{a4b4} \end{bmatrix} = \quad (10a)$$

$$\zeta \cdot \begin{bmatrix} \hat{h}_{b1a1} & \frac{1}{c_{a1a2}}\hat{h}_{b1a2} & \frac{1}{c_{a1a3}}\hat{h}_{b1a3} & \frac{1}{c_{a1a4}}\hat{h}_{b1a4} \\ c_{b1b2}\hat{h}_{b2a1} & \frac{c_{b1b2}}{c_{a1c2}}\hat{h}_{b2a2} & \frac{c_{b1b2}}{c_{a1a3}}\hat{h}_{b2a3} & \frac{c_{b1b2}}{c_{a1a4}}\hat{h}_{b2a4} \\ c_{b1b3}\hat{h}_{b3a1} & \frac{c_{b1b3}}{c_{a1a2}}\hat{h}_{b3a2} & \frac{c_{b1b3}}{c_{a1a3}}\hat{h}_{b3a3} & \frac{c_{b3b3}}{c_{a1a4}}\hat{h}_{b3a4} \\ c_{b1b4}\hat{h}_{b4a1} & \frac{c_{b1b4}}{c_{a1a2}}\hat{h}_{b4a2} & \frac{c_{b1b4}}{c_{a1a3}}\hat{h}_{b4a3} & \frac{c_{b1b4}}{c_{a1a4}}\hat{h}_{b4a4} \end{bmatrix}$$

The right hand side of Eq. (10a) can be further decomposed as:

$$\zeta \cdot \begin{bmatrix} 1 & 0 & 0 & 0 \\ 0 & c_{b1b2} & 0 & 0 \\ 0 & 0 & c_{b1b3} & 0 \\ 0 & 0 & 0 & c_{b1b4} \end{bmatrix} \cdot \begin{bmatrix} \hat{h}_{b1a1} & \hat{h}_{b2a1} & \hat{h}_{b3a1} & \hat{h}_{b1a1} \\ \hat{h}_{b2a1} & \hat{h}_{b2a2} & \hat{h}_{b2a3} & \hat{h}_{b2a4} \\ \hat{h}_{b3a1} & \hat{h}_{b3a2} & \hat{h}_{b3a3} & \hat{h}_{b3a4} \\ \hat{h}_{b4a1} & \hat{h}_{b4a2} & \hat{h}_{b4a3} & \hat{h}_{b4a4} \end{bmatrix} \cdot \quad (10b)$$

$$\begin{bmatrix} 1 & 0 & 0 & 0 \\ 0 & \frac{1}{c_{a1a2}} & 0 & 0 \\ 0 & 0 & \frac{1}{c_{a1a3}} & 0 \\ 0 & 0 & 0 & \frac{1}{c_{a1a4}} \end{bmatrix}$$

Eq. (10b) is of the form $\zeta \cdot K_B \cdot H_U \cdot K_A$. Elements in the calibration coefficient matrix $K_A$ and $K_B$ are obtained by calibrations performed at A (BS) and B (UE) and later by transferring UE coefficients to the BS. Note that calibration coefficient estimation at the BS may involve transmission and reception of calibration signals among BS antennas (a.k.a. local calibration). Similarly, estimation of calibration coefficients at UE can be performed using local transmission and reception of calibration signals among UE antennas.

In some embodiments, the TX and RX timing at a device (BS or UE) may be operated from the same PLL. This eliminates the carrier and/or clock offset impairments that is often associated with the detector at B for RF transmissions from A and vice versa. This is because A and B will be deriving all their internal clock frequencies, in general, from 2 different PLLs, one at A and another one at B. If these impairments are a part of the calibration coefficients, e.g., manifest themselves as a time varying phase rotation, then the coefficients will vary more frequently due to time varying carrier or clock errors in addition to its own time variability. Since $K_A$ and $K_B$ are obtained from measurements exclusively at BS or UE (and not using transmissions from BS to UE or vice versa), they vary relatively slowly.

Local calibrations, thus, are generally stable and do not change much over a period of several minutes (e.g., 30 minutes).

Eq. (10b) further reveals that the reverse MIMO channel can be mathematically modelled as the composition of a) a complex scalar, b) calibration coefficients at B, c) MIMO uplink channel transfer function, and d) calibration coefficients at A.

A pre-coder can be built at A (or at B), by acquiring calibration coefficients of the receiver side. The pre-coder implementation could be based on any of several pre-coders available in the literature. Some examples include: an MMSE pre-coder, a regularized MMSE precoder, a zero forcing precoder, a Tomlinson-Harashima pre-coder, and so on. As will be appreciated by one of skill in the art, either linear pre-coders (first three examples above) or non-linear pre-coders (the last example above) may be used.

Figure 58:
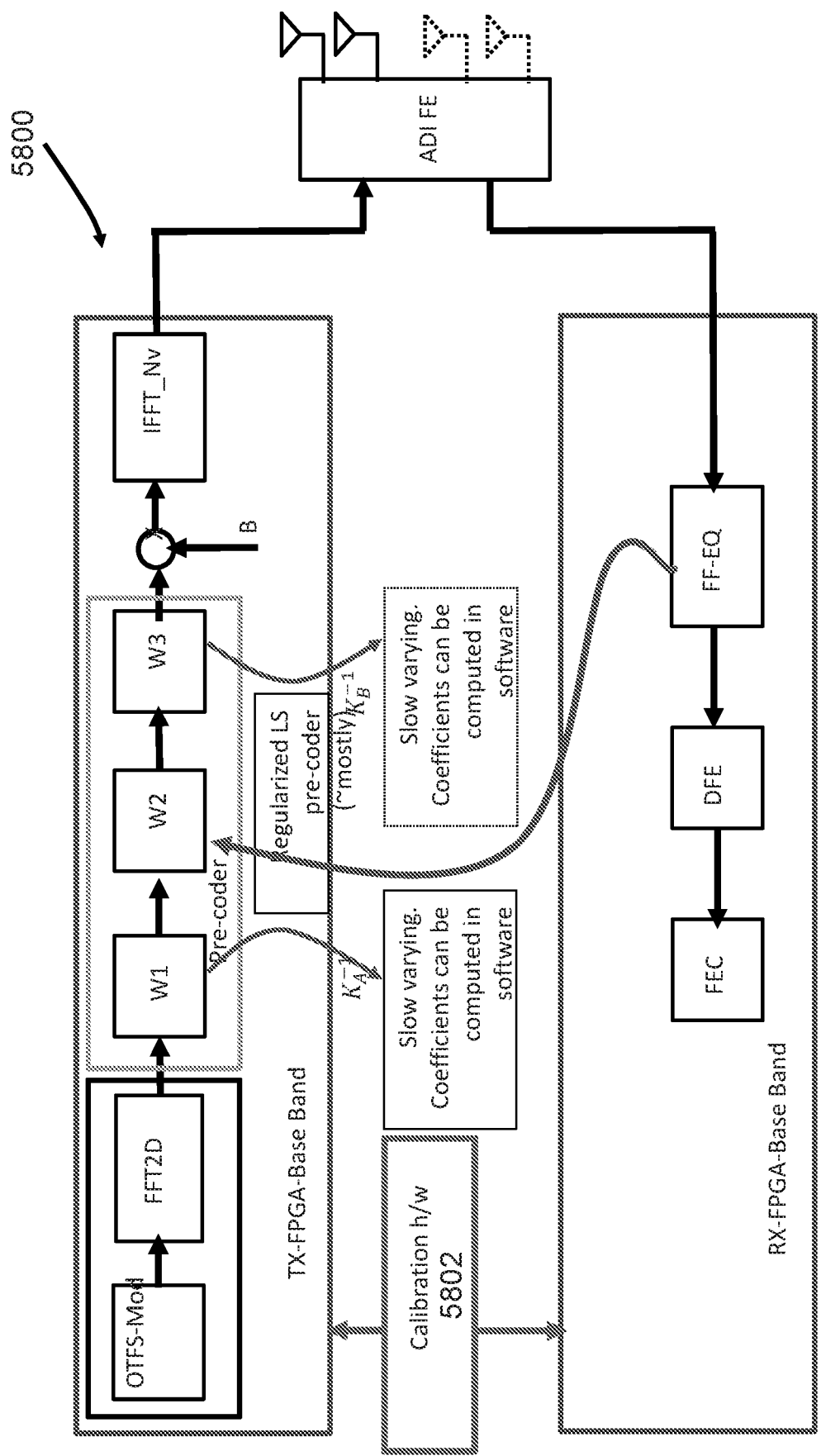
FIG. 58 shows a block diagram for an example implementation of reciprocity calculation.

To illustrate this point, an example embodiment of a reciprocity based zero-forcing (ZF) pre-coder using the data above (ref. Eq. 10b) is described below. The configuration of this pre-coder is depicted in FIG. 58. Note that, the same set of data can be used to design any type of pre-coder.

A ZF pre-coder may have the following form.

$$W = \frac{K_A^{-1} \cdot H_U^{-1} \cdot K_B^{-1}}{E\{\|K_A \cdot H_U \cdot B\|F\}} \quad (10c)$$

Here, $\|\cdot\|_F$ is the Frobenious norm of a given matrix. Note that $\zeta$, the calibration coefficient between A and B does not appear in the pre-coder. The effect of $\zeta$ will be counteracted by the equalizer (single tap or MIMO) at the UEs.

Some embodiments use the fact that $K_B$ and $K_A$ are typically slow-varying, so that their inverse can be implemented in software (instead of implementing in hardware). In some embodiments, W2 ($H_U^{-1}$ or inverse of $H_U$) may be fast varying and implemented in hardware circuits.

In some embodiments, W2 may be obtained as a by-product of the receiver Equalizer at the BS. For example BS equalizer often implements a variant of the $H_U^{-1}$.

Therefore, using the techniques disclosed herein, some embodiments may model the downlink channel as a composition of the uplink channel and slow varying local coefficients. This enables to build a variety of different pre-coders with minimal-feedback overhead, and certain linear precoders, use receiver equalizer computations performed at the base station.

Estimation of $\zeta$ or $c_{a1b1}$ involves calibrating across BS and UE. For the reasons discussed above, these coefficients can be frequently varying and the estimation and feedback of these coefficients could consume a lot of bandwidth. Advantageously, a transmit-side pre-coder to cancel the multi-user interference can be designed without the knowledge of $\zeta$. It can be designed from the upstream channel measurements $K_A$ and $K_B$, as described in the present document.

Several estimation methods to determine the calibration coefficients are described in the present document. When the number of antenna is relatively small, the method described in Section B may be used. When a large number of antennas are involved, the method described in Section C may be used.

B. Estimation of Calibration Coefficients ($C_{x1x2}$)—Method 1—Iterative Algorithm When the number of antenna is relatively small, such as 4 as in this example, an iterative algorithm can be used to compute the calibration coefficients. This, however, will entail a large amount of calibrations in a massive MIMO scenario and may become impractical. In a massive MIMO scenario, estimation described in sec. III may be used.

Iteration 1:

$$c_{a1a3} = c_{a1a2} \cdot c_{a2a3} \quad (11)$$

$$c_{a1a4} = c_{a1a2} \cdot c_{a2a4} \quad (12)$$

Make an initial estimate of $c_{a1a2}$, $c_{a1a3}$, $c_{a1a4}$ as described herein. Also estimate $c_{a2a3}$ and $c_{a2a4}$. Using the latter, make an alternative estimate of $c_{a1a3}$ and $c_{a1a4}$ (eq. 11 and 12). From these two independent estimates of $c_{a1a3}$ and $c_{a1a4}$, make a refined estimate of $c_{a1a3}$ and $c_{a1a4}$ (e.g., the arithmetic mean). A refined estimate of $c_{a1a2}$ can be obtained from Eq. 11 or 12

$$c_{a1a4} = c_{a1a3} \cdot c_{a3a4} \quad (13)$$

A refined estimate of $c_{a1a4}$ can be obtained (as described above), from a measurement of $c_{a3a4}$ using Eq. (13). Using the updated $c_{a1a4}$, estimates of $c_{a1a2}$ and $c_{a1a3}$ can be updated.

More iterations, in the above manner, can be performed to further refine the above coefficients.

The number of calibrations to be performed in this method is $4_{C2}=6$. Number of calibrations will grow exponentially in N, the number of antenna; hence not practical for large array of antenna.

C. Estimation of Calibration Coefficients ($C_{x1x2}$)—Method 2—Large Number of Antenna When the number of antenna is high, e.g., 64, Method 1 is not practically feasible. This section describes a simple method for the same.

The following equations have been previously seen derived.

$$\hat{h}_{a1a2} = c_{a1a1} \hat{h}_{a2a1} \quad (14)$$

$$y_{a2} = \hat{h}_{a1a2} s_{a1} + n_{a2} \quad (15)$$

$$y_{a1} = \hat{h}_{a2a1} s_{a2} + n_{a1} \quad (16)$$

where sa1, sa2 are known training symbols, $y_{a1}$ and $y_{a2}$ are the received signal and n is additive noise. It is assumed that the noise is white in the frequency band of interest. The LS estimates of $$\hat{h}_{a1a2} = \frac{y_{a2} \cdot s_{a1}^+}{|s_{a1}|^2} \text{ and } \hat{h}_{a2b1} = \frac{y_{a1} \cdot s_{a2}^+}{|s_{a2}|^2}.$$

Note that the estimation error is $$CN\left(0, \frac{\sigma_n^2}{|s_b|^2}\right).$$

Now $$c_{a1a2} = \frac{\hat{h}_{a1a2}}{\hat{h}_{a2a1}}.$$

Similar expressions hold good for other calibration coefficients.

For a 64 antenna system, this method would use a total of 64 calibration signal transmissions.

D. Estimation of Calibration Coefficients ($C_{x1x2}$)—Method 3—Using Total Least Squares (LS)

What is described below is an algorithm to estimate the calibration coefficients using the method of total least squares.

Refer to Method 2. Take k (say 4) such LS estimates and form the following matrix $$H_{a1a2} = [\hat{h}_{a1a2,1}, \hat{h}_{a1a2,2} \ldots \hat{h}_{a1a2,4}] \quad (17)$$

$$H_{a1a2} = [\hat{h}_{a1a2,1}, \hat{h}_{a1a2,2} \ldots \hat{h}_{a1a2,4}] \quad (18)$$

Let $D=[H_{a2a1}, H_{a1a2}]$. Note that D is a 4×2 matrix in this example.

$$\hat{c}_{a1a2} = \underset{\Delta H_{a1a2}, \Delta H_{a2a1}}{\operatorname{argmin}} \quad |\Delta H_{a2a1}|_F^2 + |\Delta H_{a1a2}|_F^2$$

subject to $H_{a1a2} + \Delta H_{a1a2} = (H_{a2a1} + \Delta H_{a2a1}) \cdot c_{a1a2}$.

Solution for the above is obtained as below,

Let $D=U\Sigma V^H$ where $\Sigma=\operatorname{diag}(\sigma_1, \sigma_2)$, $\sigma_1 > \sigma_2$, where $\sigma$s are singular values of D; U and V are the left and right eigen-vectors respectively. Let $$V = \begin{bmatrix} v_{11} & v_{12} \\ v_{21} & v_{22} \end{bmatrix}.$$

To have a solution for this Total Least Squares problem, $v_{22} \neq 0$. Only if $\sigma_1 \neq \sigma_2$, the solution will be unique.

The solution is given by, $$\hat{c}_{a1a2-opt} = \frac{-v_{12}}{v_{22}}.$$

In some embodiments, total least squares error optimization criteria may be used. Total least squares assumes that both h•$_{(.,.)}$ and c•$_{(.,.)}$ are subject to estimation errors. This is more realistic compared to assuming that h•$_{(.,.)}$ is impervious to estimation errors.

Note that three different methods for estimating the calibration coefficients are described above. During the implementation/prototyping phase, effectiveness of each method can be evaluated separately and the one with the best merit need to be selected for the final implementation. Alternatively, the decision may be made based on the number of antennas for which the calibration is performed. For example, method 1 may be suitable for up to 8 receive and/or transmit antennas, while methods 2 or 3 may be used for higher number of antennas.

E. Effects of Delays in the TX/RX Path

Let delays associated with $t_{a1}$, $t_{a2}$, $r_{a1}$ and $r_2$ be $\tau_{ta1}$; $\tau_{ta2}$, $\tau_{ra1}$, $\tau_{ra2}$. Therefore, $$c_{a1a2} = \frac{|t_{a1} \cdot r_{a2}|}{|r_{a1} \cdot t_{a2}|} \cdot \frac{e^{-j2\pi f \tau_{ra2}} \cdot e^{-j2\pi f \tau_{ta1}}}{e^{-j2\pi f \delta \tau_{ra1}} \cdot e^{-j2\pi f \tau_{ta2}}} \quad (20)$$

$$= |c_{a1a2}| \cdot e^{-j2\pi f \delta \tau}$$

where $\delta\tau = (\tau_{ta1} + \tau_{ra2}) - (\tau_{ta2} + \tau_{ra1})$, the delay difference between the $a_1$ and $a_2$. It is clear that, the effect of $\delta\tau$ is to cause a linear phase on the calibration coefficients across the frequency.

Calibration coefficient as can be seen is a function of $\delta\tau$. The delays in the digital sections of TX and RX will not affect the calibration coefficients, as these will cancel out in the expression above (Note that digital delays are identical for all transmitters. This is true for receivers as well). It is clear that, a delay effect, as described above, will be manifested if the synchronizing clocks at BS or UE are routed using long traces.

It has been assumed that $t_{a1}$ etc. is memory-less. The case were $t_{a1}$ for example is say a 2 tap filter is not considered in this formulation.

F. Calibration Coefficients when there is Mutual Coupling Between TX/TX, TX/RX Paths Non-negligible coupling between different TX/RX path can exist due to a) Imperfect hardware design or more importantly b) if cross-polarized antenna is used in the design. Modifications to the calibration algorithm under these conditions is described below. It is assumed that there is no coupling between the TX and RX paths.

Referring to FIG. 56 and FIG. 57, assume that the receive paths have mutual coupling between them. For e.g., $r_{a1a2}$ is the mutual coupling between receive paths $r_1$ and $r_2$. Similarly $r_{a1a3}$ refers to the coupling between the receive paths $r_1$ and $r_3$. Similar explanation applies to mutual coupling between the transmit paths. Note that $r_{a1a2}$ refers to $r_{a1}$ of Section A.

Assume that antenna a1 transmits a calibration sequence, sa1. It has been received by receive antenna $a_2$, $a_3$ and $a_4$. Similar to the formulation in Sections A and B, the following expressions can be derived.

$$\begin{bmatrix} y'_{a2} \\ y'_{a3} \\ y'_{a4} \end{bmatrix} = \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} t_{a1} \cdot s_{a1} + \begin{bmatrix} n_{a2} \\ n_{a3} \\ n_{a4} \end{bmatrix} \quad (21)$$

$$\begin{bmatrix} y''_{a1} \\ y''_{a3} \\ y''_{a4} \end{bmatrix} = \begin{bmatrix} r_{a1a1} & r_{a1a3} & r_{a1a4} \\ r_{a3a1} & r_{a3a3} & r_{a3a4} \\ r_{a4a1} & r_{a4a3} & r_{a4a4} \end{bmatrix} \begin{bmatrix} h_{a2a1} \\ h_{a2a3} \\ h_{a2a4} \end{bmatrix} t_{a2} \cdot s_{a2} + \begin{bmatrix} n_{a1} \\ n_{a3} \\ n_{a4} \end{bmatrix} \quad (22)$$

$$\begin{bmatrix} y'''_{a1} \\ y'''_{a2} \\ y'''_{a3} \end{bmatrix} = \begin{bmatrix} r_{a1a1} & r_{a1a2} & r_{a1a4} \\ r_{a2a1} & r_{a2a2} & r_{a2a4} \\ r_{a4a1} & r_{a4a2} & r_{a4a4} \end{bmatrix} \begin{bmatrix} h_{a3a1} \\ h_{a3a2} \\ h_{a3a4} \end{bmatrix} t_{a3} \cdot s_{a3} + \begin{bmatrix} n_{a1} \\ n_{a2} \\ n_{a4} \end{bmatrix} \quad (23)$$

$$\begin{bmatrix} y''''_{a1} \\ y''''_{a2} \\ y''''_{a3} \end{bmatrix} = \begin{bmatrix} r_{a1a1} & r_{a1a2} & r_{a1a2} \\ r_{a2a1} & r_{a2a2} & r_{a2a3} \\ r_{a3a1} & r_{a3a2} & r_{a3a3} \end{bmatrix} \begin{bmatrix} h_{a4a1} \\ h_{a4a2} \\ h_{a4a3} \end{bmatrix} t_{a4} \cdot s_{a4} + \begin{bmatrix} n_{a1} \\ n_{a2} \\ n_{a3} \end{bmatrix} \quad (24)$$

Proceeding as in Section C, LS estimates of $\hat{h}_{a1a2}$, $\hat{h}_{a1a3}$ and $\hat{h}_{a1a4}$ can be obtained from Eq. (21). The term $\hat{h}_{a1a2}$ is the non-reciprocal (baseband) channel from antenna a1 to antenna a2, whereas $\hat{h}_{a1a2}$ is the reciprocal radio channel from antenna a1 to antenna a2g. Similarly, LS estimates $\hat{h}_{a2a1}$, $\hat{h}_{a3a1}$ and $\hat{h}_{a4a1}$ can be obtained from equations 22, 23 and 24.

$$\begin{bmatrix} \hat{h}_{a1a2} \\ \hat{h}_{a1a3} \\ \hat{h}_{a1a4} \end{bmatrix} = t_{a1} \cdot \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} \quad (25)$$

$$\begin{bmatrix} \hat{h}_{a1a2} \\ \hat{h}_{a1a3} \\ \hat{h}_{a1a4} \end{bmatrix} = t_{a1} \cdot \begin{bmatrix} r_{a1a1} \cdot t_{a2} & r_{a1a3} \cdot t_{a2} & r_{a1a4} \cdot t_{a2} \\ r_{a1a1} \cdot t_{a3} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} h_{a2a1} \\ h_{a3a1} \\ h_{a4a1} \end{bmatrix} \quad (26)$$

From Eq. 25 and 26, we can write the following $$\begin{bmatrix} \hat{h}_{a2a1} \\ \hat{h}_{a3a1} \\ \hat{h}_{a4a1} \end{bmatrix} = \quad (27)$$

$$\frac{1}{t_{a1}} \cdot \underbrace{\begin{bmatrix} r_{a1a1} \cdot t_{a2} & r_{a1a3} \cdot t_{a2} & r_{a1a4} \cdot t_{a2} \\ r_{a1a1} \cdot t_{a3} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix}^{-1}}_{C} \begin{bmatrix} \hat{h}_{a1a2} \\ \hat{h}_{a1a3} \\ \hat{h}_{a1a4} \end{bmatrix}$$

where C is the calibration coefficient to be estimated. It is interesting to note that when the mutual coupling coefficients are set to 0, the above equation gives raise to eq. 3. Similarly $\hat{h}_{a2a3}$ $\hat{h}_{a2a4}$ and $\hat{h}_{a3a4}$ can be expressed in terms of the product of a calibration matrix and $\hat{h}_{a3a2}$, $\hat{h}_{a4a2}$ and $\hat{h}_{a4a3}$.

These calibration coefficients can be computed using Total Least Squares method (method 3).

Note that there is no mutual coupling between sides A and B. This enables embodiments to write downstream link exactly as in Eq. 10. However, in this case, $K_A$ and $K_B$ will no longer be diagonal matrices.

G. Examples of Architectures for Reciprocity Calibration

FIG. 58 is a block diagram depiction of an example embodiment of an apparatus 5800. The apparatus 5800 may also be used to validate the effectiveness of reciprocity calibration making sure to leverage on the existing transmission systems. The embodiment apparatus 5800 is an example of a regularized Least Square based pre-coder design. As a first level approximation, MMSE coefficients being computed at the receiver can be thought to be the RLS estimates. Typically, $K_B^{-1}$ and $K_A^{-1}$ (refer to eq. 10A, 10B and 10C) are slow varying. They can be computed in software. However, the actual multiplication operation may be implemented in FPGA.

From the top left of FIG. 58, a transmitter chain of the apparatus 5800 may include an OTFS modulation function, followed by a 2D FFT transform stage. The output maybe processed through a pre-coder and corrected for reciprocity contribution from the receiving device. The corrected signal may be processed through an inverse FFT stage and transferred to a front end for transmission. The pre-coder may comprise weights (matrices) as described herein. While not shown explicitly, the transmitter chain may perform error correction coding on data prior to transmission. In some embodiments, the entire transmitter chain may be implemented in a baseband FPGA or ASIC.

The apparatus 5800 may include, in the receiver chain shown in the bottom half, from right to left, an equalizer stage that receives signals from the front end, a decision feedback equalizer and a forward error correction stage.

The apparatus 5800 may also include a calibration module 5802 which may be implemented in hardware. The calibration module may perform the various calibration functions described in the present document.

Example of a Reciprocity Calibration System Prototype Design

As described above, some example embodiments for reciprocity calibration have been disclosed. Experiments have shown that the set of calibration coefficients will change for different a) transmit powers, b) receive powers and c) frequency. The last item warrants some explanation. If the bandwidth (BW) of interest for e.g., is 10 MHz, embodiments may use a wide-band calibration signal of 10 MHz BW and obtain calibration coefficients for the full 10 MHz. Another possibility is to send sinusoids (frequency tones) at every sub-carrier individually and compute the calibration coefficient for each tone separately.

In some embodiments, the below procedure (assuming frequency-tones are used in calibration) may be implemented:

```
For ∀ TX power levels (in m discrete steps)
  For ∀ RX power levels (in n discrete steps)
    For ∀ frequency tones corresponding to each sub-carrier
      For ∀ Antenna Combinations
        perform calibration and store calibration coefficients.
      end
    end
  end
end
```

The iterative process may be managed by the calibration module 402, previously described. In some embodiments, a set of calibration coefficients may be associated with a number of combinations of the triplet of {Transmit Power, Receive Power and Frequency of operation} and stored in a look-up table (LUT). The wireless device may then select the appropriate set of calibration coefficient for use based on the observed transmit power, received power and/or frequency band of operation. While this may result in a large number of entries in the LUT, certain optimizations can be done to reduce this overhead.

In some embodiments, a set of calibration coefficient may be calculated as an initial set at the beginning of communication between a transmitter and a receiver, e.g., a base station and a UE. The set may be stored as a working set in a look-up table and used until the set is updated. The updating of the set may be based on one or more of many operational criteria. For example, some embodiments may update the working set at a given interval, e.g., once every 30 minutes. Some embodiments may track received SNR to decide whether calibration coefficient updating is warranted. When the set of calibration coefficients is updated, the updating wireless device may then communicate the changes to the other side at the next available opportunity.

Figure 59:
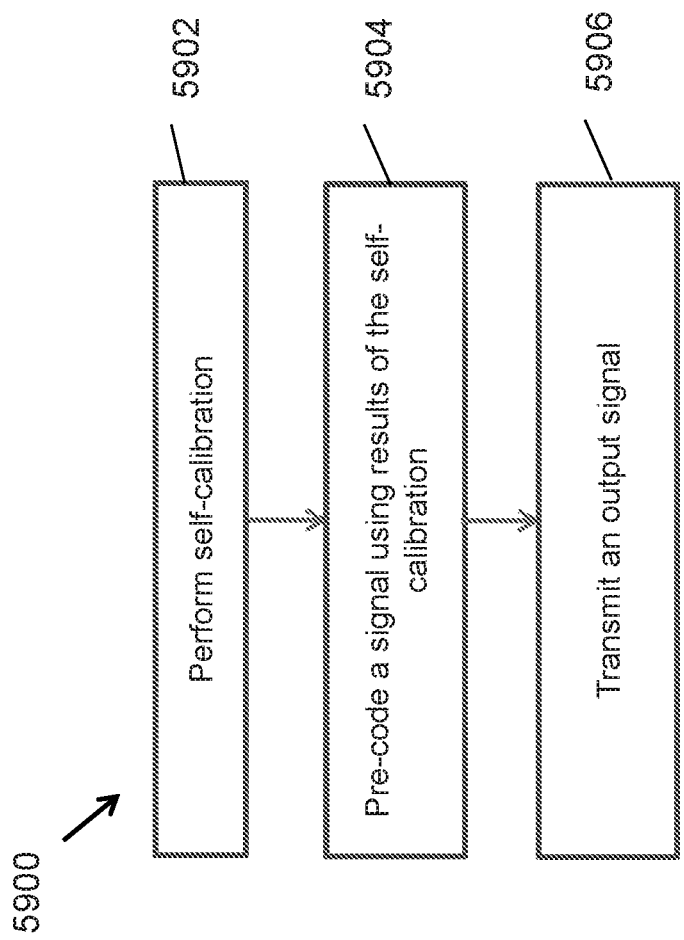
FIG. 59 is a flowchart representation of an example of a wireless communication method for the reciprocal calibration of a communication channel.

FIG. 59 is a flowchart representation of an example of a wireless communication method 5900 for the reciprocal calibration of a communication channel. The method 5900 includes, at step 5902, performing self-calibration. The method 5900 includes, at step 5904, pre-coding a signal using results of the self-calibration. The method 5900 includes, at step 5906, transmitting an output signal.

Some embodiments and techniques related to method 5900 may be described using the following clause-based description.

C1. A wireless communication method, implementable at a wireless communication apparatus having one or more transmission antennas and one or more receiving antennas: performing local calibration by exchanging signals locally between the one or more transmission antennas and the one or more receiving antennas, wherein the local calibration generates a set of calibration coefficients, pre-coding a signal carrying data bits by applying a subset of the set of calibration coefficients to signal transmissions from the wireless communication apparatus, and transmitting an output of the pre-coding over a wireless communication channel.

C2. The method of clause C1 wherein the output of the pre-coding is further pre-coded using information about a state of the wireless communication channel.

C3. The method of clause C2, wherein the state of the wireless communication channel and the subset of the set of calibration coefficients multiplicatively pre-code the output.

C4. The method of clause C1, wherein the performing the local calibration includes selecting, based on a number of the one or more transmission antennas and the one or more receiving antennas a calibration method.

C5. The method of clause C1, wherein the performing the local calibration includes iteratively estimating the set of calibration coefficients.

C6. The method of clause C5, wherein the iteratively estimating the set of calibration coefficients includes: a step of initially obtaining a first estimate of the set of calibration coefficients; a step of obtaining a second estimate for a subset of the calibration coefficients; a step of calculating a refined estimate for the subset of the calibration coefficients using the first estimate and the second estimate; and iteratively repeating above steps until an iteration ending criterion is met.

C7. The method of clause C1, wherein performing the local calibration includes locally transmitting from a transmitting antenna a number of training symbols; and estimating calibration coefficients based on reception of the number of training symbols via the one or more receiving antennas.

C8. The method of clause C5, wherein the performing the local calibration includes calculating eigenvectors of a channel matrix representing a MIMO channel between the one or more transmit antennas and the one or more receive antennas using a least squares optimization technique.

C9. The method of clause C1, wherein the performing the local calibration includes subtracting, from a signal received at each of the one or more receiving antennas, a portion of the signal due to a coupling with other antennas of the one or more receiving antennas and/or the one or more transmitting antennas.

C10. The method of clause C1, further including communicating the set of calibration coefficients to another wireless communication apparatus to enable signal precoding by the another wireless communication apparatus.

C11. The method of clause C1, further including: locally storing the set of calibration coefficients by associating with one or more of the corresponding values of transmission power, reception power and a frequency of operation; and monitoring an operational condition for updating the set of calibration coefficients by performing the local calibration.

C12. The method of clause C11, wherein the operational condition includes signal to noise ratio of received signal.

C13. The method of clause C11, wherein the operational condition includes elapsing of a time interval.

Section 6: Using Second-Order Statistics for FDD Reciprocity

This section covers using second order statistics of a wireless channel to achieve reciprocity in frequency division duplexing (FDD) systems. FDD systems may have the following challenges in implementing such a precoded system:

The downlink channel response is different from the uplink channel response, due to the different carrier frequencies. On top of that, there is a different response of the transmit and receive RF components in the base-station and user equipment.

For non-static channels, the base-station needs to predict the channel for the time of the transmission.

In some embodiments, the base-station may send, before every precoded downlink transmission, reference signals (pilots) to the user equipment. The users will receive them and send them back to the base-station as uplink data. Then, the base-station will estimate the downlink channel and use it for precoding. However, this solution is very inefficient because it takes a large portion of the uplink capacity for sending back the received reference signals. When the number of users and/or base-station antennas grow, the system might not even be implementable. Also, the round-trip latency, in non-static channels, may degrade the quality of the channel prediction.

Second-Order Statistics Training

Figure 60:
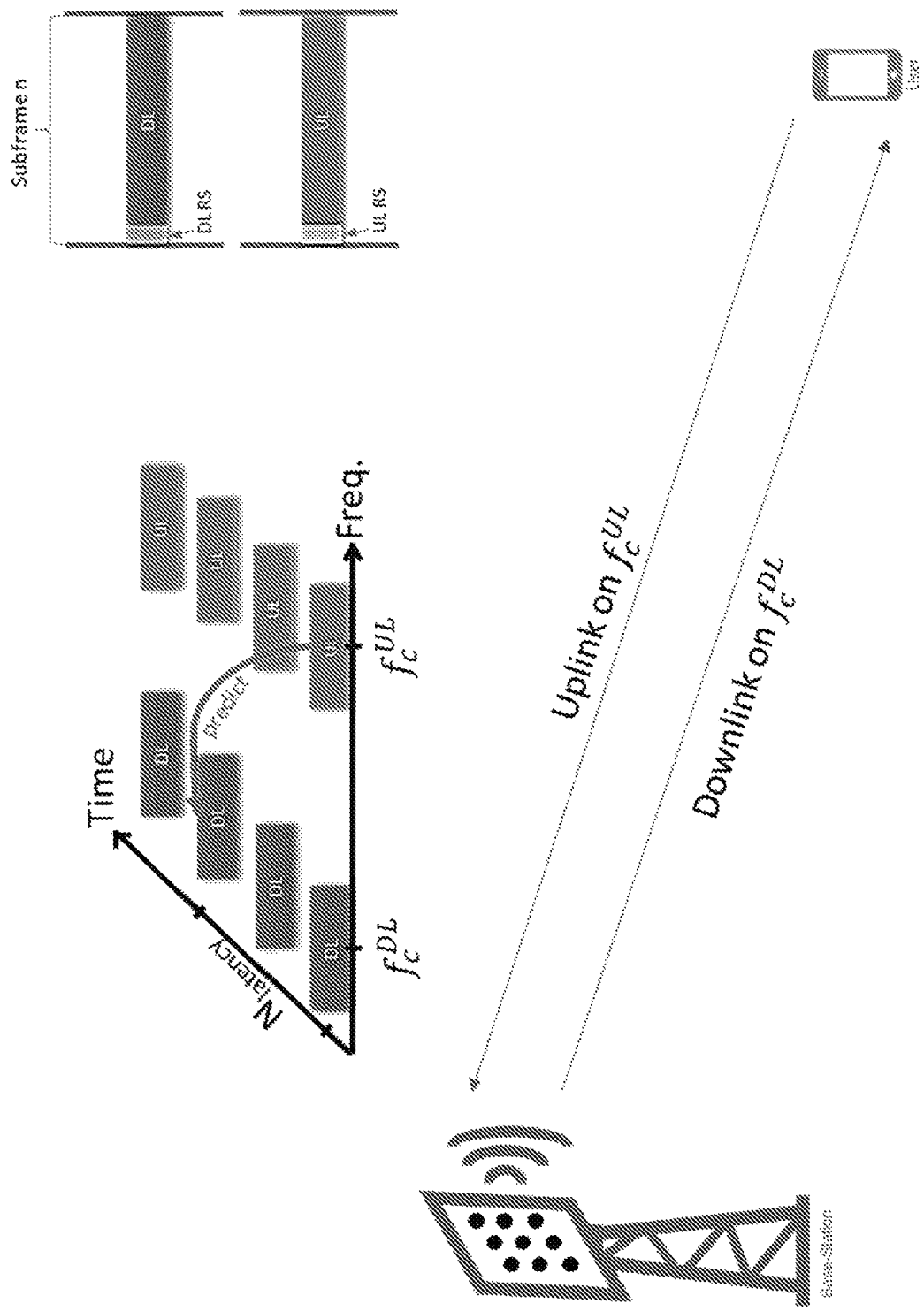
FIG. 60 is a block diagram of an example of the prediction setup in an FDD system.

For simplicity, the case with a single user antenna and the L base-station antennas is considered, but can be easily extended to any number of users. The setup of the system is shown in FIG. 60. The base-station predicts from the uplink channel response, the downlink channel response in a different frequency band and $N_{latency}$ subframes later.

To achieve this, the system preforms a preliminary training phase, consisting of multiple sessions, where in each session i=1, 2, . . . , $N_{training}$, the following steps are taken:

At subframe n, the user equipment transmits reference signals (RS) in the uplink. The base-station receives them and estimate the uplink channel $H_{UL}^{(i)}$ over the L base-station antennas.

At subframe n+$N_{latency}$, the base-station transmits reference signals in the downlink from all its antennas. The user equipment receives it and sends it back as uplink data in a later subframe. The base-station computes the downlink channel estimation for it, $H_{DL}^{(i)}$. In a different implementation, it is possible that the UE will compute the channel estimation and send it to the base-station as uplink data.

The base-station computes the second-order statistics $$R_{UL}^{(i)}=H_{UL}^{(i)}\cdot(H_{UL}^{(i)})^H$$

$$R_{DL,UL}^{(i)}=H_{DL}^{(i)}\cdot(H_{UL}^{(i)})^H$$

$$R_{DL}^{(i)}=H_{DL}^{(i)}\cdot(H_{DL}^{(i)})^H$$

Herein, $(\bullet)^H$ is the Hermitian operator. For the case that the channel has non-zero-mean, both the mean and the covariance matrix should be determined. When the training sessions are completed, the base-station averages out the second order statistics:

$$R_{UL} = \frac{1}{N_{training}}\Sigma_{i=1}^{N_{training}} R_{UL}^{(i)}$$

$$R_{DL,UL} = \frac{1}{N_{training}}\Sigma_{i=1}^{N_{training}} R_{DL,UL}^{(i)}$$

$$R_{DL} = \frac{1}{N_{training}}\Sigma_{i=1}^{N_{training}} R_{DL}^{(i)}$$

Then, it computes the prediction filter and the covariance of the estimation error:

$$C_{prediction}=R_{DL,UL}\cdot(R_{UL})^{-1}$$

$$R_E=R_{DL}-C_{prediction}\cdot(R_{DL,UL})^H$$

The inversion of $R_{UL}$ may be approximated using principal component analysis techniques. We compute $\{\lambda\}$, the K most dominant eigenvalues of $R_{UL}$, arranged in a diagonal matrix D=diag($\lambda_1$, $\lambda_2$, . . . , $\lambda_K$) and their corresponding eigenvectors matrix V. Typically, K will be in the order of the number of reflectors along the wireless path. The covariance matrix can then be approximated by $R_{UL} \approx V \cdot D \cdot (V)^H$ and the inverse as $R_{UL}^{-1} \approx V \cdot D^{-1} \cdot (V)^H$.

Note, that there is a limited number of training sessions and that they may be done at a very low rate (such as one every second) and therefore will not overload the system too much.

To accommodate for possible future changes in the channel response, the second-order statistics may be updated later, after the training phase is completed. It may be recomputed from scratch by initializing again new $N_{training}$ sessions, or by gradually updating the existing statistics.

The interval at which the training step is to be repeated depends on the stationarity time of the channel, e.g., the time during which the second-order statistics stay approximately constant. This time can be chosen either to be a system-determined constant, or can be adapted to the environment. Either the base-station or the users can detect changes in the second-order statistics of the channel and initiate a new training phase. In another embodiment, the base-station may use the frequency of retransmission requests from the users to detect changes in the channel, and restart the process of computing the second-order statistics of the channel.

Scheduling a Downlink Precoded Transmission

For each subframe with a precoded downlink transmission, the base-station should schedule all the users of that transmission to send uplink reference signals $N_{latency}$ subframes before. The base-station will estimate the uplink channel responses and use it to predict the desired downlink channel responses $$H_{DL}=C_{prediction}\cdot H_{UL}$$

Then, the downlink channel response $H_{DL}$ and the prediction error covariance $R_E$ will be used for the computation of the precoder.

FIGS. 61 and 62 are flowchart representations of examples of wireless communication methods for using second-order statistics for FDD reciprocity.

FIG. 61 is a flowchart showing operations performed in an example method 6100 for wireless communications. The method 6100 includes, at step 6102, estimating an uplink channel response estimate. The method 6100 includes, at step 6104, predicting, from the uplink channel response estimate, a downlink channel estimate.

FIG. 62 is a flowchart showing operations performed in an example method 6200 for wireless communications. The method 6200 includes, at step 6202, receiving a reference signal transmission from a network-side node in a first frequency band. The method 6200 includes, at step 6204, generating and transmitting a report in a second frequency band that is non-overlapping with the first frequency band. The method 6200 includes, at step 6206, receiving a precoded data transmission from the network-side node.

Some embodiments and techniques related to methods 6100 and 6200 may be described using the following clause-based description. In this description, the terms uplink and downlink simply refer to two opposing directions of communication between two communication devices.

D1. A wireless communication method, implementable by a wireless communication apparatus, comprising: estimating an uplink channel response estimate for an uplink channel from one or more user devices to the wireless communication apparatus; and predicting, from the uplink channel response estimate, a downlink channel estimate for a downlink channel from the wireless communication apparatus to the one or more user devices; wherein the uplink channel and the downlink channel are frequency division multiplexed (FDD) channels; wherein the predicting is performed using a second order statistics between uplink channel estimates and downlink channel estimates.

D2. The method of clause D1, wherein the second order statistics includes a cross-covariance between the downlink channel estimate and the uplink channel estimate.

D3. The method of clause D1, further including: estimating an uplink channel covariance of the uplink channel estimate; and estimating a downlink channel covariance of the downlink channel estimate.

D4. The method of clause D3, wherein the uplink channel covariance is estimated by averaging over multiple measurements over a training interval.

D5. The method of clause D3, wherein the downlink channel covariance is estimated by averaging over multiple measurements over the training interval.

D6. The method of clause D2, wherein the cross-covariance is estimated by averaging over multiple measurements over the training interval.

D7. The method of clause D1, wherein the predicting the downlink channel includes predicting the downlink channel for a future time.

D8. The method of clause D3, wherein the predicting includes estimating a prediction filter from the cross-covariance and an inverse of the uplink channel covariance.

D9. The method of clause D8, further including, calculating a prediction error covariance using the downlink channel covariance, the uplink channel covariance and the cross-covariance.

D10. The method of clause D8, wherein the estimating the prediction filter includes performing principal component analysis of a matrix representing the uplink channel estimate covariance.

D11. The method of clause D4, D5 or D6, wherein a number of the multiple measurements over the training interval is changed over time.

D12. The method of clause D4, D5, or D6, further including, initiating the training interval in response to detecting changes to the uplink channel or the downlink channel.

D13. The method of any of clauses D1 to D12, further including: performing a downlink channel transmission using the downlink channel response determined from the predicting.

D14. The method of clause D9, further including: performing a downlink channel transmission using covariance of the prediction error.

D15. A method of wireless communication, performed by a user device in a wireless network, comprising: receiving a reference signal transmission from a network-side node in a first frequency band; generating and transmitting a report based on the reference signal transmission in a second frequency band that is non-overlapping with the first frequency band; and receiving, after the transmitting the report, a precoded data transmission from the network-side node, wherein the precoding is performed using a second order statistics between channel responses between the first frequency band and the second frequency band.

D16. The method of clause D15, wherein the second order statistics is determined using a method recited in at least one of clauses D1 to D14.

Section 7: Using Second-Order Statistics for Channel Estimation

This section covers using second order statistics of a wireless channel to achieve efficient channel estimation. Channel knowledge is a critical component in wireless communication, whether it is for a receiver to equalize and decode the received signal, or for a multi-antenna transmitter to generate a more efficient precoded transmission.

Channel knowledge is typically acquired by transmitting known reference signals (pilots) and interpolating them at the receiver over the entire bandwidth and time of interest. Typically, the density of the pilots depends on characteristics of the channel. Higher delay spreads require more dense pilots along frequency and higher Doppler spreads require more dense pilots along time. However, the pilots are typically required to cover the entire bandwidth of interest and, in some cases, also the entire time interval of interest.

Embodiments of the disclosed technology include a method based on the computation of the second-order statistics of the channel, where after a training phase, the channel can be estimated over a large bandwidth from reference signals in a much smaller bandwidth. Even more, the channel can also be predicted over a future time interval.

Second-Order Statistics Training for Channel Estimation

Figure 63:
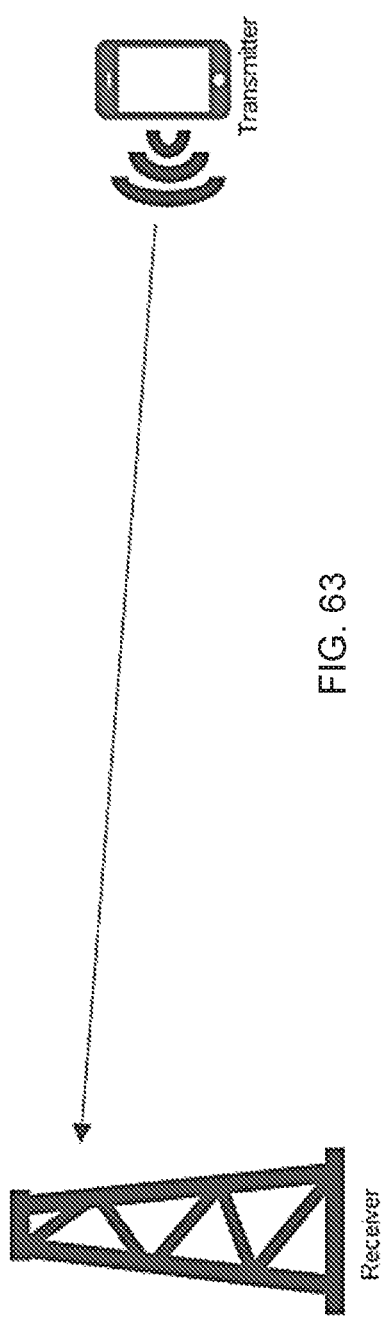
FIG. 63 is an example of a transmitter and receiver.

FIG. 63 shows a typical setup of a transmitter and a receiver. Each one may have multiple antennas, but for simplicity we will only describe the method for a single antenna to a single antenna link. This could be easily extended to any number of antennas in both receiver and transmitter.

Figure 64A:
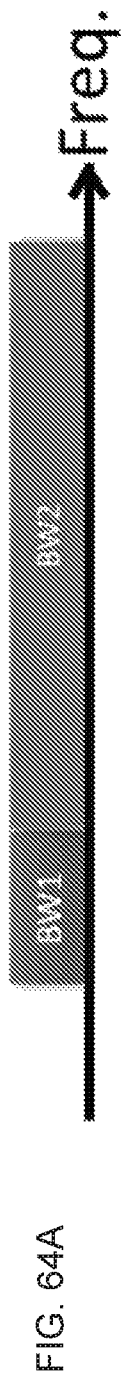
FIGS. 64A, 64B and 64C show examples of different bandwidth partitions.
Figure 64B:
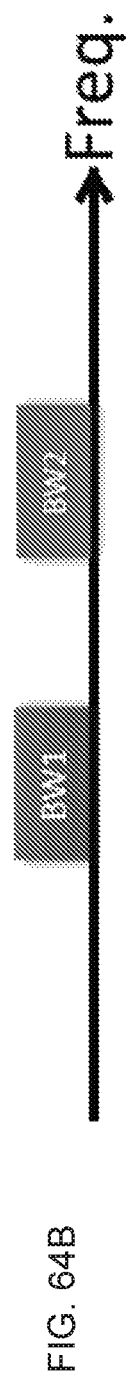
Figure 64C:
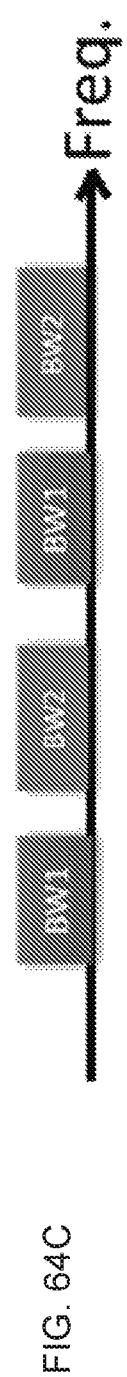
Figure 65:
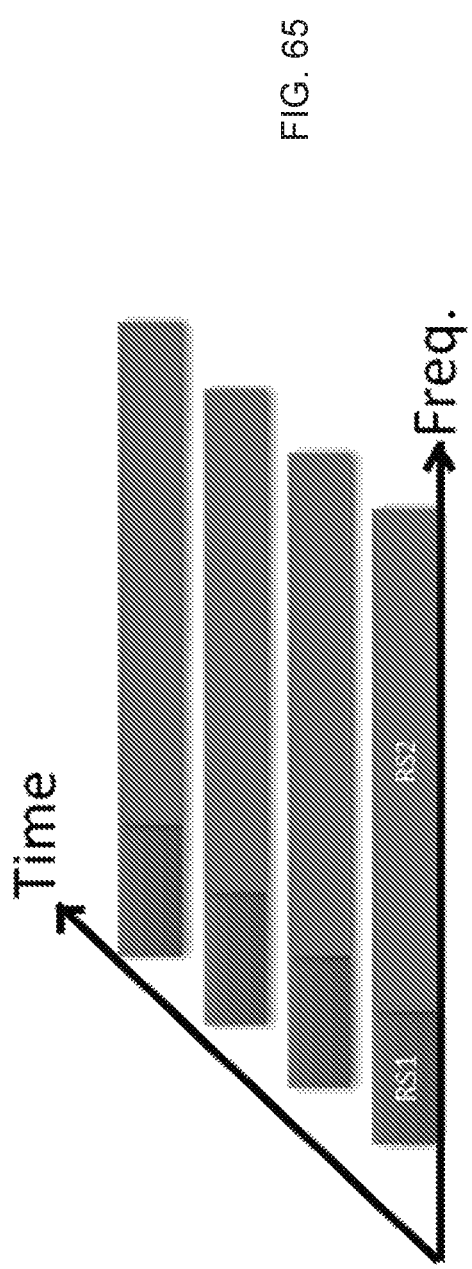
FIG. 65 shows an example of a bandwidth partition with the same time interval.
Figure 66:
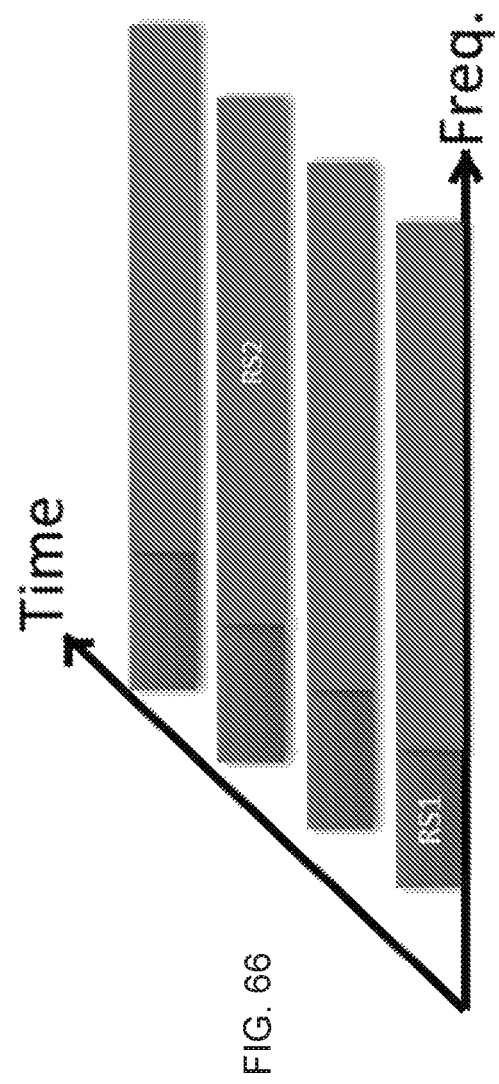
FIG. 66 shows an example of a bandwidth partition with a different time interval.

The system preforms a preliminary training phase, consisting of multiple sessions, where in each session i=1, 2, ..., $N_{training}$, the following steps are taken:

The transmitter sends reference signals to the receiver. We partition the entire bandwidth of interest into two parts BW$_1$ and BW$_2$, as shown in FIGS. 64A-64C, where typically the size of BW$_1$ will be smaller or equal to BW$_2$. Note, that these two parts do not have to from a continuous bandwidth. The transmitter may send reference signals at both parts at the same time interval (e.g., FIG. 65) or at different time intervals (e.g., FIG. 66).

The receiver receives the reference signals and estimates the channel over their associated bandwidth, resulting in channel responses H$_1^{(i)}$ and H$_2^{(i)}$.

The receiver computes the second-order statistics of these two parts:

$$R_1^{(i)} = H_1^{(i)} \cdot (H_1^{(i)})^H$$

$$R_{2,1}^{(i)} = H_2^{(i)} \cdot (H_1^{(i)})^H$$

$$R_2^{(i)} = H_2^{(i)} \cdot (H_2^{(i)})^H$$

Herein, $(\bullet)^H$ is the Hermitian operator. For the case that the channel has non-zero-mean, both the mean and the covariance matrix should be determined. When the training sessions are completed, the base-station averages out the second-order statistics in a manner similar to that described in Section 6.

Efficient Channel Estimation

After the training phase is completed, the transmitter may only send reference signals corresponding to BW$_1$. The receiver, estimated the channel response H$_1$ and use it to compute (and predict) and channel response H$_2$ over BW$_2$ using the prediction filter:

$$H_2 = C_{prediction} \cdot H_1.$$

Figure 67:
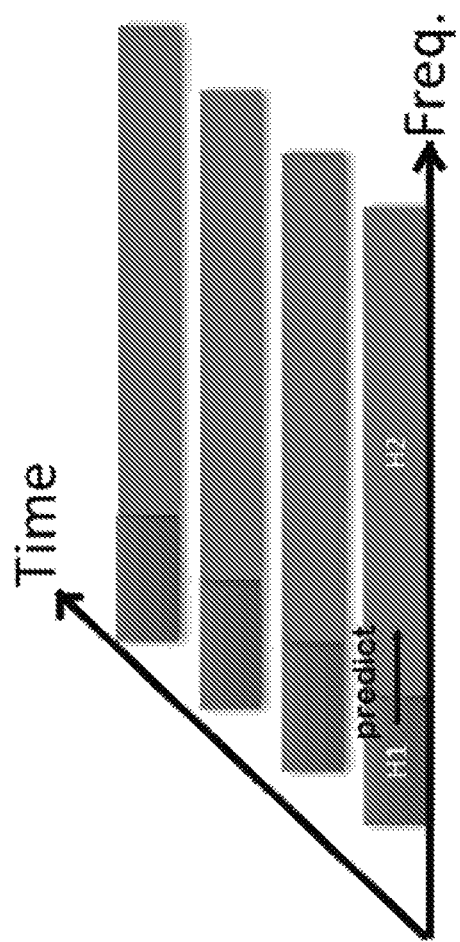
FIG. 67 shows an example of channel prediction over the same time interval.
Figure 68:
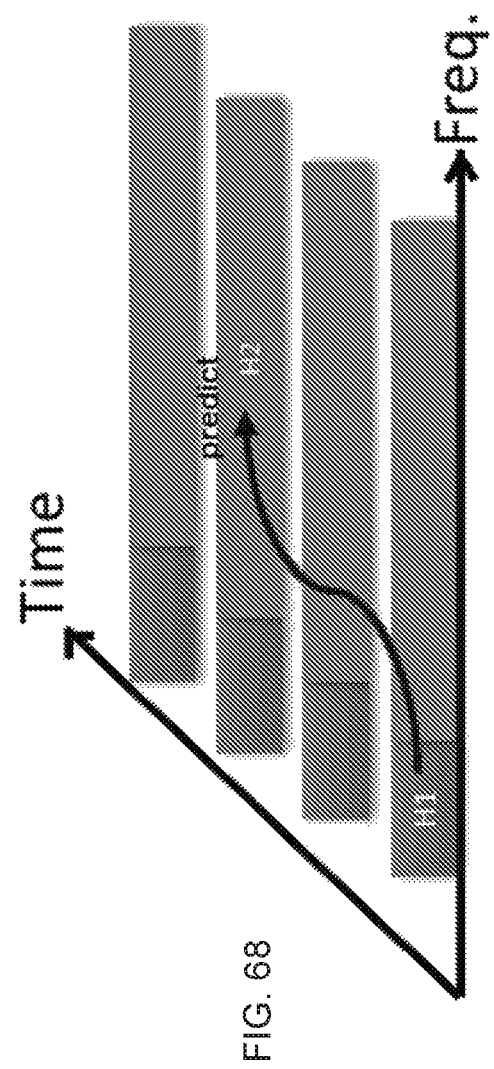
FIG. 68 shows an example of channel prediction over a different time interval.

FIGS. 67 and 68 show examples of prediction scenarios (same time interval and future time interval, respectively).

FIGS. 69 and 70 are flowchart representations of examples of wireless communication methods for using second-order statistics for channel estimation.

FIG. 69 is a flowchart showing operations performed in an example method 6900 for wireless communication. The method 6900 includes, at step 6902, predicting, during a second time interval, a channel estimate over a second frequency band from a channel estimate over a first frequency band and a second order statistical relationship between the channel estimates. The method 6900 includes, at step 6904, performing a transmission in a second frequency band using the channel estimate over the second frequency band.

FIG. 70 is a flowchart showing operations performed in an example method 7000 for wireless communication. The method 7000 includes, at step 7002, estimating a first frequency band estimate for a wireless channel between the wireless communication apparatus and one or more user devices. The method 7000 includes, at step 7004, predicting, from the first frequency band estimate, a second frequency band estimate for the wireless channel.

Some embodiments and techniques related to methods 6900 and 7000 may be described using the following clause-based description.

E1. A wireless communication method, implementable by a wireless communication apparatus, comprising: predicting, during a second time interval, a channel estimate over a second frequency band from a channel estimate over a first frequency band and a second order statistical relationship between the channel estimates; wherein the first frequency band and the second frequency bands are non-overlapping in frequency domain, and wherein the second order statistical relationship is computed over a first time interval; and performing a transmission in a second frequency band using the channel estimate over the second frequency band.

E2. The method of clause E1, wherein the second order statistical relationship is determined from an estimate of cross-covariance between the channel estimate over the first frequency band and the channel estimate over the second frequency band calculated during the first time interval.

E3. The method of clause E2, further including: estimating a covariance of a first channel estimate over the first frequency band using reference signal transmissions in the first frequency band; and estimating a covariance of a second channel estimate over the second frequency band using reference signal transmissions in the second frequency band.

E4. The method of clause E3, wherein the covariance of the first channel estimate is calculated by averaging multiple estimates of the covariance of the first channel estimate over the first time interval.

E5. The method of clause E3, wherein the covariance of the second channel estimate is calculated by averaging multiple estimates of the covariance of the second channel estimate over the first time interval.

E6. The method of clause E3, wherein the cross-covariance between channel estimate over the first frequency band and the channel estimate over the second frequency band by averaging multiple estimates of the cross-covariance over the first time interval.

E7. The method of clause E1, wherein the second frequency band is wider than the first frequency band.

E8. The method of clause E1, wherein the second frequency band is non-contiguous with the first frequency band in frequency domain.

E9. The method of clause E1, wherein the second time interval is non overlapping with the first time interval in time domain.

E10. The method of clause E2, wherein the predicting includes estimating a prediction filter from the cross-covariance and an inverse of the covariance of the first channel estimate.

E11. The method of clause E10, further including, calculating a prediction error covariance using the cross-covariance of the first and second channel estimates and a covariance of the channel estimate over the first and second frequency bands.

E12. The method of clause E11, wherein the estimating the prediction filter includes performing principal component analysis of a matrix representing the uplink channel covariance.

E13. The method of clause E1, wherein the reference signal transmissions in the first frequency band and the reference signal transmissions in the second frequency band at performed at different times.

E14. The method of clause E1, wherein the second order statistical relationship is periodically updated based on a refresh criterion.

E15 The method of clause E14, wherein the refresh criterion includes detecting changes to channels in the first frequency band or the second frequency band.

E16. A wireless communication method, implementable by a wireless communication apparatus, comprising: estimating a first frequency band estimate for a wireless channel between the wireless communication apparatus and one or more user devices; and predicting, from the first frequency band estimate, a second frequency band estimate for the wireless channel, wherein the first frequency band and the second frequency band are non-overlapping in frequency; wherein the predicting is performed using a second order statistics between the first frequency band estimate and the second frequency band estimate.

E17. The method of clause E16, wherein the second order statistics includes a cross-covariance between the first frequency band estimate and the second frequency band estimate.

E18. The method of clause E16, further including: estimating a first frequency band covariance of the first frequency band estimate; and estimating a second frequency band covariance of the second frequency band estimate.

E19 The method of clause E18, wherein the first frequency band covariance is estimated by averaging over multiple measurements over a training interval.

E20. The method of clause E18, wherein the second frequency band covariance is estimated by averaging over multiple measurements over the training interval.

E21. The method of clause E18, wherein the cross-covariance is estimated by averaging over multiple measurements over the training interval.

E22. The method of clause E16, wherein the predicting the wireless channel in the second frequency band includes predicting the wireless channel in the second frequency band for a future time.

E23. The method of clause E18, wherein the predicting includes estimating a prediction filter from the cross-covariance and an inverse of the first frequency band covariance.

E24. The method of clause E23, further including, calculating a prediction error covariance using the second frequency band covariance, the first frequency band covariance and the cross-covariance.

E25. The method of clause E23, wherein the estimating the prediction filter includes performing principal component analysis of a matrix representing the first frequency band covariance.

E26. The method of clause E19, E20 or E21, wherein a number of the multiple measurements over the training interval is changed over time.

E27. The method of clause E19, E20, or E21, further including, initiating the training interval in response to detecting changes to the first frequency band or the second frequency band.

E28. The method of any of clauses E16 to E27, further including: performing a transmission in the second frequency band using the secondary frequency band channel estimate determined from the predicting.

E29. The method of clause E24, further including: performing a transmission in the second frequency band using covariance of the prediction error.

E30. The method of clause E1 or E16, wherein at least one of the first frequency band and the second frequency band comprise multiple non-contiguous frequency band portions.

Figure 71:
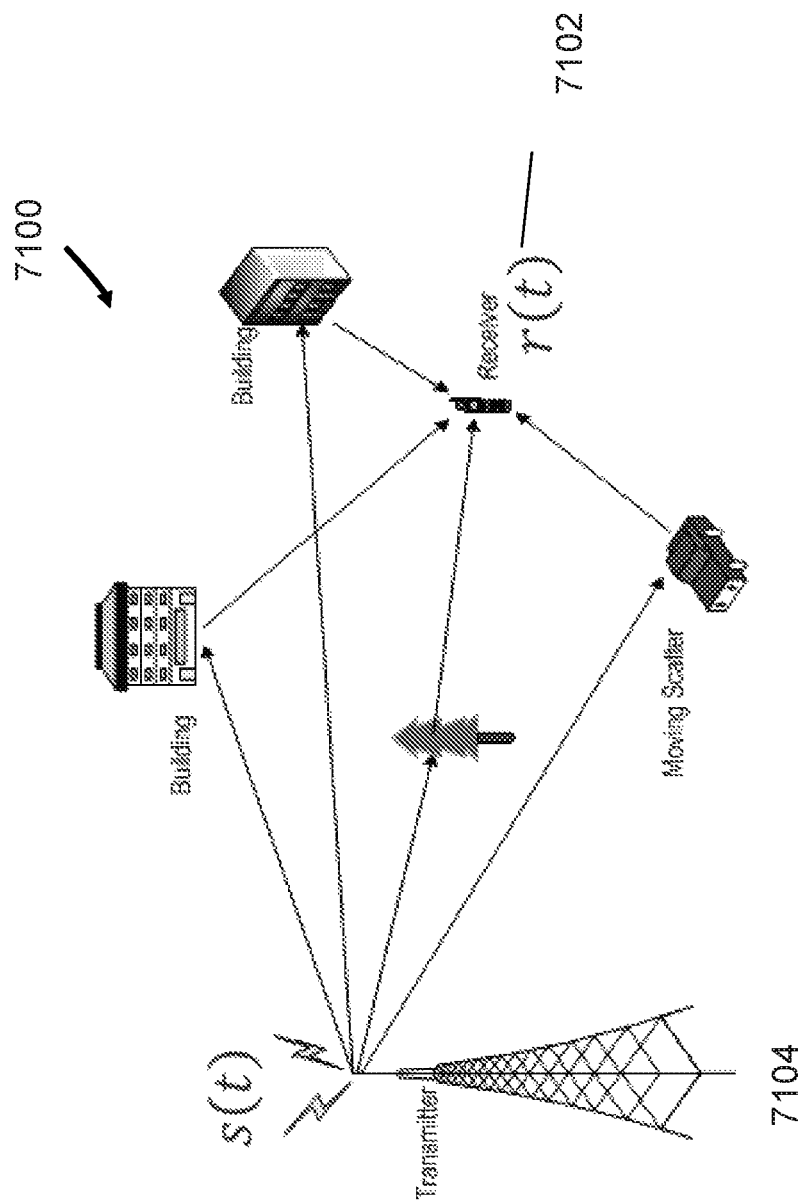
FIG. 71 is an example of a wireless communication system.

FIG. 71 is a block diagram illustration of an example of a wireless communication system 7100. The system 7100 may include one or more transmitters/receivers. For example, a transmitter located at a base station 7104 may transmit signals s(t) to a receiver device 7102, where the received signal r(t) may be affected by the wireless channel that includes air medium and may also include moving or stationary interferers or scatterers such as buildings, vegetation and vehicle. The receiver device 7102 may also transmit signals to the base station 7104, which are not explicitly shown in the drawing. The receiver device 7102 may be a user equipment such as a smartphone, a tablet computer, a laptop, or a non-mobile equipment such as a small cell base station or a wireless access receiver, and so on. The various transmitter-side techniques described in the present document may be implemented using the transmission circuitry of a base station 7104 and/or the receiver apparatus 7102. The various receiver-side techniques described in the present document may be implemented using receiver circuitry of the base station 7104 and/or the receiver apparatus 7102.

Figure 72:
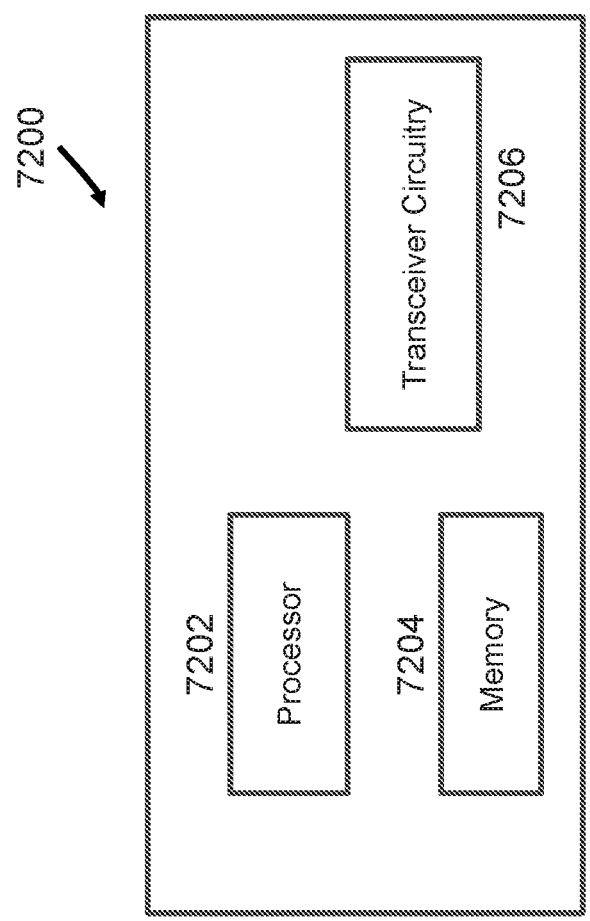
FIG. 72 is a block diagram of a wireless communication apparatus.

FIG. 72 is a block diagram representation of a communication apparatus 7200. The apparatus may include a processor 7202. The apparatus 7200 may include a memory 7204. The apparatus 7200 may include transmission and/or reception circuitry 7206. The processor 7202 may be configured to implement a method described in the present document. The memory 7204 may be configured to store data during the implementation of a method, or may store processor-executable code that, when executed by the processor 7202, causes the processor 7202 to implement a technique described in the present document. The transceiver circuitry 7206 may be configured to perform signal reception or signal transmission processing.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, implementable by a base station, comprising:
    performing, by the base station, a channel training based on a reception of orthogonal pilots from multiple transmitting devices over a wireless channel,
    wherein the channel training includes determining a second order statistics of time variations in the wireless channel;
    constructing, based on the second order statistics, a precoding filter; and
    adding perturbation signals and applying the precoding filter to future transmissions to the multiple transmitting devices, wherein the perturbation signals minimize an expected error energy of the future transmissions at the multiple transmitting devices, and wherein the perturbation signals correspond to one or more perturbation vectors that take values on a coarse lattice in a two-dimensional plane defined by a delay dimension and a Doppler dimension.

2. The method of claim 1, wherein the determining second order statistics includes, for each received subframe with orthogonal pilot, and for each of a plurality of receive antennas, determining an estimate of the wireless channel and computing a covariance matrix of the estimate as a function of time.

3. The method of claim 2, wherein the estimate of the wireless channel is performed over an entire frequency band.

4. The method of claim 2, wherein the determining the second order statistics includes:
    performing a principal component analysis in which a number of most dominant eigenvalues of the covariance matrix are used; and
    using an approximation of the covariance matrix based on the principal component analysis for determining the second order statistics.

5. The method of claim 4, wherein the number of most dominant eigenvalues is equal to a number of reflectors in the wireless channel.

6. The method of claim 2, further including computing a mean of the covariance matrix as a function of time.

7. The method of claim 2, wherein the covariance matrix is gradually updated over time by removing a first column of a matrix representing the received orthogonal pilots and adding a new column to the matrix and re-computing the covariance matrix after adding the new column.

8. The method of claim 1, further including implementing the method for each antenna of the multiple transmitting devices.

9. The method of claim 1, wherein periodicity of occurrence of the orthogonal pilots is greater than an estimated time period over which the estimate of the wireless channel is constant.

10. The method of claim 1, wherein at least a portion of the wireless channel is dedicated to transmission of non-orthogonal pilots for reception by a receiving wireless device.

11. A receiving wireless device implemented at a base station, the receiving wireless device comprising a processor configured to implement a method, the method comprising:
    performing a channel training at the receiving wireless device based on a reception of orthogonal pilots from multiple transmitting devices over a wireless channel, wherein the channel training includes determining second order statistics of time variations in the wireless channel;
    constructing, based on the second order statistics, a precoding filter; and
    adding perturbation signals and applying the precoding filter to future transmissions to the multiple transmitting devices, wherein the perturbation signals minimize an expected error energy of the future transmissions at the multiple transmitting devices, and wherein the perturbation signals correspond to one or more perturbation vectors that take values on a coarse lattice in a two-dimensional plane defined by a delay dimension and a Doppler dimension.

12. The receiving wireless device of claim 11, wherein the determining second order statistics includes, for each received subframe with orthogonal pilot, and for each of a plurality of receive antennas, determining an estimate of the wireless channel and computing a covariance matrix of the estimate as a function of time.

13. The receiving wireless device of claim 12, wherein the estimate of the wireless channel is performed over an entire frequency band.

14. The receiving wireless device of claim 12, wherein the processor is further configured, as part of determining the second order statistics, for:
performing principal component analysis in which a number of most dominant eigenvalues of the covariance matrix are used; and
using an approximation of the covariance matrix based on the principal component analysis for determining the second order statistics.

15. The receiving wireless device of claim 14, wherein the number of most dominant eigenvalues is equal to a number of reflectors in the wireless channel.

16. The receiving wireless device of claim 12, wherein the processor is further configured for computing a mean of the covariance matrix as a function of time.

17. The receiving wireless device of claim 12, wherein the covariance matrix is gradually updated over time by removing a first column of a matrix representing the received orthogonal pilots and adding a new column to the matrix and re-computing the covariance matrix after adding the new column.

18. The receiving wireless device of claim 11, wherein the processor is further configured to implement the method for each antenna of the multiple transmitting devices.

19. The receiving wireless device of claim 11, wherein periodicity of occurrence of the orthogonal pilots is greater than an estimated time period over which the estimate of the wireless channel is constant.

20. The receiving wireless device of claim 11, wherein at least a portion of the wireless channel is dedicated to transmission of non-orthogonal pilots for reception by the receiving wireless device.

* * * * *